June 5, 1962      H. M. SIERRA      3,037,701
FLOATING DECIMAL POINT ARITHMETIC CONTROL MEANS FOR CALCULATOR
Filed Nov. 21, 1956      32 Sheets-Sheet 19
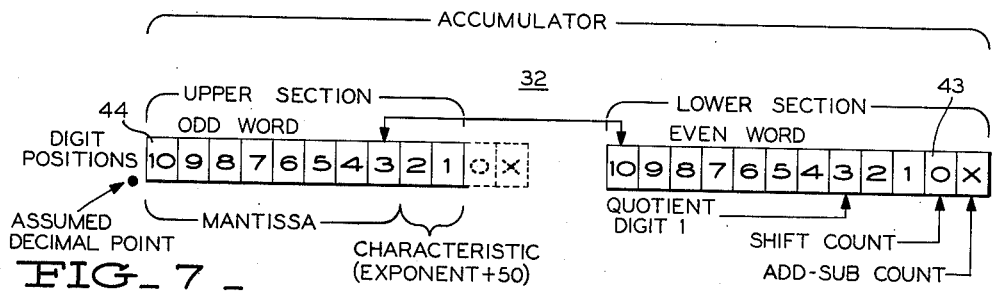
FIG_7_
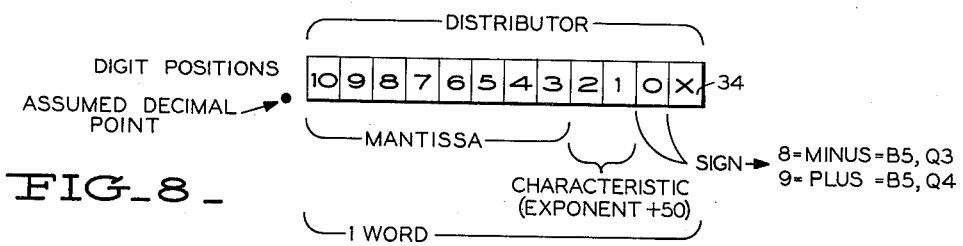
FIG_8_
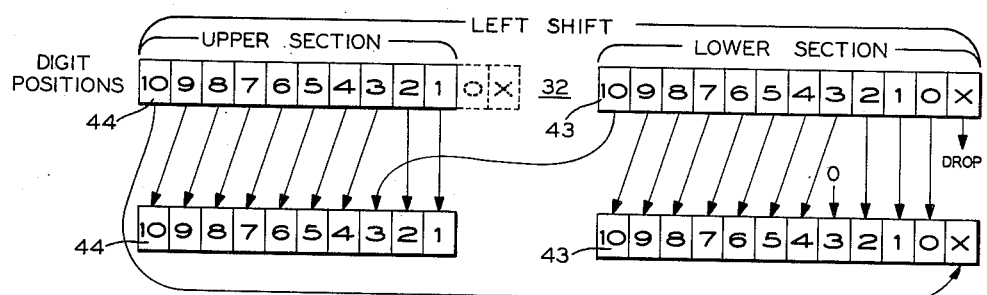
FIG_9_
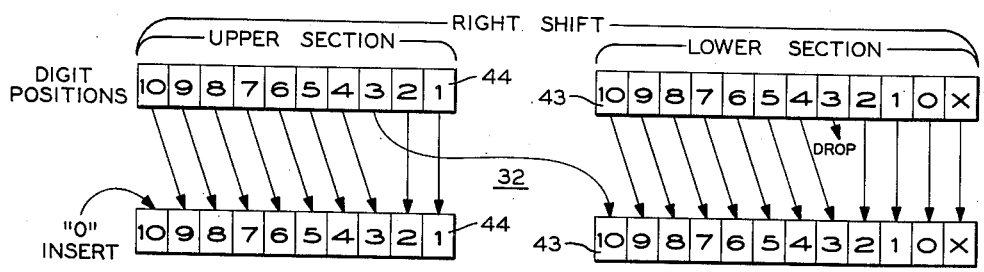
FIG_10_

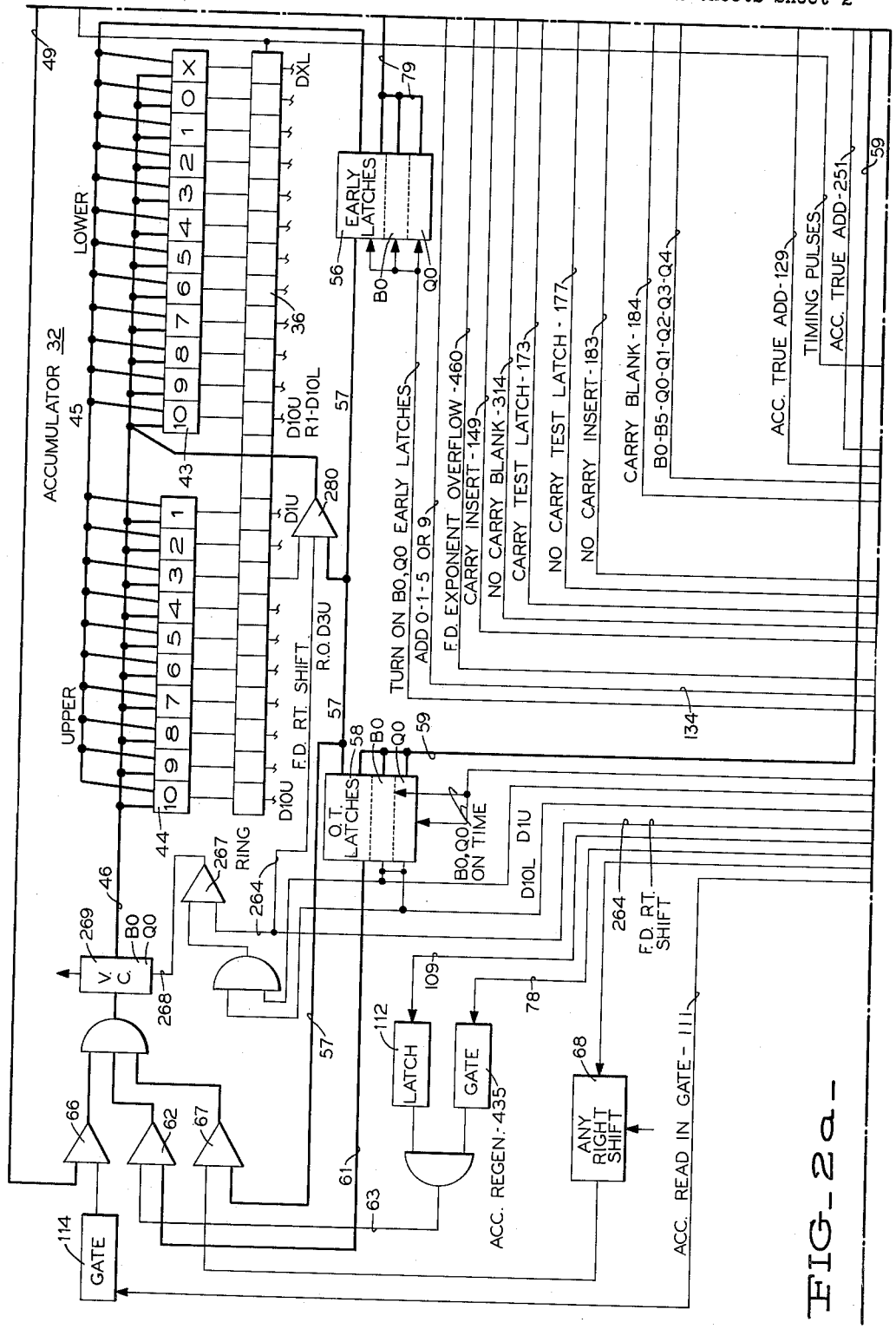

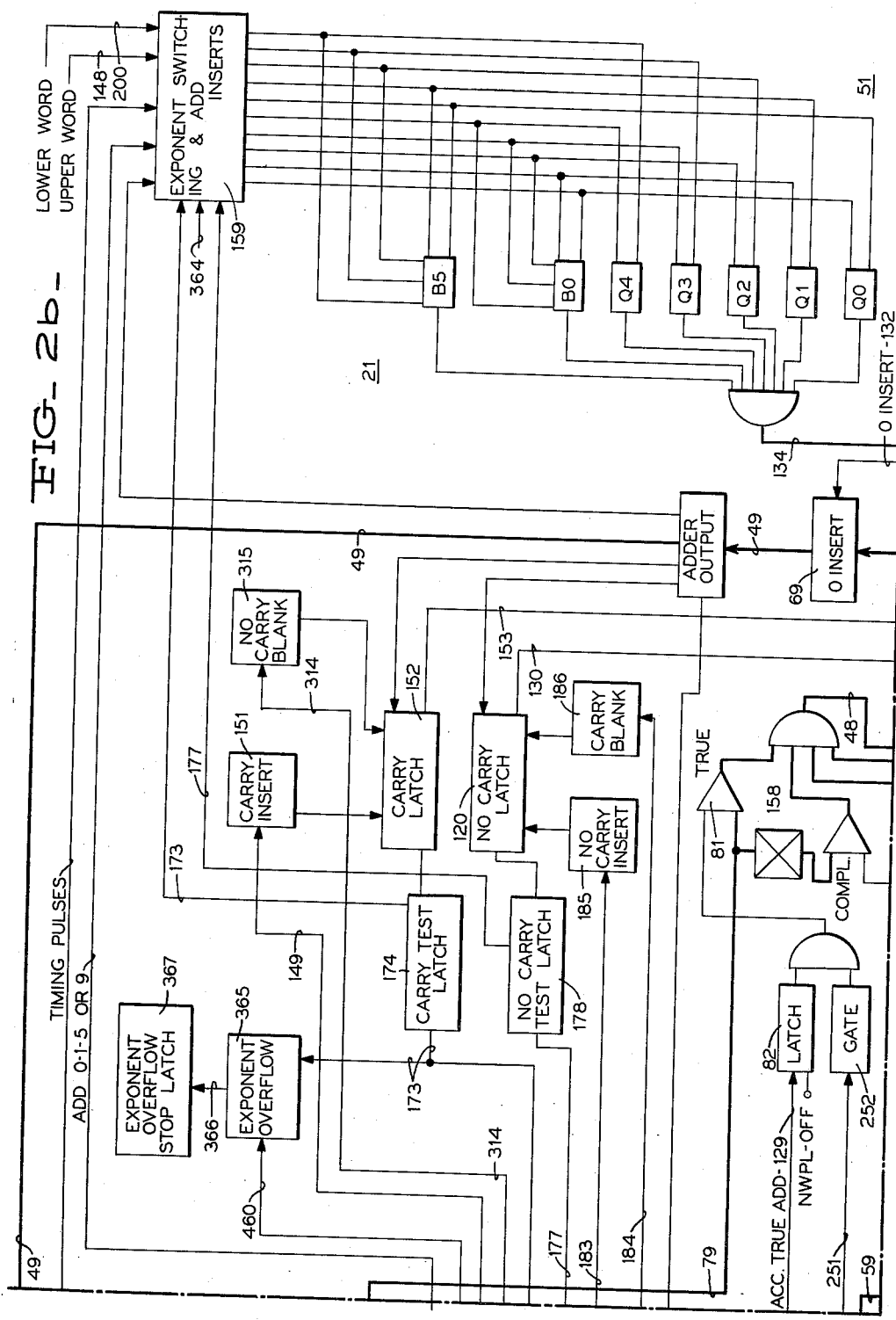

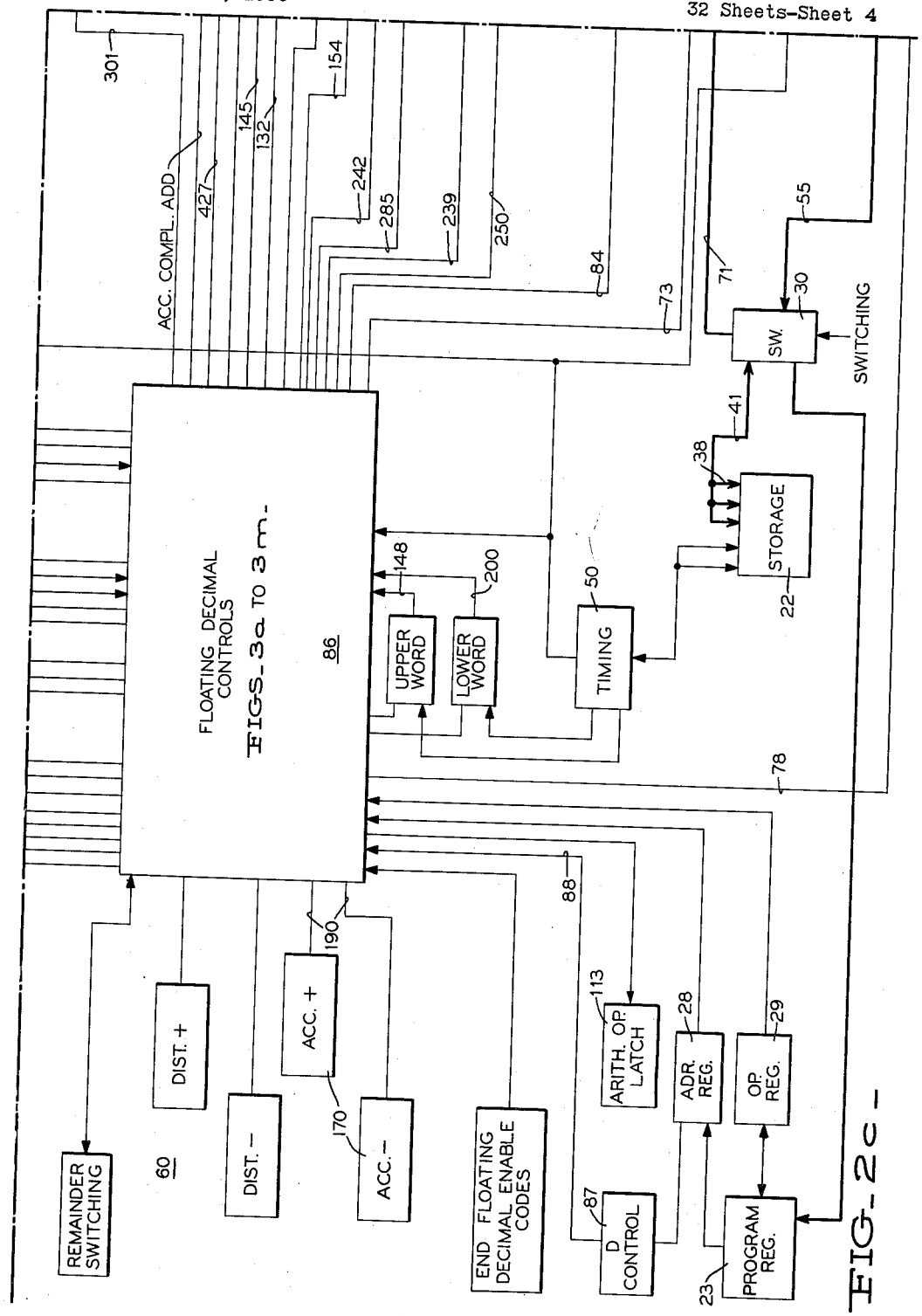

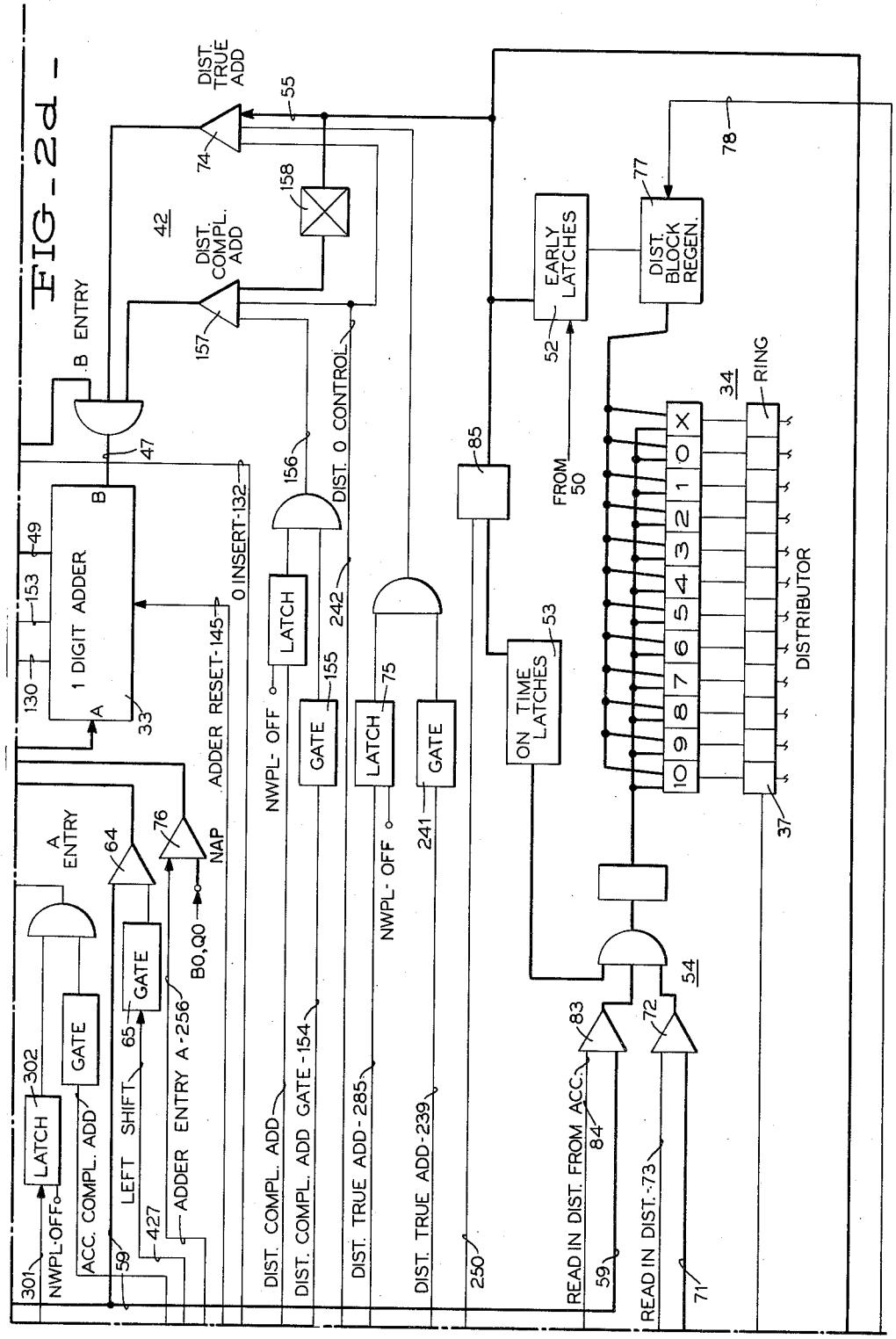

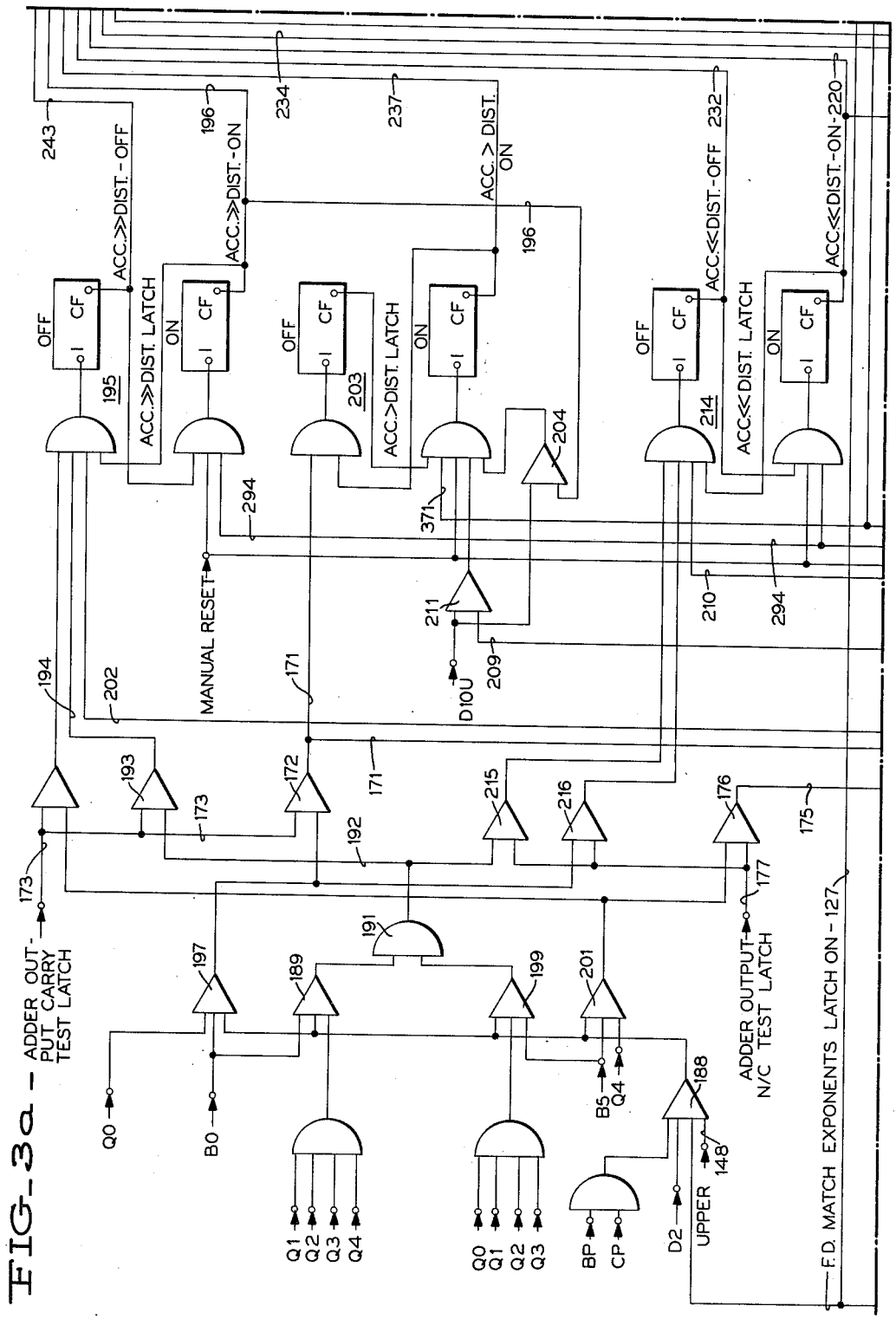

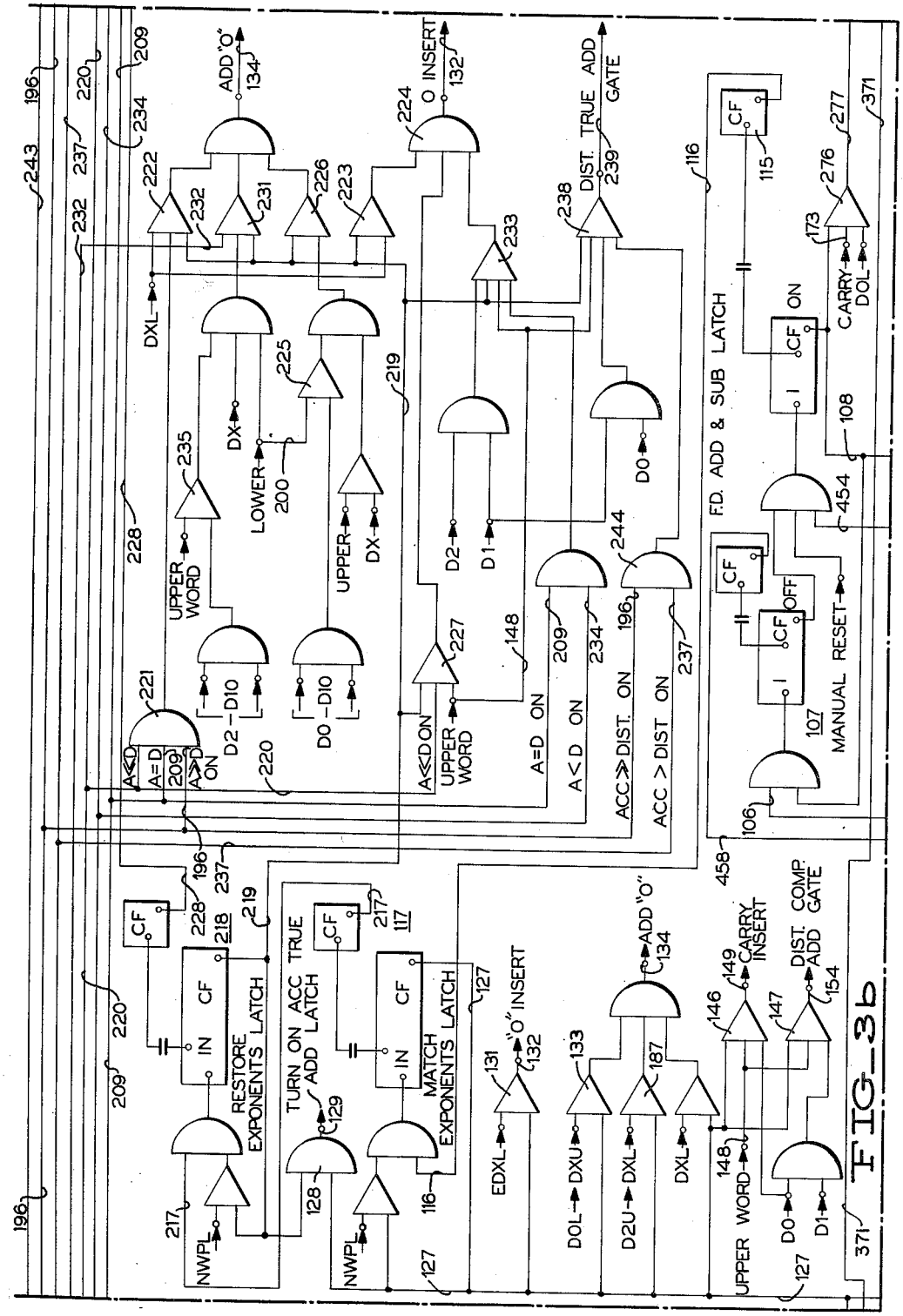

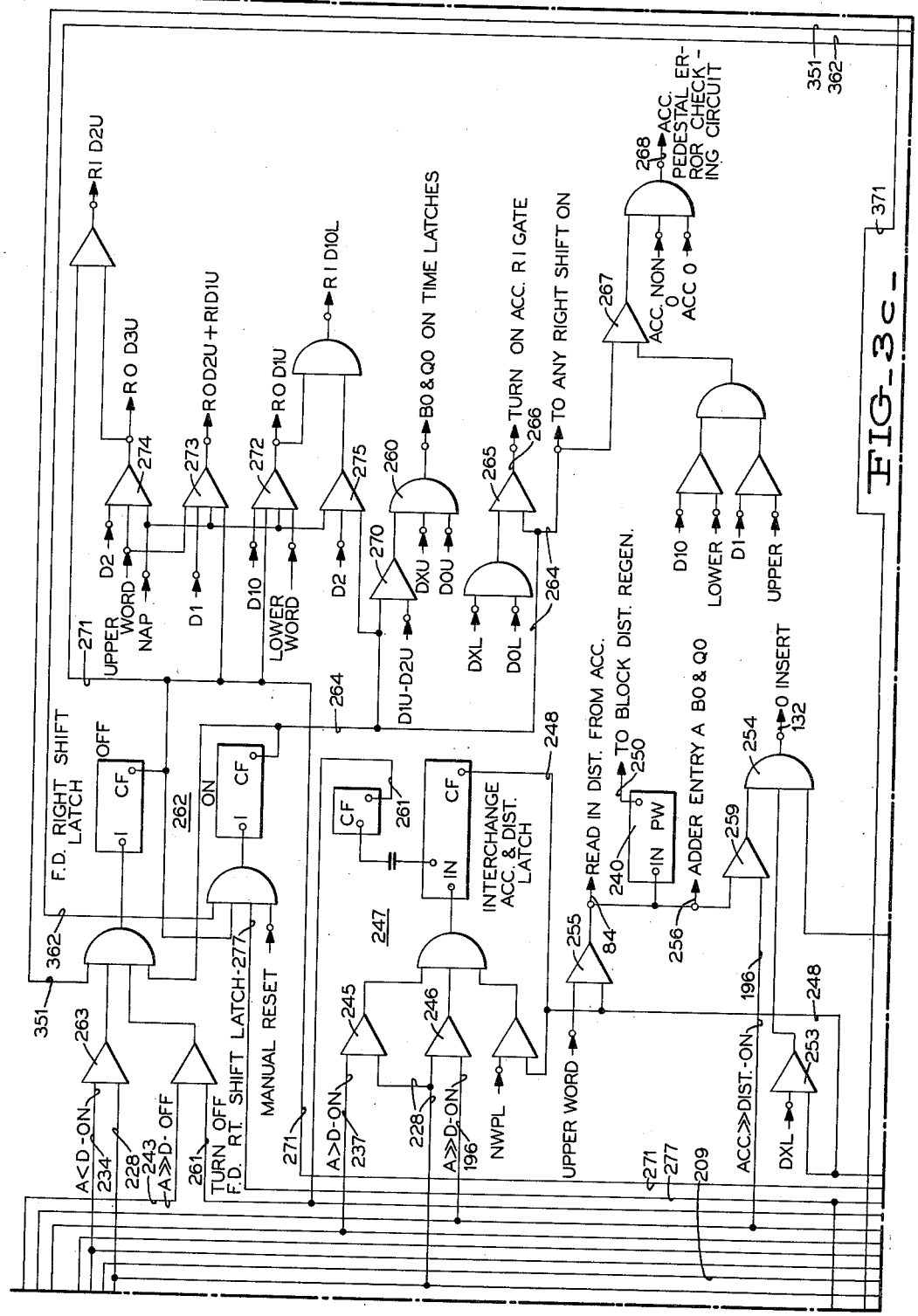

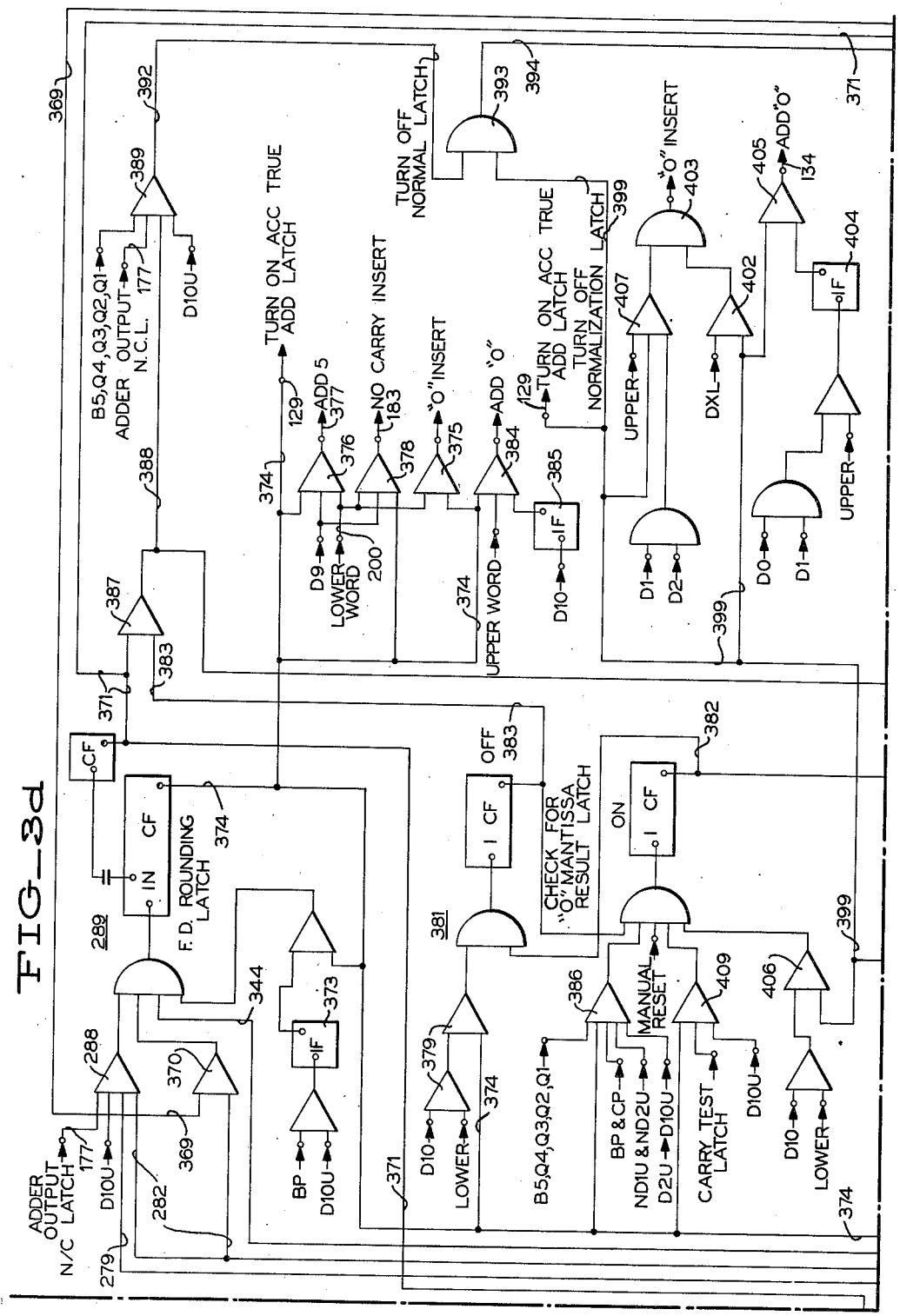

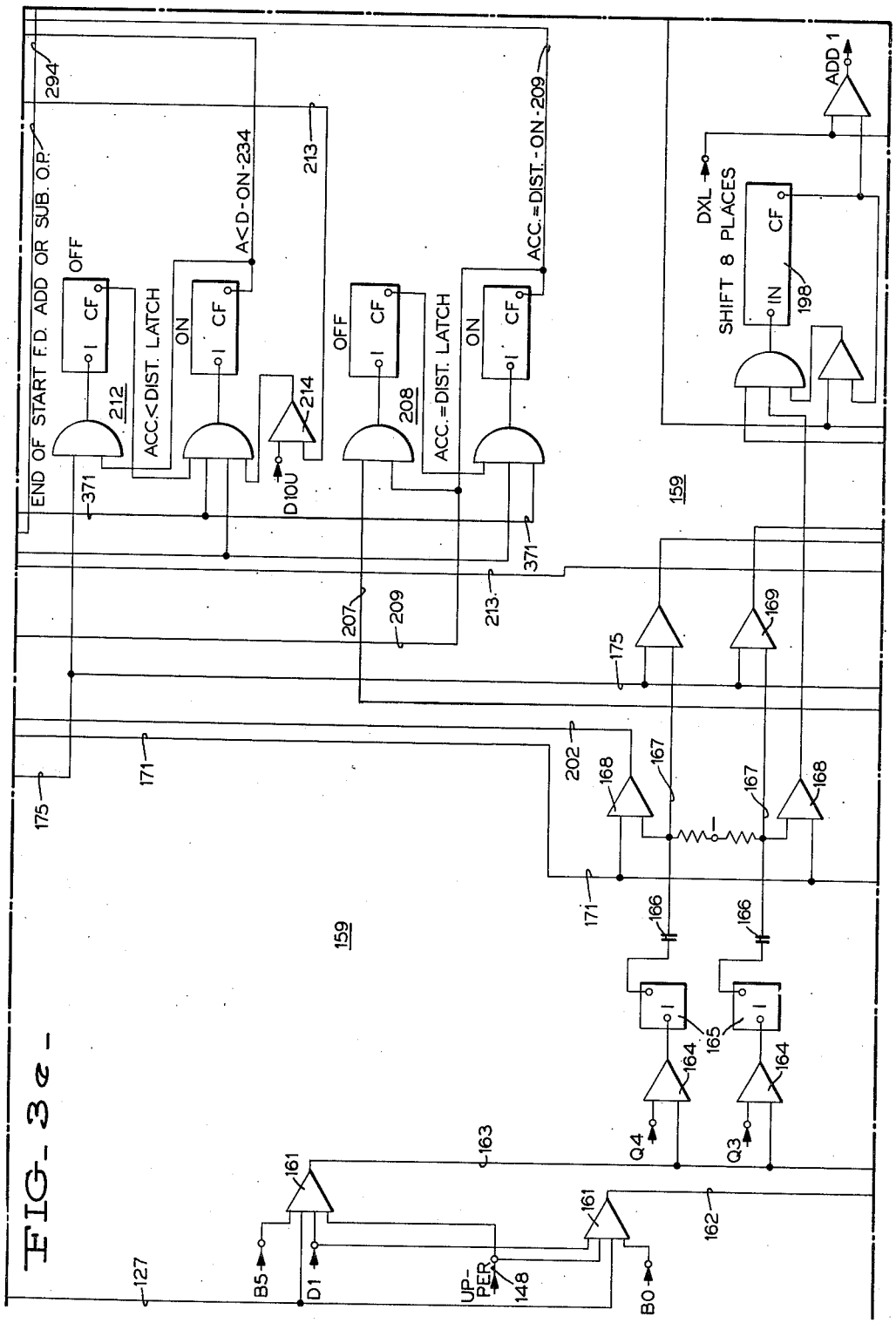

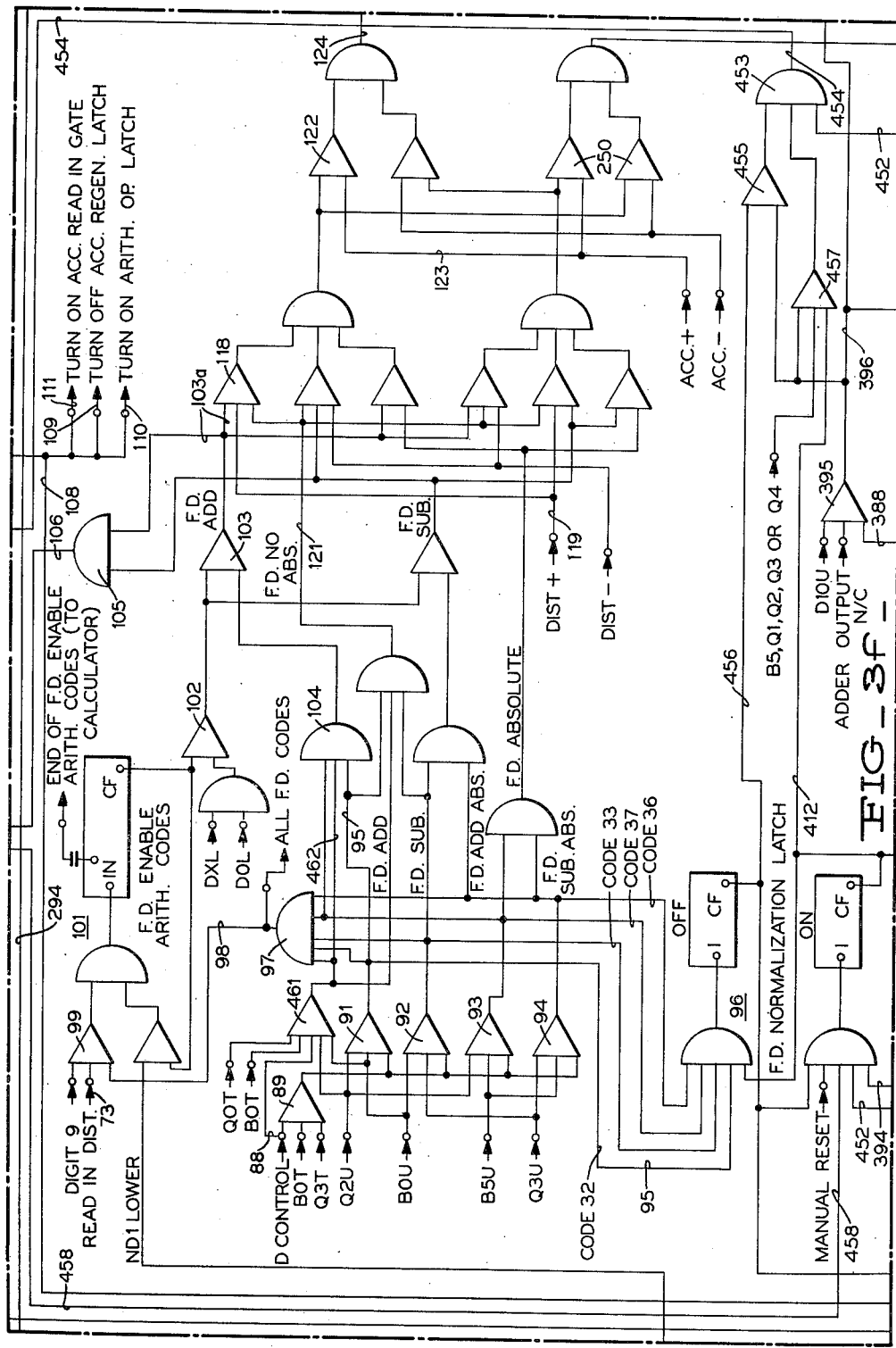

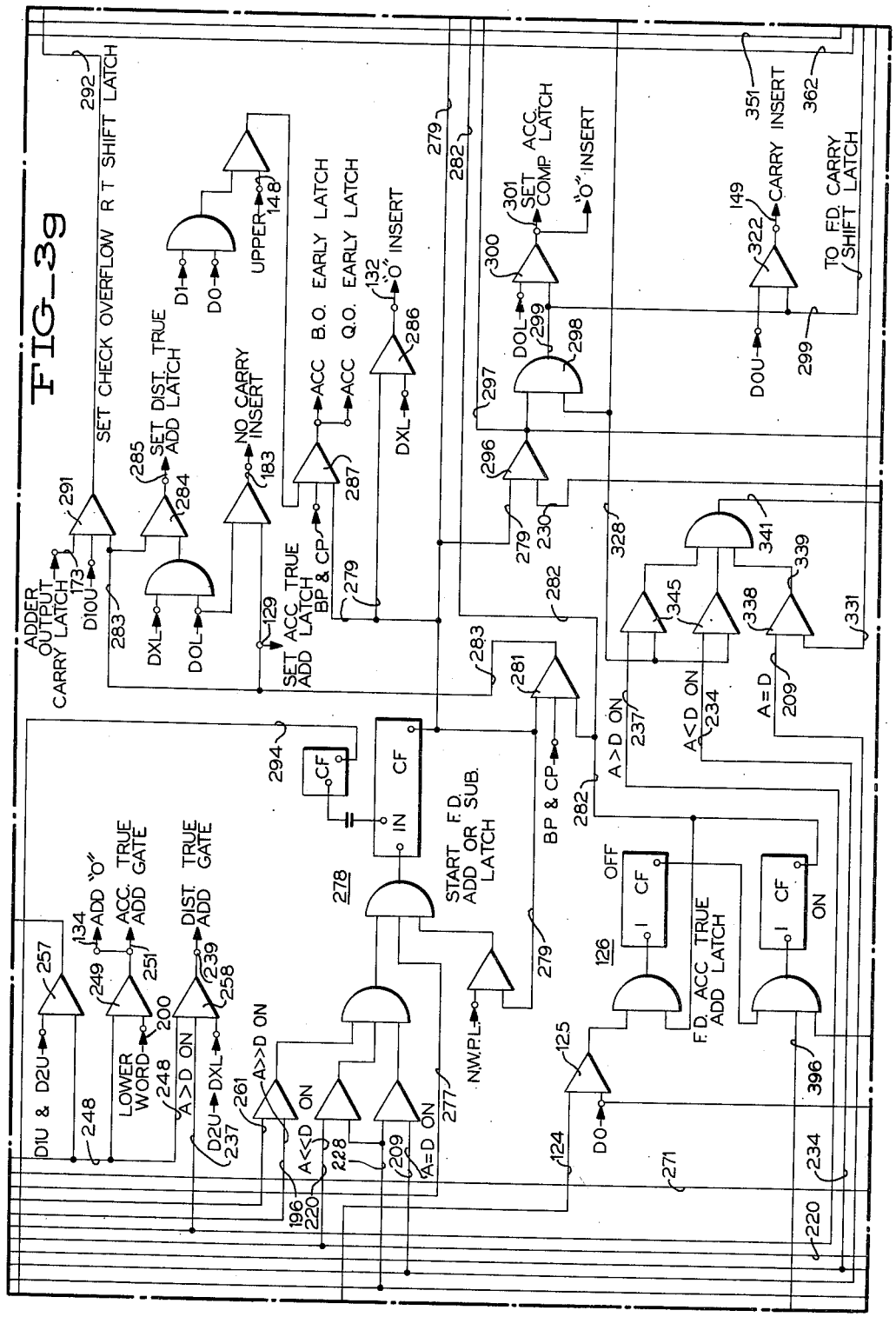
FIG_3g

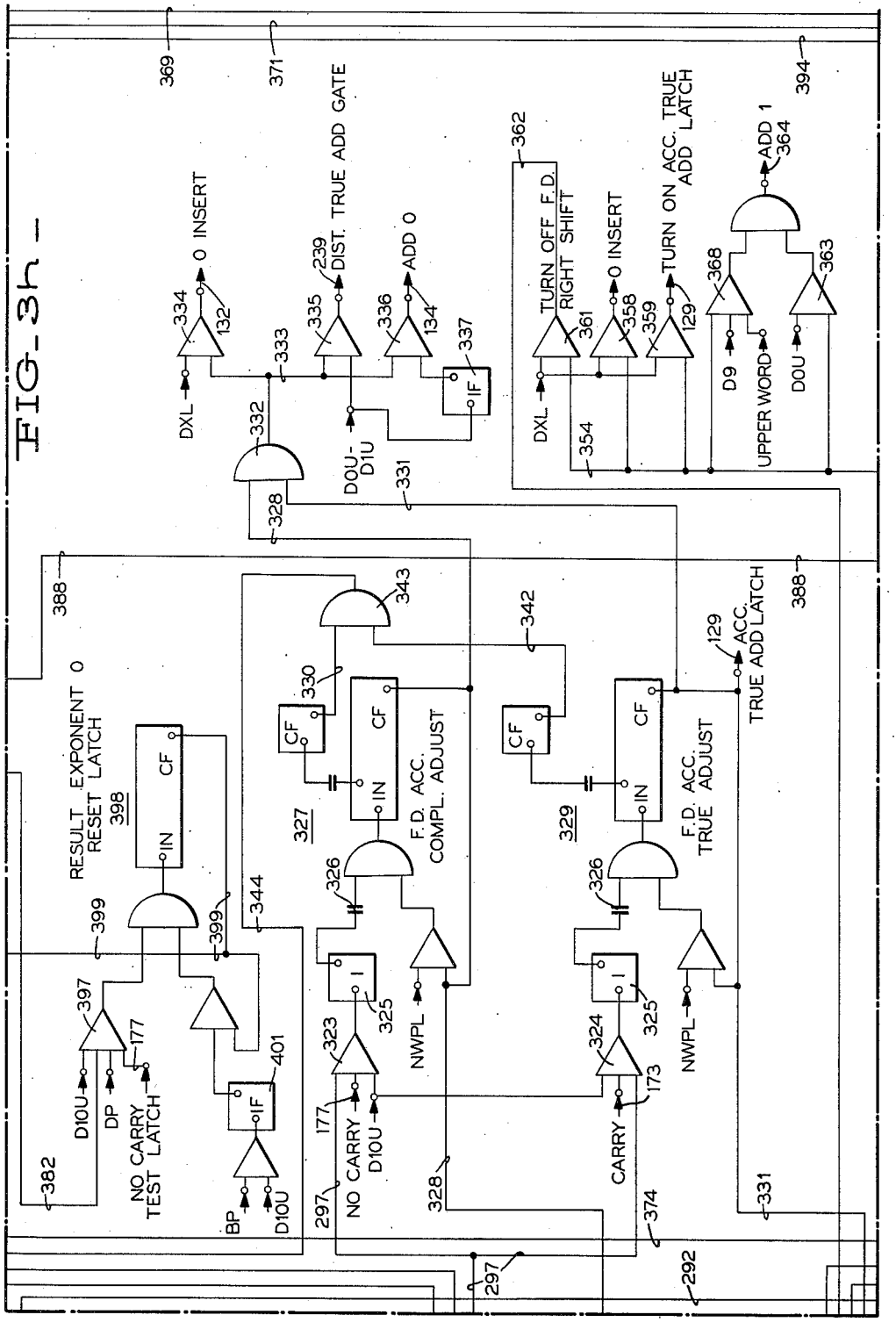

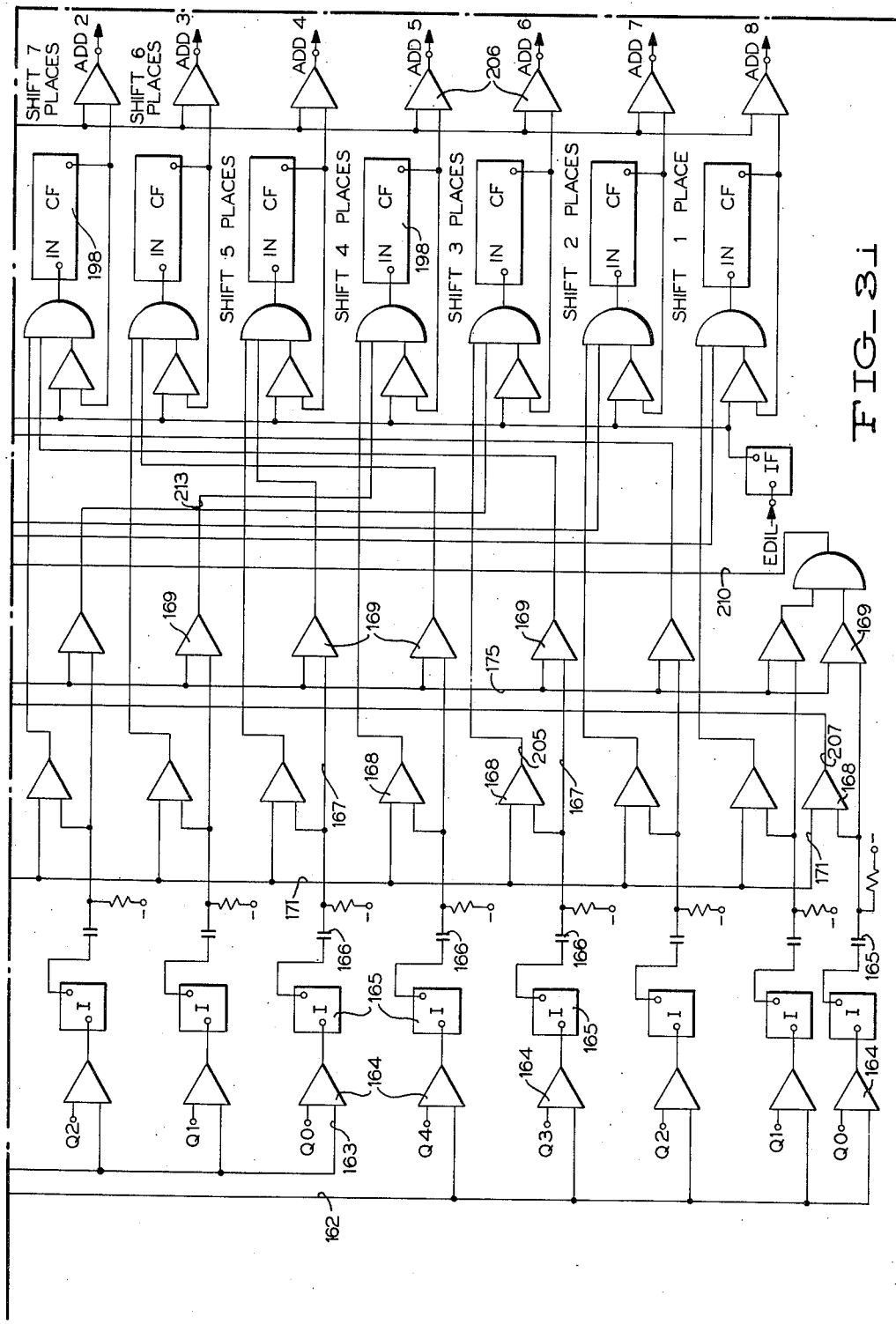

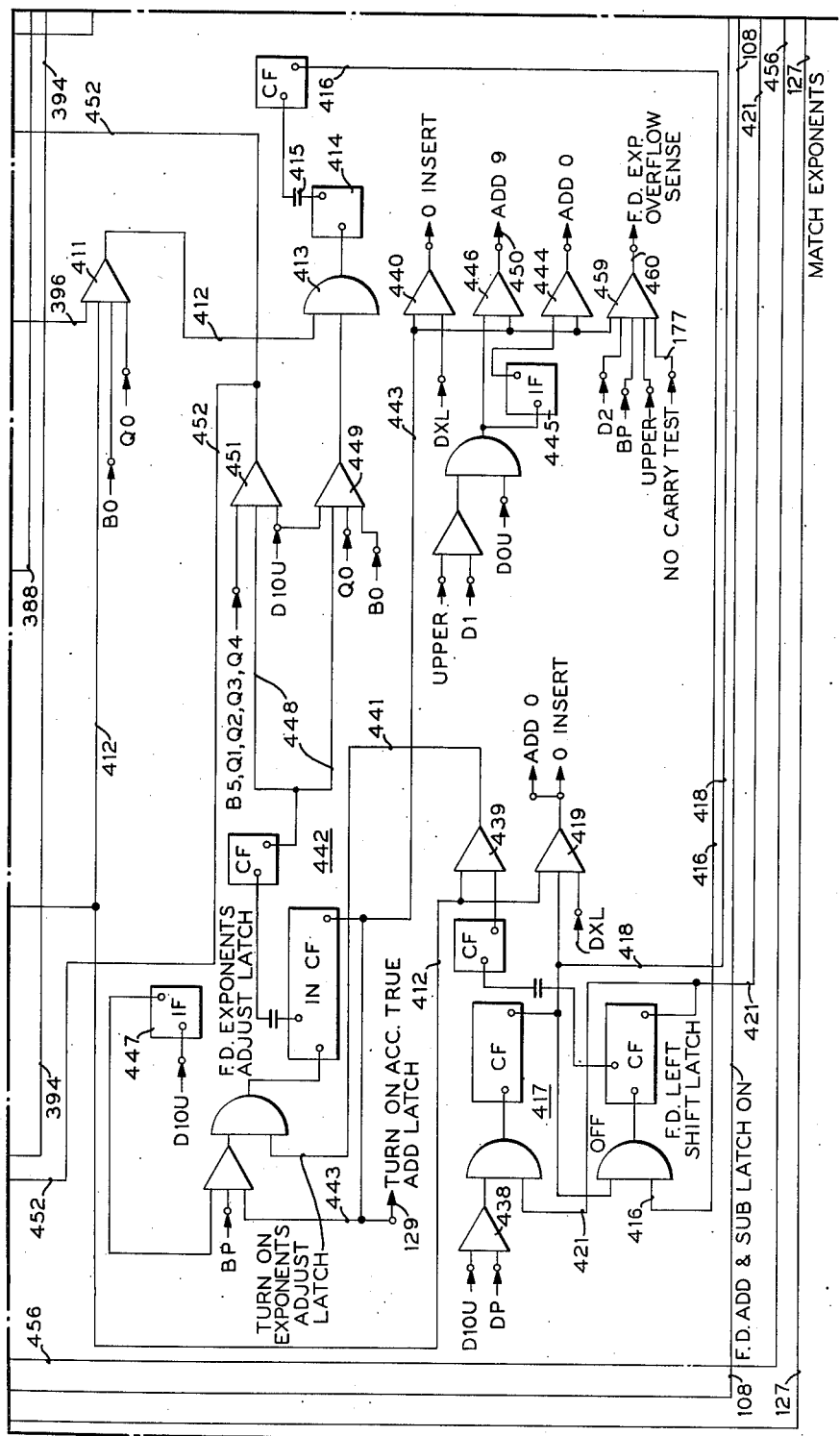
FIG_3j

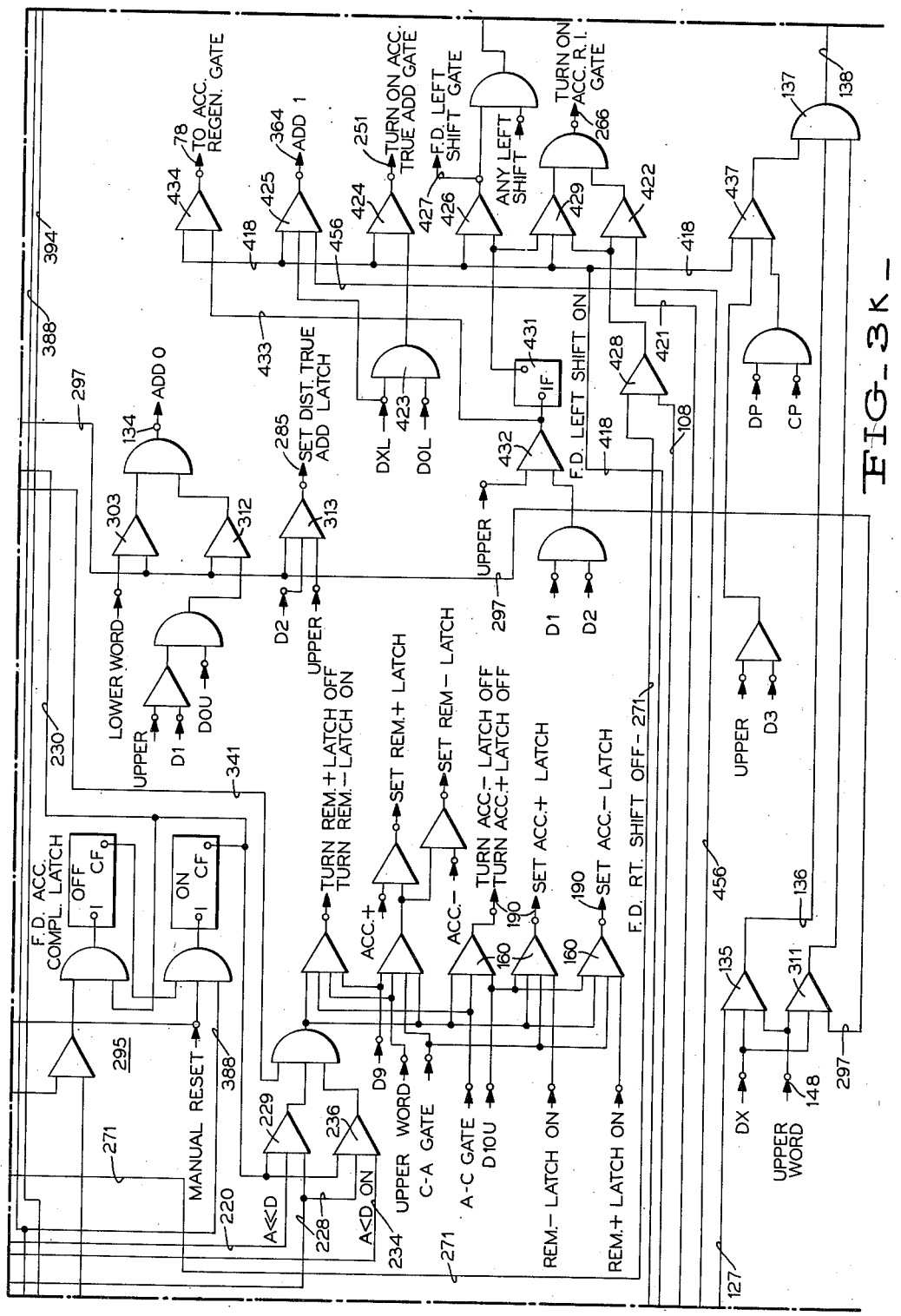

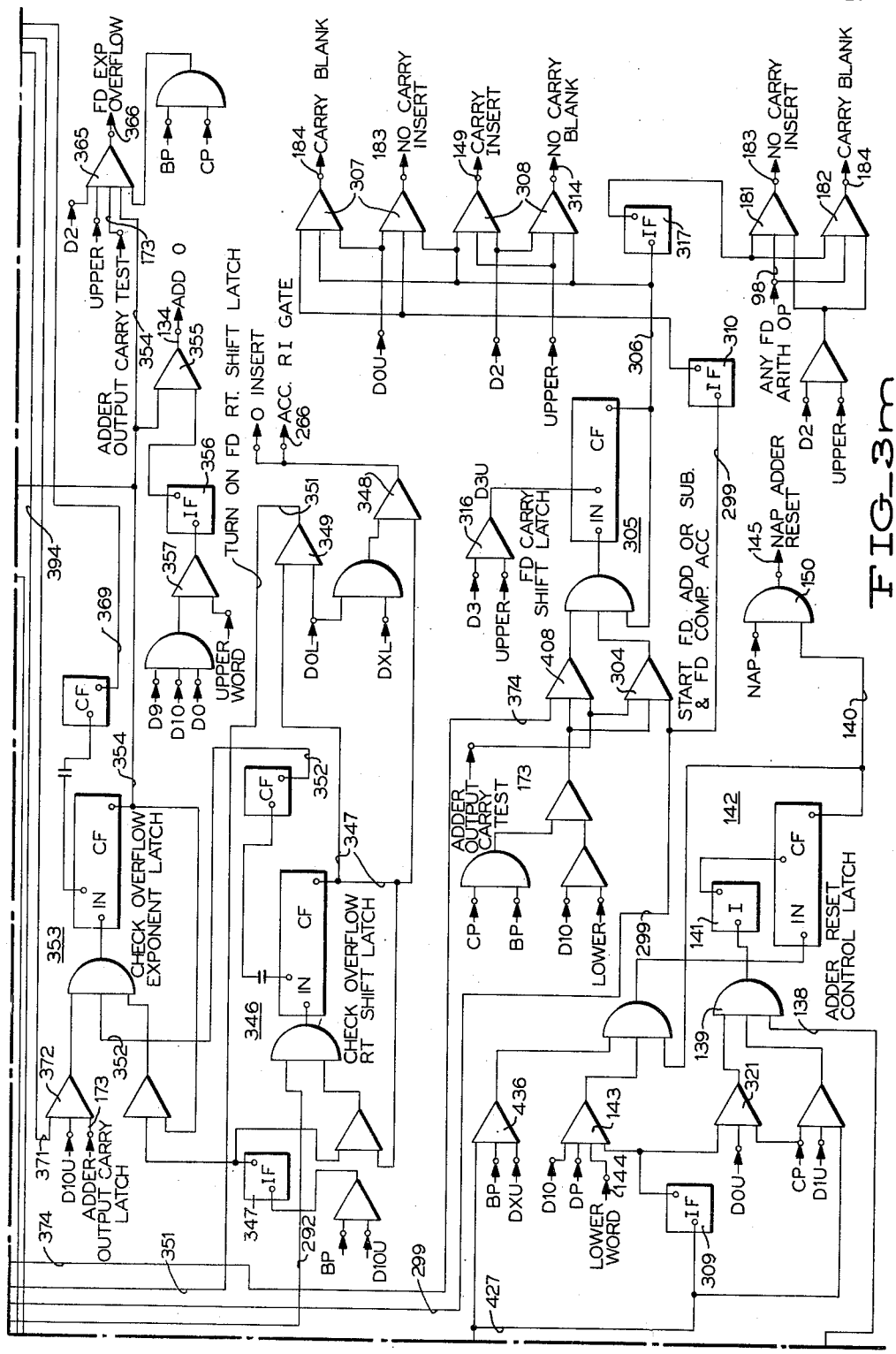

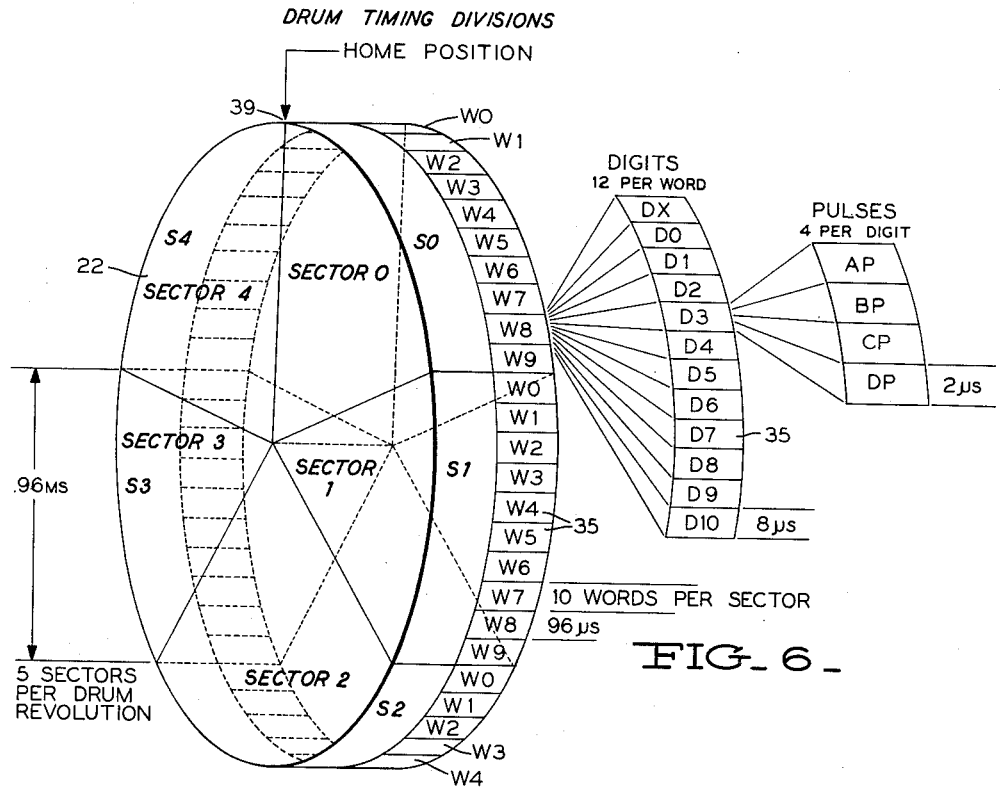

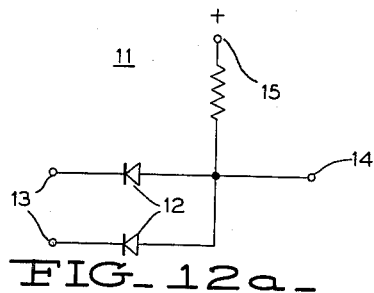
FIG_12a_
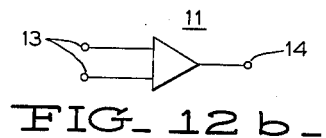
FIG_12b_
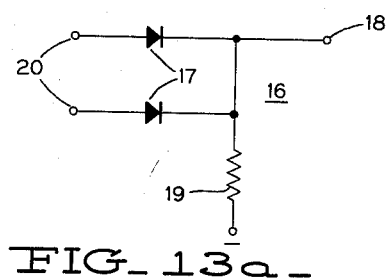
FIG_13a_
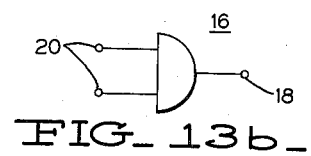
FIG_13b_
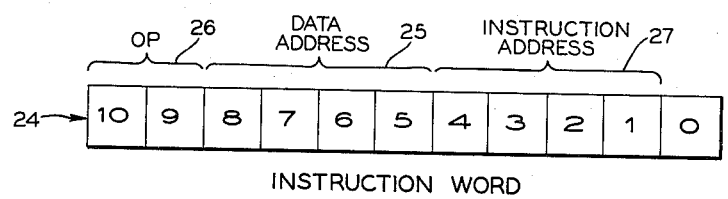
INSTRUCTION WORD
FIG_11_

FIG. 14

CODE 32 F.D. ADD
ACC. > DIST.

ACC. +.3458963259
DIST. +.2461784856

| OPERATIONS | | 10 | 9 | 8 | 7 | 6 | 5 | 4 | 3 | 2 | 1 | | 10 | 9 | 8 | 7 | 6 | 5 | 4 | 3 | 2 | 1 | 0 | X |
|---|---|---|---|---|---|---|---|---|---|---|---|---|---|---|---|---|---|---|---|---|---|---|---|---|---|
| | 0 | 3 | 4 | 5 | 8 | 9 | 6 | 3 | 2 | 5 | 9 | | 0 | 0 | 0 | 0 | 0 | 0 | 0 | 0 | 0 | 0 | 0 | 0 |
| 1 MATCH EXP. | 2 | 3 | 4 | 5 | 8 | 9 | 6 | 3 | 2 | 0 | 3 | | 0 | 0 | 0 | 0 | 0 | 0 | 0 | 0 | 0 | 0 | 0 | 0 |
| 2 RESTORE EXP. | 4 | 3 | 4 | 5 | 8 | 9 | 6 | 3 | 2 | 5 | 9 | | 0 | 0 | 0 | 0 | 0 | 0 | 0 | 0 | 0 | 6 | 0 |
| 3 INTER- CHANGE | 6 | 2 | 4 | 6 | 1 | 7 | 8 | 4 | 8 | 0 | 0 | | 0 | 0 | 0 | 0 | 0 | 0 | 0 | 0 | 0 | 6 | 0 |
| 4 RT. SHIFT | 8 | 0 | 2 | 4 | 6 | 1 | 7 | 8 | 4 | | | | 8 | 0 | 0 | 0 | 0 | 0 | 0 | 0 | 0 | 7 | 0 |
| RT. SHIFT | 10 | 0 | 0 | 2 | 4 | 6 | 1 | 7 | 8 | | | | 4 | 8 | 0 | 0 | 0 | 0 | 0 | 0 | 0 | 8 | 0 |
| RT. SHIFT | 12 | 0 | 0 | 0 | 2 | 4 | 6 | 1 | 7 | | | | 8 | 4 | 8 | 0 | 0 | 0 | 0 | 0 | 0 | 9 | 0 |
| 5 ST. ADD OR SUB | 14 | 3 | 4 | 6 | 1 | 4 | 2 | 4 | 9 | 5 | 9 | | 8 | 4 | 8 | 0 | 0 | 0 | 0 | 0 | 0 | 0 | 0 |
| 6 ROUND | 16 | 3 | 4 | 6 | 1 | 4 | 2 | 5 | 0 | 5 | 9 | | 0 | 0 | 0 | 0 | 0 | 0 | 0 | 0 | 0 | 0 | 0 |

RESULT (44 / 43)

ACC. + | 3 | 4 | 6 | 1 | 4 | 2 | 5 | 0 | 5 | 9 | | 0 | 0 | 0 | 0 | 0 | 0 | 0 | 0 | 0 | 0 | 0 | 0 |

DIST. + | 3 | 4 | 5 | 8 | 9 | 6 | 3 | 2 | 5 | 9 | (34)

FIG. 15

CODE 32 F.D. ADD
ACC. < DIST.

ACC. +.3458963256
DIST. −.2461734859

| OPERATIONS | | 10 | 9 | 8 | 7 | 6 | 5 | 4 | 3 | 2 | 1 | | 10 | 9 | 8 | 7 | 6 | 5 | 4 | 3 | 2 | 1 | 0 | X |
|---|---|---|---|---|---|---|---|---|---|---|---|---|---|---|---|---|---|---|---|---|---|---|---|---|---|
| | 0 | 3 | 4 | 5 | 8 | 9 | 6 | 3 | 2 | 5 | 6 | | 0 | 0 | 0 | 0 | 0 | 0 | 0 | 0 | 0 | 0 | 0 | 0 |
| 1 MATCH EXP. | 2 | 3 | 4 | 5 | 8 | 9 | 6 | 3 | 2 | 9 | 7 | | 0 | 0 | 0 | 0 | 0 | 0 | 0 | 0 | 0 | 0 | 0 | 0 |
| 2 RESTORE EXP. | 4 | 3 | 4 | 5 | 8 | 9 | 6 | 3 | 2 | 0 | 0 | | 0 | 0 | 0 | 0 | 0 | 0 | 0 | 0 | 0 | 6 | 0 |
| 3 RT. SHIFT | 6 | 0 | 3 | 4 | 5 | 8 | 9 | 6 | 3 | | | | 2 | 0 | 0 | 0 | 0 | 0 | 0 | 0 | 0 | 7 | 0 |
| RT. SHIFT | 8 | 0 | 0 | 3 | 4 | 5 | 8 | 9 | 6 | | | | 3 | 2 | 0 | 0 | 0 | 0 | 0 | 0 | 0 | 8 | 0 |
| RT. SHIFT | 10 | 0 | 0 | 0 | 3 | 4 | 5 | 8 | 9 | | | | 6 | 3 | 2 | 0 | 0 | 0 | 0 | 0 | 0 | 9 | 0 |
| 4 ST. ADD OR SUB. | 12 | 2 | 4 | 5 | 8 | 2 | 7 | 5 | 8 | 5 | 9 | | 3 | 6 | 8 | 0 | 0 | 0 | 0 | 0 | 0 | 0 | 0 |
| 5 ROUND | 14 | 2 | 4 | 5 | 8 | 2 | 7 | 5 | 8 | 5 | 9 | | 0 | 0 | 0 | 0 | 0 | 0 | 0 | 0 | 0 | 0 | 0 |

RESULT (44 / 43)

ACC. − | 2 | 4 | 5 | 8 | 2 | 7 | 5 | 8 | 5 | 9 | | 0 | 0 | 0 | 0 | 0 | 0 | 0 | 0 | 0 | 0 | 0 | 0 |

DIST. − | 2 | 4 | 6 | 1 | 7 | 3 | 4 | 8 | 5 | 9 | (34)

June 5, 1962      H. M. SIERRA      3,037,701
FLOATING DECIMAL POINT ARITHMETIC CONTROL MEANS FOR CALCULATOR
Filed Nov. 21, 1956      32 Sheets-Sheet 22

CODE 37 F.D. ADD ABSOLUTE      ACC.+.9973561458
OVERFLOW WHEN ADDING      DIST.-.4281754356

OPERATIONS

| | | 10 | 9 | 8 | 7 | 6 | 5 | 4 | 3 | 2 | 1 | | 10 | 9 | 8 | 7 | 6 | 5 | 4 | 3 | 2 | 1 | 0 | X |
|---|---|---|---|---|---|---|---|---|---|---|---|---|---|---|---|---|---|---|---|---|---|---|---|---|
| | 0 | 9 | 9 | 7 | 3 | 5 | 6 | 1 | 4 | 5 | 8 | | 0 | 0 | 0 | 0 | 0 | 0 | 0 | 0 | 0 | 0 | 0 | 0 |
| 1 MATCH EXP. | 2 | 9 | 9 | 7 | 3 | 5 | 6 | 1 | 4 | 0 | 2 | | 0 | 0 | 0 | 0 | 0 | 0 | 0 | 0 | 0 | 0 | 0 | 0 |
| 2 RESTORE EXP. | 4 | 9 | 9 | 7 | 3 | 5 | 6 | 1 | 4 | 5 | 8 | | 0 | 0 | 0 | 0 | 0 | 0 | 0 | 0 | 0 | 7 | 0 | |
| 3 INTER-CHANGE | 6 | 4 | 2 | 8 | 1 | 7 | 5 | 4 | 3 | 0 | 0 | | 0 | 0 | 0 | 0 | 0 | 0 | 0 | 0 | 0 | 7 | 0 | |
| 4 RT. SHIFT | 8 | 0 | 4 | 2 | 8 | 1 | 7 | 5 | 4 | | | | 3 | 0 | 0 | 0 | 0 | 0 | 0 | 0 | 0 | 8 | 0 | |
| RT. SHIFT | 10 | 0 | 0 | 4 | 2 | 8 | 1 | 7 | 5 | | | | 4 | 3 | 0 | 0 | 0 | 0 | 0 | 0 | 0 | 9 | 0 | |
| 5 ST. ADD OR SUB. | 12 | 0 | 0 | 1 | 6 | 3 | 7 | 8 | 9 | 5 | 8 | | 4 | 3 | 0 | 0 | 0 | 0 | 0 | 0 | 0 | 0 | 0 | |
| 6 CHK. OVFL. RT. SHIFT | 14 | 0 | 0 | 0 | 1 | 6 | 3 | 7 | 8 | 5 | 8 | | 9 | 4 | 3 | 0 | 0 | 0 | 0 | 0 | 0 | 0 | 0 | |
| CHK. OVFL. EXP. | 16 | 1 | 0 | 0 | 1 | 6 | 3 | 7 | 8 | 5 | 9 | | 9 | 4 | 3 | 0 | 0 | 0 | 0 | 0 | 0 | 0 | 0 | |
| 7 ROUND | 18 | 1 | 0 | 0 | 1 | 6 | 3 | 7 | 9 | 5 | 9 | | 0 | 0 | 0 | 0 | 0 | 0 | 0 | 0 | 0 | 0 | 0 | |

44      RESULT      43

ACC.+ | 1 | 0 | 0 | 1 | 6 | 3 | 7 | 9 | 5 | 9 | | 0 | 0 | 0 | 0 | 0 | 0 | 0 | 0 | 0 | 0 | 0 |

DIST.+ | 9 | 9 | 7 | 6 | 5 | 6 | 1 | 4 | 5 | 8 |    FIG_16 _

CODE 37 F.D. ADD ABSOLUTE      ACC.+.9999634655
OVERFLOW WHEN ROUNDING      DIST.+.3653673451

OPERATIONS

| | | 10 | 9 | 8 | 7 | 6 | 5 | 4 | 3 | 2 | 1 | | 10 | 9 | 8 | 7 | 6 | 5 | 4 | 3 | 2 | 1 | 0 | X |
|---|---|---|---|---|---|---|---|---|---|---|---|---|---|---|---|---|---|---|---|---|---|---|---|---|
| | 0 | 9 | 9 | 9 | 9 | 6 | 3 | 4 | 6 | 5 | 5 | | 0 | 0 | 0 | 0 | 0 | 0 | 0 | 0 | 0 | 0 | 0 | 0 |
| 1 MATCH EXP. | 2 | 9 | 9 | 9 | 9 | 6 | 3 | 4 | 6 | 0 | 4 | | 0 | 0 | 0 | 0 | 0 | 0 | 0 | 0 | 0 | 0 | 0 | 0 |
| 2 RESTORE EXP. | 4 | 9 | 9 | 9 | 9 | 6 | 3 | 4 | 6 | 5 | 5 | | 0 | 0 | 0 | 0 | 0 | 0 | 0 | 0 | 0 | 5 | 0 | |
| 3 INTER-CHANGE | 6 | 3 | 6 | 5 | 3 | 6 | 7 | 3 | 4 | 0 | 0 | | 0 | 0 | 0 | 0 | 0 | 0 | 0 | 0 | 0 | 5 | 0 | |
| 4 RT. SHIFT | 8 | 0 | 3 | 6 | 5 | 3 | 6 | 7 | 3 | | | | 4 | 0 | 0 | 0 | 0 | 0 | 0 | 0 | 0 | 6 | 0 | |
| RT. SHIFT | 10 | 0 | 0 | 3 | 6 | 5 | 3 | 6 | 7 | | | | 3 | 4 | 0 | 0 | 0 | 0 | 0 | 0 | 0 | 7 | 0 | |
| RT. SHIFT | 12 | 0 | 0 | 0 | 3 | 6 | 5 | 3 | 6 | | | | 7 | 3 | 4 | 0 | 0 | 0 | 0 | 0 | 0 | 8 | 0 | |
| RT. SHIFT | 14 | 0 | 0 | 0 | 0 | 3 | 6 | 5 | 3 | | | | 6 | 7 | 3 | 4 | 0 | 0 | 0 | 0 | 0 | 9 | 0 | |
| 5 ST. ADD OR SUB. | 16 | 9 | 9 | 9 | 9 | 9 | 9 | 9 | 9 | 5 | 5 | | 6 | 7 | 3 | 4 | 0 | 0 | 0 | 0 | 0 | 0 | 0 | |
| 6 ROUND | 18 | 0 | 0 | 0 | 0 | 0 | 0 | 0 | 0 | 5 | 5 | | 0 | 0 | 0 | 0 | 0 | 0 | 0 | 0 | 0 | 0 | 0 | |
| 7 CHK. OVFL. EXP. | 20 | 1 | 0 | 0 | 0 | 0 | 0 | 0 | 0 | 5 | 6 | | 0 | 0 | 0 | 0 | 0 | 0 | 0 | 0 | 0 | 0 | 0 | |
| 8 ROUND | 22 | 1 | 0 | 0 | 0 | 0 | 0 | 0 | 0 | 5 | 6 | | 0 | 0 | 0 | 0 | 0 | 0 | 0 | 0 | 0 | 0 | 0 | |

44      RESULT      43

ACC.+ | 1 | 0 | 0 | 0 | 0 | 0 | 0 | 0 | 5 | 6 | | 0 | 0 | 0 | 0 | 0 | 0 | 0 | 0 | 0 | 0 | 0 |

DIST.+ | 9 | 9 | 9 | 9 | 6 | 3 | 4 | 6 | 5 | 5 |    FIG_17 _

June 5, 1962  H. M. SIERRA  3,037,701
FLOATING DECIMAL POINT ARITHMETIC CONTROL MEANS FOR CALCULATOR
Filed Nov. 21, 1956  32 Sheets-Sheet 23

FIG. 18 — CODE 38 F.D. SUB. ABSOLUTE NORMALIZATION AFTER ROUNDING
ACC.+.8214782154
DIST.+.1006521457

| Operation | Step | 10 | 9 | 8 | 7 | 6 | 5 | 4 | 3 | 2 | 1 | 10 | 9 | 8 | 7 | 6 | 5 | 4 | 3 | 2 | 1 | 0 | X |
|---|---|---|---|---|---|---|---|---|---|---|---|---|---|---|---|---|---|---|---|---|---|---|---|
|  | 0 | 8 | 2 | 1 | 4 | 7 | 8 | 2 | 1 | 5 | 4 | 0 | 0 | 0 | 0 | 0 | 0 | 0 | 0 | 0 | 0 | 0 | 0 |
| 1 MATCH EXP. | 2 | 8 | 2 | 1 | 4 | 7 | 8 | 2 | 1 | 9 | 7 | 0 | 0 | 0 | 0 | 0 | 0 | 0 | 0 | 0 | 0 | 0 | 0 |
| 2 RESTORE EXP. | 4 | 8 | 2 | 1 | 4 | 7 | 8 | 2 | 1 | 0 | 0 | 0 | 0 | 0 | 0 | 0 | 0 | 0 | 0 | 0 | 0 | 6 | 0 |
| 3 RT. SHIFT | 6 | 0 | 8 | 2 | 1 | 4 | 7 | 8 | 2 |  |  | 1 | 0 | 0 | 0 | 0 | 0 | 0 | 0 | 0 | 0 | 7 | 0 |
| RT. SHIFT | 8 | 0 | 0 | 8 | 2 | 1 | 4 | 7 | 8 |  |  | 2 | 1 | 0 | 0 | 0 | 0 | 0 | 0 | 0 | 0 | 8 | 0 |
| RT. SHIFT | 10 | 0 | 0 | 0 | 8 | 2 | 1 | 4 | 7 |  |  | 8 | 2 | 1 | 0 | 0 | 0 | 0 | 0 | 0 | 0 | 9 | 0 |
| 4 ST. ADD OR SUB | 12 | 0 | 9 | 9 | 8 | 3 | 0 | 6 | 6 | 5 | 7 | 1 | 7 | 9 | 0 | 0 | 0 | 0 | 0 | 0 | 0 | 0 | 0 |
| 5 ROUND | 14 | 0 | 9 | 9 | 8 | 3 | 0 | 6 | 6 | 5 | 7 | 0 | 0 | 0 | 0 | 0 | 0 | 0 | 0 | 0 | 0 | 0 | 0 |
| 6 NORMALIZE | 16 | 9 | 9 | 8 | 3 | 0 | 6 | 6 | 0 | 5 | 7 | 0 | 0 | 0 | 0 | 0 | 0 | 0 | 0 | 0 | 0 | 0 | 0 |
| 7 EXP. ADJUST | 18 | 9 | 9 | 8 | 3 | 0 | 6 | 6 | 0 | 5 | 6 | 0 | 0 | 0 | 0 | 0 | 0 | 0 | 0 | 0 | 0 | 0 | 0 |

RESULT
ACC.+ 9 9 8 3 0 6 6 0 5 6 | 0 0 0 0 0 0 0 0 0 0 0
DIST.+ 1 0 0 6 5 2 1 4 5 7

FIG. 19 — CODE 38 F.D. SUB. ABSOLUTE ACC. ≫ DIST.
ACC.+.6875392152
DIST.+.9365834643

| Operation | Step | 10 | 9 | 8 | 7 | 6 | 5 | 4 | 3 | 2 | 1 | 10 | 9 | 8 | 0 | X |
|---|---|---|---|---|---|---|---|---|---|---|---|---|---|---|---|---|
|  | 0 | 6 | 8 | 7 | 5 | 3 | 9 | 2 | 1 | 5 | 2 | 0 | 0 | 0 | 0 | 0 |
| 1 MATCH EXP. | 2 | 6 | 8 | 7 | 5 | 3 | 9 | 2 | 1 | 0 | 9 | 0 | 0 | 0 | 0 | 0 |
| 2 RESTORE EXP. | 4 | 6 | 8 | 7 | 5 | 3 | 9 | 2 | 1 | 5 | 2 | 0 | 0 | 0 | 0 | 0 |
| 3 INTERCHANGE | 6 | 0 | 0 | 0 | 0 | 0 | 0 | 0 | 0 | 0 |  | 0 | 0 | 0 | 0 | 0 |
| 4 ST. ADD OR SUB. | 8 | 6 | 8 | 7 | 5 | 3 | 9 | 2 | 1 | 5 | 2 | 0 | 0 | 0 | 0 | 0 |
| 5 ROUND | 10 | 6 | 8 | 7 | 5 | 3 | 9 | 2 | 1 | 5 | 2 | 0 | 0 | 0 | 0 | 0 |

RESULT
ACC.+ 6 8 7 5 3 9 2 1 5 2 | 0 0 0 | 0 0
DIST.+ 6 8 7 5 3 9 2 1 5 2

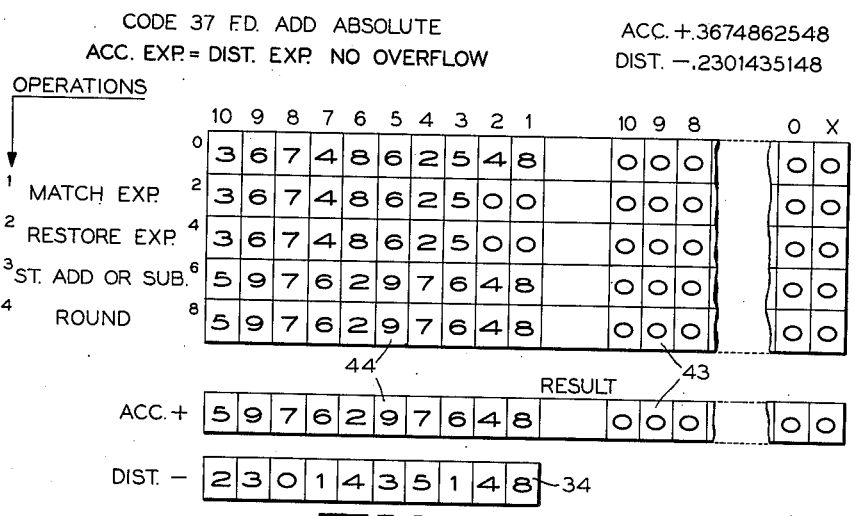
FIG_20_
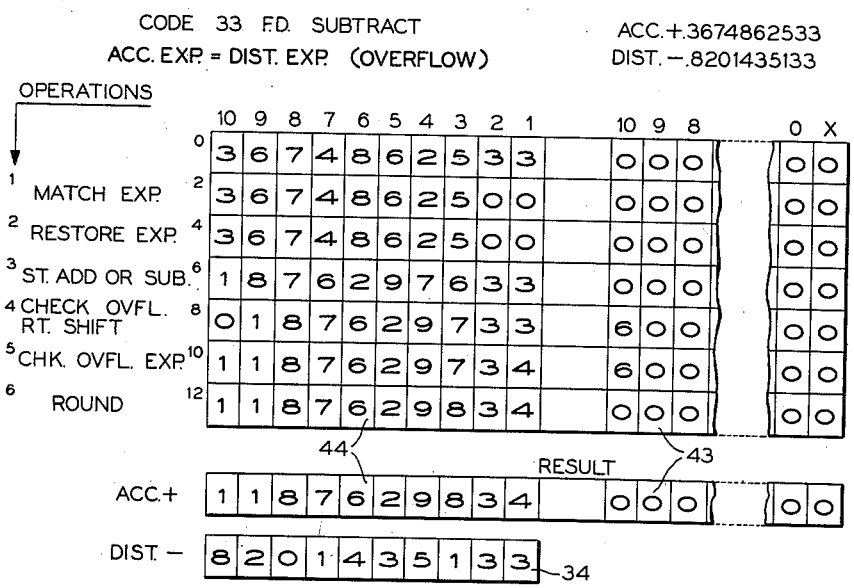
FIG_21_

June 5, 1962

H. M. SIERRA 3,037,701

FLOATING DECIMAL POINT ARITHMETIC CONTROL MEANS FOR CALCULATOR

Filed Nov. 21, 1956

CODE 32 F.D. ADD
ACC. EXP. = DIST. EXP.
ACC. MANT. > DIST. MANT.

ACC.+.4674862564
DIST.−.4672151364

| OPERATIONS | | 10 | 9 | 8 | 7 | 6 | 5 | 4 | 3 | 2 | 1 | | 10 | 9 | 8 | | 0 | X |
|---|---|---|---|---|---|---|---|---|---|---|---|---|---|---|---|---|---|---|
| | 0 | 4 | 6 | 7 | 4 | 8 | 6 | 2 | 5 | 6 | 4 | | 0 | 0 | 0 | | 0 | 0 |
| 1 MATCH EXP. | 2 | 4 | 6 | 7 | 4 | 8 | 6 | 2 | 5 | 0 | 0 | | 0 | 0 | 0 | | 0 | 0 |
| 2 RESTORE EXP. | 4 | 4 | 6 | 7 | 4 | 8 | 6 | 2 | 5 | 0 | 0 | | 0 | 0 | 0 | | 0 | 0 |
| 3 ST. ADD OR SUB. | 6 | 9 | 9 | 9 | 7 | 2 | 8 | 8 | 8 | 0 | 0 | | 0 | 0 | 0 | | 0 | 0 |
| 4 COMP. ADJUST | 8 | 0 | 0 | 0 | 2 | 7 | 1 | 1 | 2 | 6 | 4 | | 0 | 0 | 0 | | 0 | 0 |
| 5 ROUND | 10 | 0 | 0 | 0 | 2 | 7 | 1 | 1 | 2 | 6 | 4 | | 0 | 0 | 0 | | 0 | 0 |
| 6 NORMALIZATION LFT. SHIFT | 12 | 0 | 0 | 2 | 7 | 1 | 1 | 2 | 0 | 6 | 4 | | 0 | 0 | 0 | | 0 | 0 |
| CORRECT EXP. | 14 | 0 | 0 | 2 | 7 | 1 | 1 | 2 | 0 | 6 | 3 | | 0 | 0 | 0 | | 0 | 0 |
| LEFT SHIFT | 16 | 0 | 2 | 7 | 1 | 1 | 2 | 0 | 0 | 6 | 3 | | 0 | 0 | 0 | | 0 | 0 |
| CORRECT EXP. | 18 | 0 | 2 | 7 | 1 | 1 | 2 | 0 | 0 | 6 | 2 | | 0 | 0 | 0 | | 0 | 0 |
| LEFT SHIFT | 20 | 2 | 7 | 1 | 1 | 2 | 0 | 0 | 0 | 6 | 2 | | 0 | 0 | 0 | | 0 | 0 |
| CORRECT EXP. | 22 | 2 | 7 | 1 | 1 | 2 | 0 | 0 | 0 | 6 | 1 | | 0 | 0 | 0 | | 0 | 0 |
| ACC. + | | 2 | 7 | 1 | 1 | 2 | 0 | 0 | 0 | 6 | 1 | | 0 | 0 | 0 | | 0 | 0 |
| DIST. − | | 4 | 6 | 7 | 2 | 1 | 5 | 1 | 3 | 6 | 4 | | | | | | | |

FIG_22_

CODE 37 F.D. ADD ABSOLUTE
ACC. ≪ DIST.

ACC.+.6875392153
DIST.−.9365834562

| OPERATIONS | | 10 | 9 | 8 | 7 | 6 | 5 | 4 | 3 | 2 | 1 | | 10 | 9 | 8 | | 0 | X |
|---|---|---|---|---|---|---|---|---|---|---|---|---|---|---|---|---|---|---|
| | 0 | 6 | 8 | 7 | 5 | 3 | 9 | 2 | 1 | 5 | 3 | | 0 | 0 | 0 | | 0 | 0 |
| 1 MATCH EXP. | 2 | 6 | 8 | 7 | 5 | 3 | 9 | 2 | 1 | 9 | 0 | | 0 | 0 | 0 | | 0 | 0 |
| 2 RESTORE EXP. | 4 | 0 | 0 | 0 | 0 | 0 | 0 | 0 | 0 | 0 | 0 | | 0 | 0 | 0 | | 0 | 0 |
| 3 ST. ADD OR SUB. | 6 | 9 | 3 | 6 | 5 | 8 | 3 | 4 | 5 | 6 | 2 | | 0 | 0 | 0 | | 0 | 0 |
| 4 ROUND | 8 | 9 | 3 | 6 | 5 | 8 | 3 | 4 | 5 | 6 | 2 | | 0 | 0 | 0 | | 0 | 0 |
| ACC. + | | 9 | 3 | 6 | 5 | 8 | 3 | 4 | 5 | 6 | 2 | | 0 | 0 | 0 | | 0 | 0 |
| DIST. − | | 9 | 3 | 6 | 5 | 8 | 3 | 4 | 5 | 6 | 2 | | | | | | | |

FIG_23_

June 5, 1962  H. M. SIERRA  3,037,701
FLOATING DECIMAL POINT ARITHMETIC CONTROL MEANS FOR CALCULATOR
Filed Nov. 21, 1956  32 Sheets-Sheet 26

CODE 33 F.D. SUBTRACT
ACC. EXP. = DIST. EXP.
ACC. MANT. < DIST. MANT.

ACC.+.3674862574
DIST. +.3678352174

OPERATIONS

| | | 10 | 9 | 8 | 7 | 6 | 5 | 4 | 3 | 2 | 1 | 10 | 9 | 8 | 0 | X |
|---|---|---|---|---|---|---|---|---|---|---|---|---|---|---|---|---|
| | 0 | 3 | 6 | 7 | 4 | 8 | 6 | 2 | 5 | 7 | 4 | 0 | 0 | 0 | 0 | 0 |
| 1 MATCH EXP. | 2 | 3 | 6 | 7 | 4 | 8 | 6 | 2 | 5 | 0 | 0 | 0 | 0 | 0 | 0 | 0 |
| 2 RESTORE EXP. | 4 | 3 | 6 | 7 | 4 | 8 | 6 | 2 | 5 | 0 | 0 | 0 | 0 | 0 | 0 | 0 |
| 3 ST. ADD OR SUB. | 6 | 0 | 0 | 0 | 3 | 4 | 8 | 9 | 6 | 0 | 0 | 0 | 0 | 0 | 0 | 0 |
| 4 TRUE ADJUST | 8 | 0 | 0 | 0 | 3 | 4 | 8 | 9 | 6 | 7 | 4 | 0 | 0 | 0 | 0 | 0 |
| 5 ROUND | 10 | 0 | 0 | 0 | 3 | 4 | 8 | 9 | 6 | 7 | 4 | 0 | 0 | 0 | 0 | 0 |
| 6 NORMALIZATION LEFT SHIFT | 12 | 0 | 0 | 3 | 4 | 8 | 9 | 6 | 0 | 7 | 4 | 0 | 0 | 0 | 0 | 0 |
| CORRECT EXP. | 14 | 0 | 0 | 3 | 4 | 8 | 9 | 6 | 0 | 7 | 3 | 0 | 0 | 0 | 0 | 0 |
| LEFT SHIFT | 16 | 0 | 3 | 4 | 8 | 9 | 6 | 0 | 0 | 7 | 3 | 0 | 0 | 0 | 0 | 0 |
| CORRECT EXP. | 18 | 0 | 3 | 4 | 8 | 9 | 6 | 0 | 0 | 7 | 2 | 0 | 0 | 0 | 0 | 0 |
| LEFT SHIFT | 20 | 3 | 4 | 8 | 9 | 6 | 0 | 0 | 0 | 7 | 2 | 0 | 0 | 0 | 0 | 0 |
| CORRECT EXP. | 22 | 3 | 4 | 8 | 9 | 6 | 0 | 0 | 0 | 7 | 1 | 0 | 0 | 0 | 0 | 0 |

RESULT

ACC. − | 3 | 4 | 8 | 9 | 6 | 0 | 0 | 0 | 7 | 1 | | 0 | 0 | 0 | | 0 | 0 |

DIST. + | 3 | 6 | 7 | 8 | 3 | 5 | 2 | 1 | 7 | 4 | -34

FIG_24_

| DECIMAL | BI-QUINARY | | | | | | |
|---|---|---|---|---|---|---|---|
| | B0 | B5 | Q0 | Q1 | Q2 | Q3 | Q4 |
| 0 | 1 | 0 | 1 | 0 | 0 | 0 | 0 |
| 1 | 1 | 0 | 0 | 1 | 0 | 0 | 0 |
| 2 | 1 | 0 | 0 | 0 | 1 | 0 | 0 |
| 3 | 1 | 0 | 0 | 0 | 0 | 1 | 0 |
| 4 | 1 | 0 | 0 | 0 | 0 | 0 | 1 |
| 5 | 0 | 1 | 1 | 0 | 0 | 0 | 0 |
| 6 | 0 | 1 | 0 | 1 | 0 | 0 | 0 |
| 7 | 0 | 1 | 0 | 0 | 1 | 0 | 0 |
| 8 | 0 | 1 | 0 | 0 | 0 | 1 | 0 |
| 9 | 0 | 1 | 0 | 0 | 0 | 0 | 1 |

FIG_25_

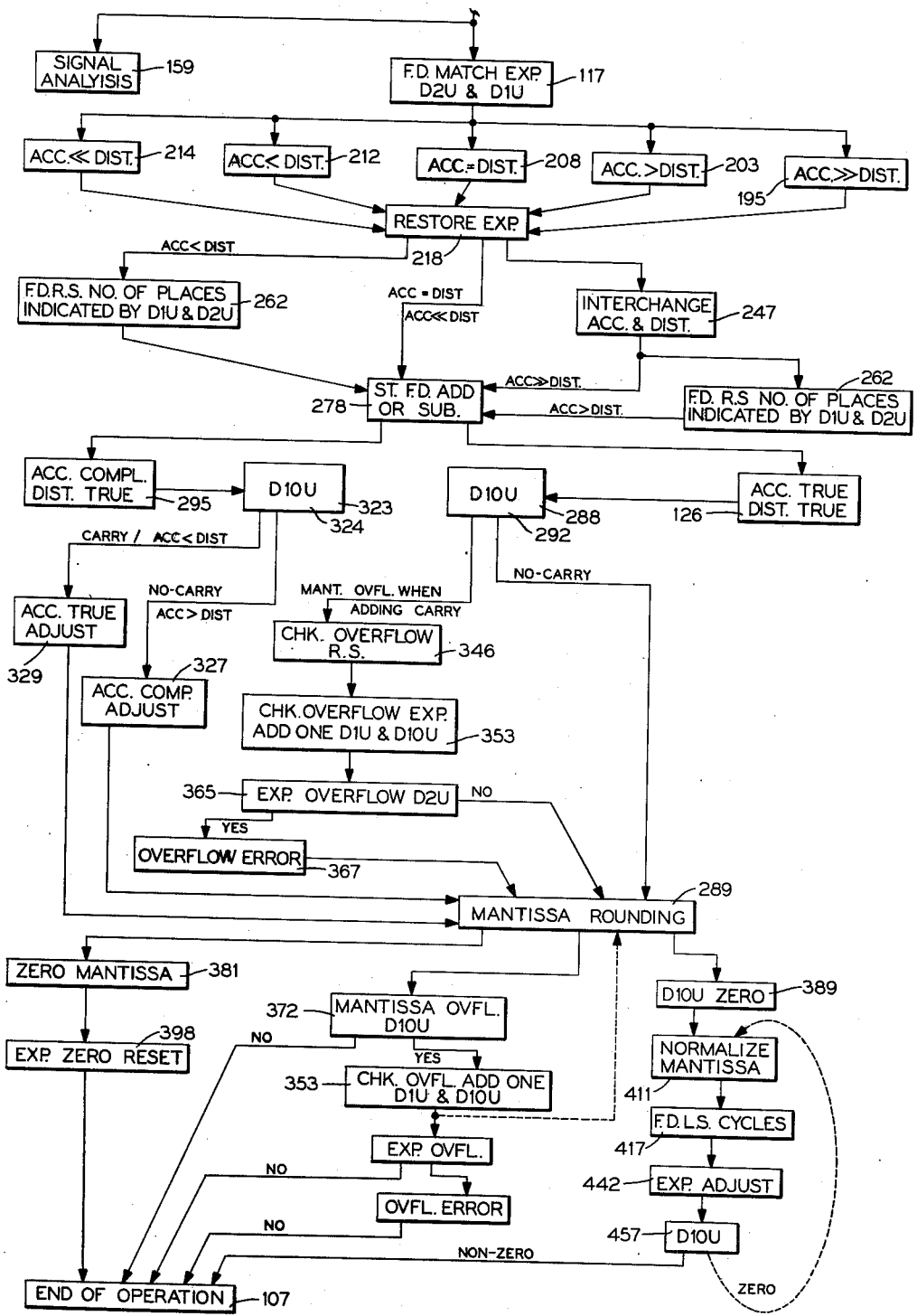
FIG_26_

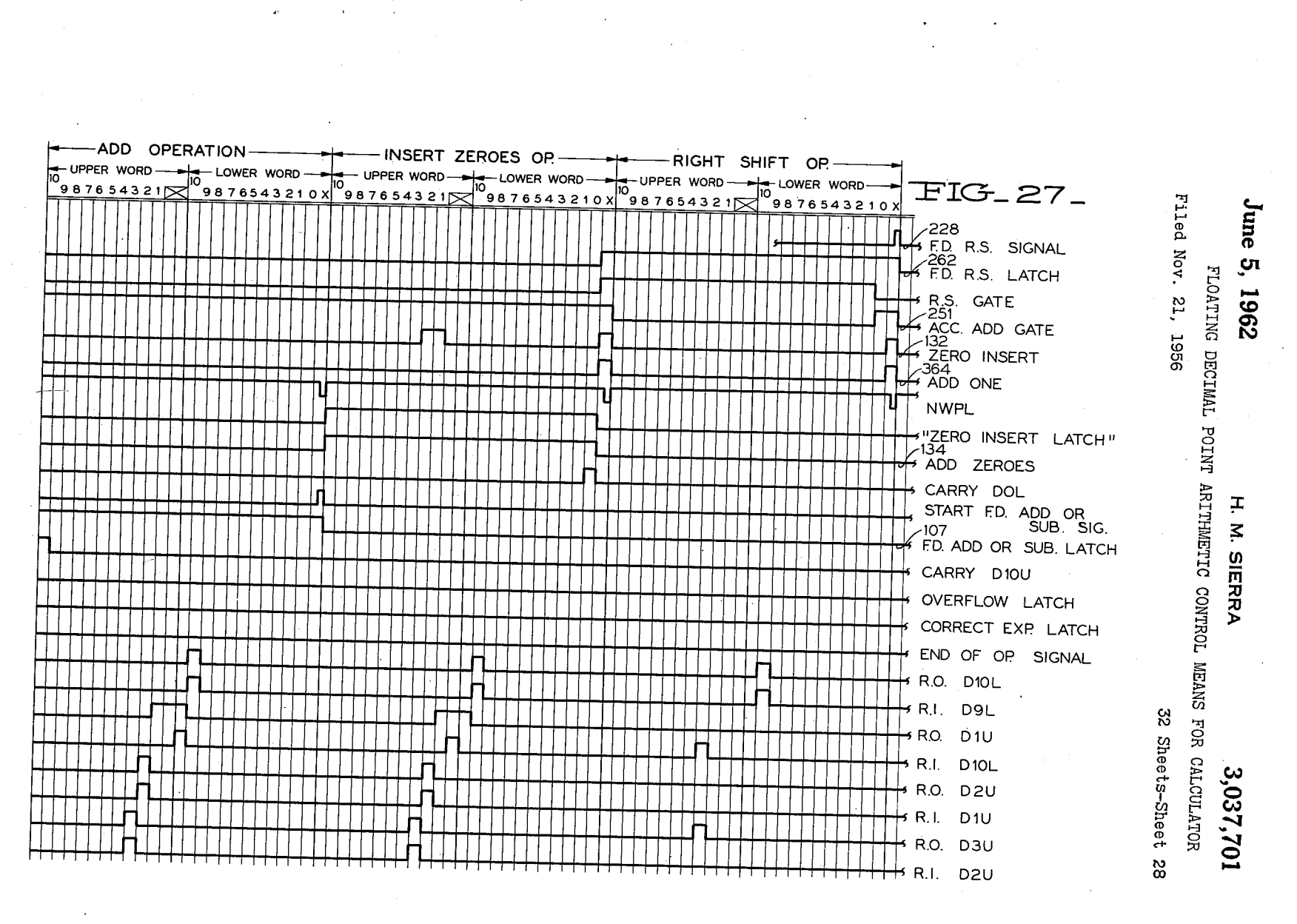

FIG_27

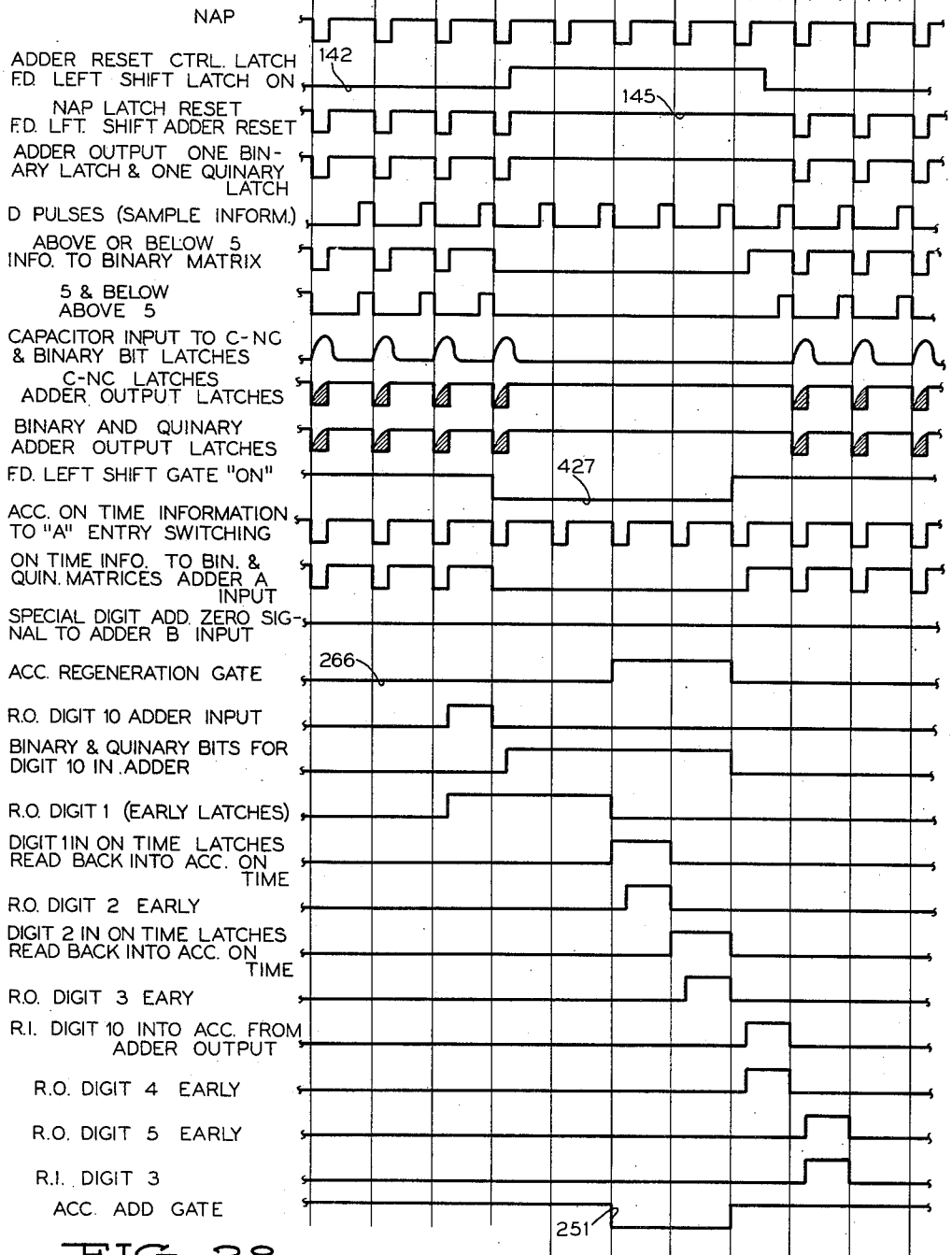
FIG-28-

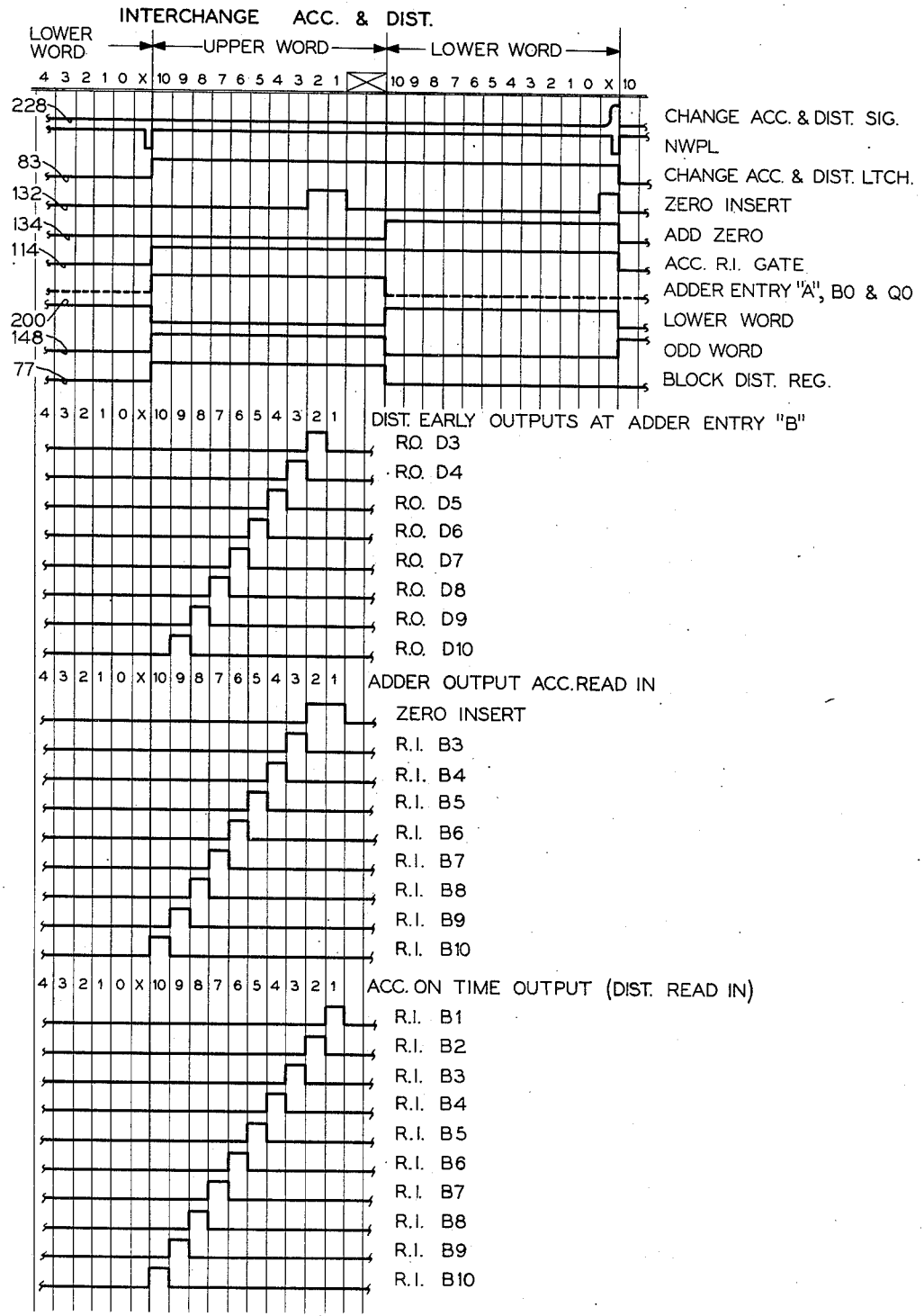
FIG_29_

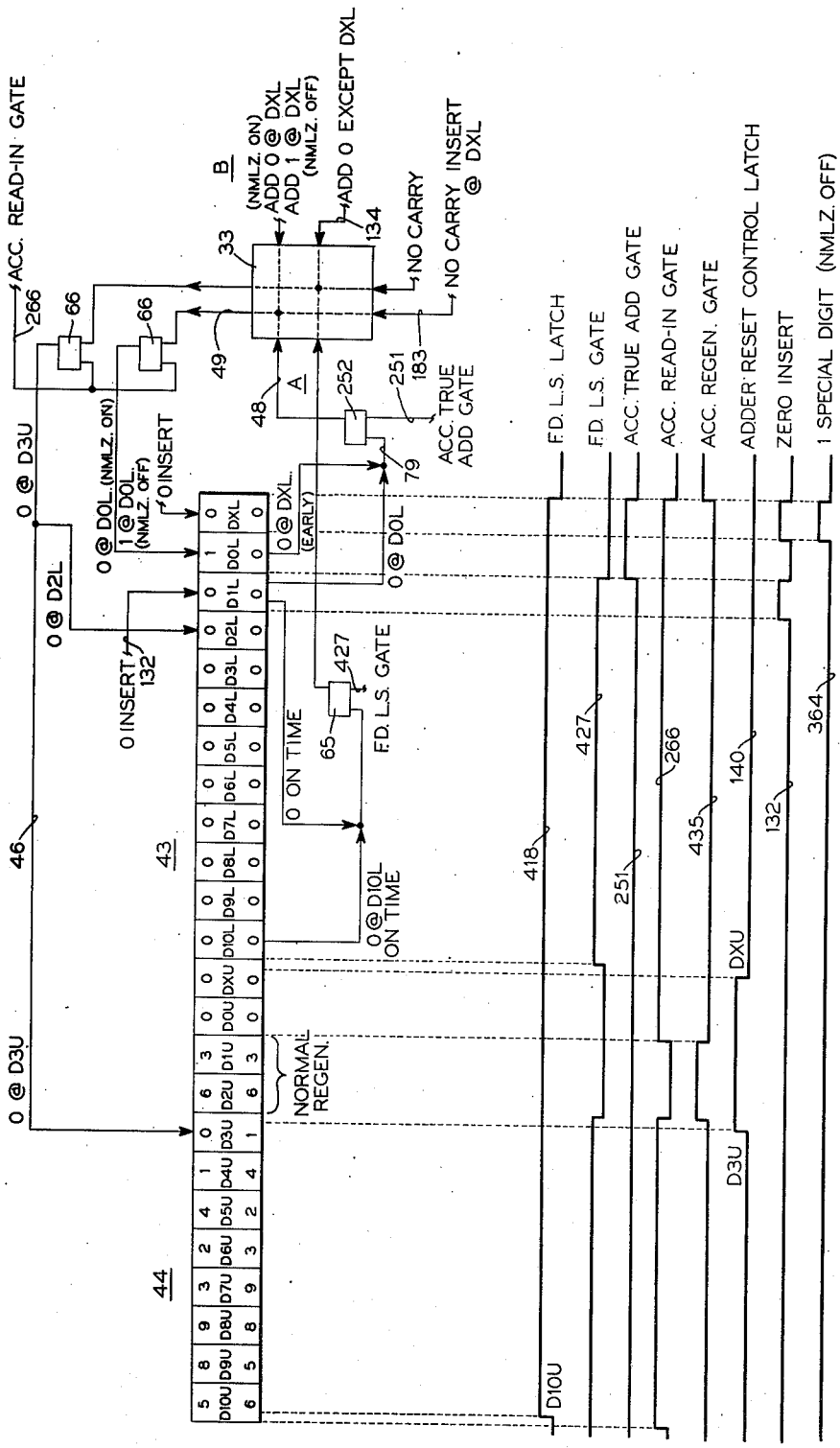

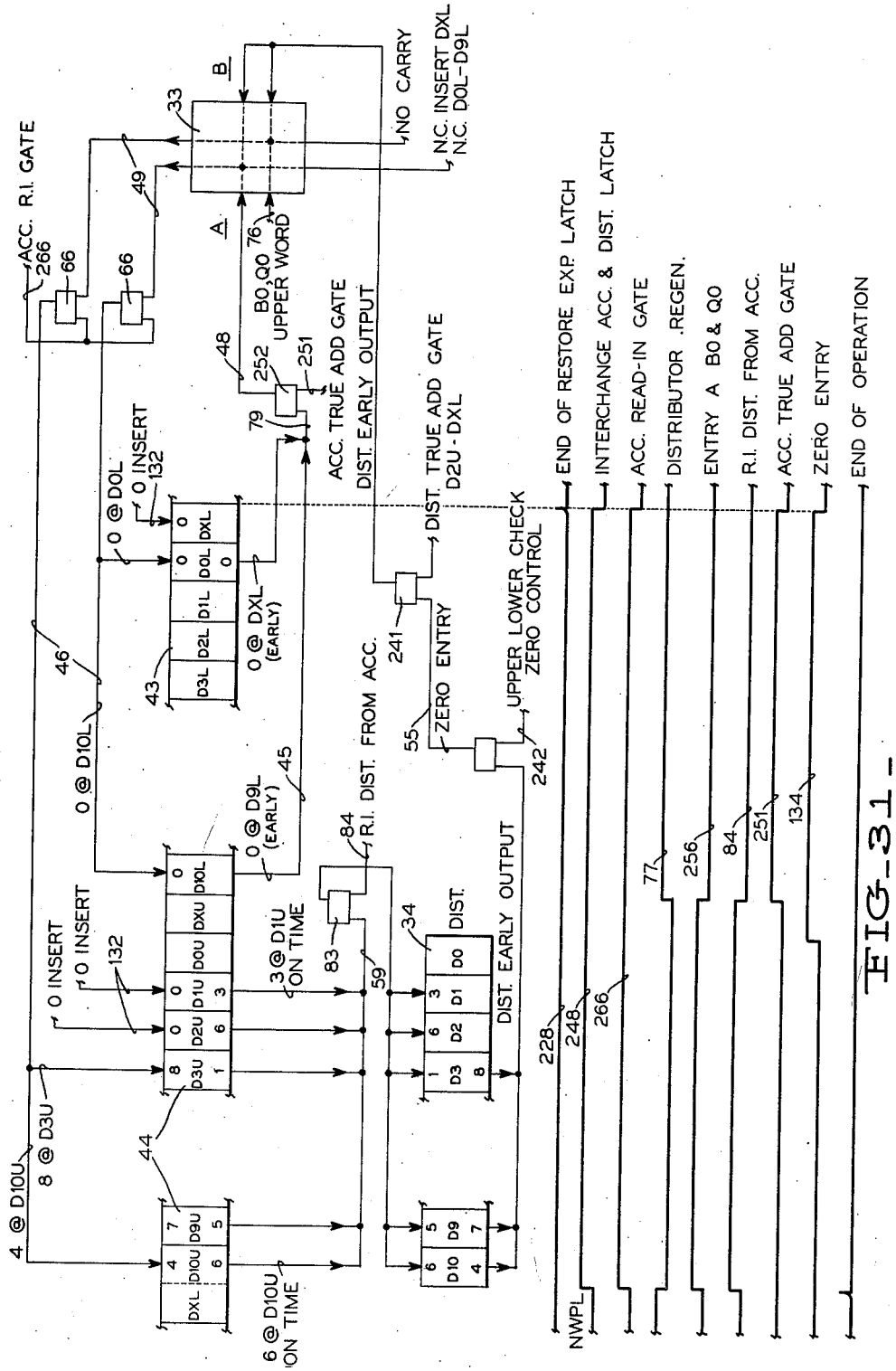

United States Patent Office 3,037,701
Patented June 5, 1962

3,037,701
FLOATING DECIMAL POINT ARITHMETIC CONTROL MEANS FOR CALCULATOR
Huberto M. Sierra, San Jose, Calif., assignor to International Business Machines Corporation, New York, N.Y., a corporation of New York
Filed Nov. 21, 1956, Ser. No. 623,573
26 Claims. (Cl. 235—159)

The invention relates to digital computers and more particularly to digital computers for making calculations with numbers having a wide range of values with a limited number of digit storing positions.

It is one of the objects of the invention to provide a stored program digital computer which is flexible in performing arithmetic operations.

It is another object of the invention to provide a stored program digital computer which is capable of selectively performing both fixed and floating decimal point arithmetic operations.

It is yet another object of the invention to provide a stored program digital computer which automatically performs a floating decimal point arithmetic operation upon receiving a single instruction.

It is still another object of the invention to provide a fixed word length digital computer with a floating decimal point arithmetic system wherein the highest order digit is checked during an arithmetic operation for detecting and automatically correcting an overflow condition.

It is another object of the invention to provide a digital computer with a data storing accumulator in which the data is automatically shifted in the event of an overflow condition from the highest order position, and the overflow value is returned to the highest order digit storing position.

It is yet another object of the invention to provide a stored program floating decimal point digital computer having a fixed word length accumulator which automatically rounds the highest order digit position of any data shifted from the data storing portion of the accumulator to provide an overflow to the lowest order digit of the data storing portion of the accumulator.

It is another object of the invention to provide a stored program digital computer utilizing floating decimal point arithmetic which automatically resets the exponent to zero in the event of a zero mantissa.

It is still another object of the invention to provide a stored program digital computer having a fixed word length including a mantissa and an exponent locating the decimal point of the mantissa with improved circuitry which automatically shifts the mantissa and modifies the related exponent to maintain the proper positioning of the data in the computer and the correct information with respect to the decimal point.

It is another object of the invention to provide a digital computer having a fixed word length including a mantissa and an exponent locating the decimal point of the mantissa with improved circuitry which utilizes the same arithmetic components for operating upon both the mantissas and exponents.

It is still another object of the invention to provide a control for a floating decimal point arithmetic digital computer utilizing data words divided into a mantissa and a related exponent which detects mantissa overflow and automatically shifts the data in the accumulator to retain the true number in the event of such a mantissa overflow and which modifies the exponent in accordance with each shift without interrupting calculator operation.

It is yet another object of the invention to provide an improved floating decimal point arithmetic computer which increases the speed of operation by automatically compensating for overflow conditions and changes in exponents without interrupting calculator operation or the removal of data from the computer.

The invention is directed to a floating decimal point arithmetic system for calculators. In operating in a floating decimal point manner there is provided a series or group of numbers called a mantissa, comprising significant digits, accompanied by a characteristic or exponent having numbers which denote certain information regarding the decimal point of the mantissa. The exponent usually remains with the number when calculating and takes part in an important part of the calculations. In floating decimal point arithmetic, the decimal point is assumed to be at the same location for each word or group of numbers. For example, the decimal point may be assumed to be to the left of the most significant digit in the mantissa. Under these conditions, the value of the related exponent locates the actual decimal point with respect to the assumed point. Further, the exponent, defining the location of the decimal point, is automatically modified with each arithmetic operation, of necessary, and the programmer normally needs no control over the normal shifting required to keep the digits properly aligned in the fixed word length registers or accumulators.

When making scientific computations with fixed decimal point arithmetic in stored program calculators having fixed word lengths, the programmer must continuously keep track of the location of the decimal point for each operation and make the necessary data shifts prior to the next operation to maintain the most significant digit within the register. This continuous check is necessary in order to prevent the highest order digit from overflowing or passing from the highest order digit storing position of the accumulator or register. In the event the data should overflow, a program error is indicated and under the majority of instances, calculator operation is terminated until the proper shift is manually performed to properly align the data for continued operation. If overflow conditions occur frequently, the net output of the calculator is reduced considerably.

The use of fixed decimal point arithmetic also has limitations in certain scientific computations because the total number of digits may be extremely large with respect to the total number of available digit receiving positions in the data receiving and storing registers or accumulators. Thus under some conditions, the major portion of the significant data digits may lie beyond the capacity of the registers. Therefore, the result obtained may have little meaning if not totally erroneous.

While fixed point arithmetic calculators or computers have been proven satisfactory for a great majority of the problems to be solved, there are many problems involving lengthy, complex scientific calculations that require extensive analysis to determine the size and range of intermediate and final quantities. This analysis and the subsequent scaling of these quantities frequently require a larger percentage of the total time required to solve the problem than the actual calculations.

Floating decimal arithmetic circumvents this difficulty by tagging each number with an exponent or characteristic. This characteristic specifies where the decimal point should be. Use of this technique virtually eliminates the need for scaling numbers.

In the disclosed embodiment utilizing fixed word lengths, floating decimal point numbers look exactly like fixed point numbers in that numeric character representations appear in each of eleven digit positions. The difference is the way in which the arithmetic unit interprets them when a floating decimal point operation is called for. Calculator instructions have been incorporated to operate upon floating decimal numbers. Some of these are add, subtract, add absolute, and subtract absolute. Still other instructions may perform multiply, divide, and non-normalize add operations. Whenever one of these operations is called for, the digit positions in the operand or data word are interpreted as follows:

Digit positions D10, 9, 8, 7, 6, 5, 4, 3, 2, 1, 0

$$M, C = \underbrace{x\ x\ x\ x\ x\ x\ x\ x}_{M}\ \underbrace{x\ x}_{C}\ \underbrace{\pm}_{\text{Sign of M}}$$

In the above example, the mantissa M is eight decimal digits in length. The decimal point of the eight digit mantissa is assumed to lie to the left of the mantissa storing digit D10. The sign D0 of the number is always associated with the mantissa. Thus the range of the mantissa is:

$$0.9 \geq M \geq 0.00000001$$

The exponent $e$ is a two digit integer in the range:

$$-50 \leq e \leq 49$$

Since the sign is associated with the mantissa, it cannot be used to indicate the exponent sign. By adding 50 to the exponent, a positive number or characteristic C in the range:

$$C = e + 50$$
$$0 \leq C \leq 99$$

is obtained. It is the two digit characteristic C (D2–D1) that is carried as a tag to specify the actual location of the decimal point of the number. To avoid confusion hereafter in the specification, the characteristic will be referred to as the exponent.

To summarize, a fixed point number N may be represented by a floating point number (M, C) as follows:

$$N = M \times 10^{C-50}$$

For example, in an eleven digit fixed word length machine:

```
+1.0 is represented in the calculator as 10000000519; and
     -1.0 = -.1×10               as 10000000518
+12345678000000000. 0 = +.12345678×10^+16  as .12345678669
     -12345678. 0 = -.12345678×10^+8   as .12345678588
     +1234. 5678 = +.12345678×10^+4    as .12345678549
     -0.12345678 = -.12345678          as .12345678508
 -0.000012345678 = +.12345678×10^-4    as .12345678469
+0.0000000012345678 = +.12345678×10^-8 as .12345678429
```

Thus numbers having a wide range of values may be readily utilized and stored without extending beyond the fixed word length of the calculator.

Because there is no difference between fixed and floating decimal numbers, fixed point operations can be performed upon floating decimal numbers if desired. For example, it is possible to test the floating point number to determine whether it is zero or nonzero; positive or negative. It is up to the programmer to determine what he wishes to do and to write the proper sequence of instructions to perform that operation. Similarly, the characteristic can be separated from the mantissa by shifting and examining. It can be modified by programming; whatever else is desired can be done. This facility for operating upon numbers with either type of arithmetic provides great flexibility.

In F. E. Hamilton et al. application, Serial No. 544,520, filed November 2, 1955, now U.S. Patent No. 2,959,351, issued November 8, 1960, there is disclosed a parallel by bit, serial by digit fixed decimal point calculator having a fixed word length comprising eleven digit positions for storing data. The disclosed invention is, with suitable circuit modifications, adapted to operate with a calculator of this type. The description appearing in the following specification is based on the above Hamilton et al. application modified as indicated. The above calculator includes a distributor, single digit adder and upper and lower word length acccumulators which are utilized in the floating decimal point arithmetic operation.

During an arithmetic operation, the data in the accumulators is directed through the adder in synchronism with timing pulses supplied from a data storage drum or the like. At all even or lower word times, the word of data in the lower accumulator is directed to the adder parallel by bit and serial by digit starting with the least significant, and at all odd or upper word times, the data in the upper accumulator is available serial by digit at the adder. The word of data in the distributor is delivered to the adder at both lower and upper word times in synchronism with the digits, respectively, in the lower and upper accumulators. Whether the delivered data is merged or permitted to pass through the adder is dependent upon various conditions. During normal fixed point operation, all ten data digit positions are utilized for the data. The data stored in either of the accumulators is directed through the adder along with that appearing in the distributor, and the result is stored in either of the accumulators, dependent upon the previous instruction.

With a floating decimal point instruction, such an operation is initiated by its operation code, and under these conditions, the normal fixed length eleven digit data words or operands are automatically split to provide an eight digit mantissa, a two digit exponent and a sign digit. Only the upper accumulator and distributor store the mantissa and its related exponent. In an add or subtract floating point operation, the lower accumulator receives the complement of the difference between exponents at one of the digit positions and is used to count any required right shifts of the mantissa in the upper accumulator. Exponent positions in the upper accumulator cannot be shifted in either direction. The values in the distributor are not shifted either right or left. Round off takes place in the highest order digit position of the lower accumulator at the end of each floating decimal point arithmetic operation.

An appropriate floating decimal point operation code automatically modifies circuitry in the calculator to in effect separate the exponent digit positions and mantissas in predetermined sequences. With respect to the mantissa, the decimal point is considered to be to the left of the highest order digit. Except for special instructions to be described later, the highest order digit of the mantissa will carry a significant digit, and the zeros, if any, will follow to the right to fill the remaining digit positions. The exponent value 50 indicates that the decimal point is properly located to the left of the highest order digit position. Exponent values 49 through 1 indicate the number of zeros to be added to the left between the decimal point and the first significant digit, and 51 through 99, the number of digits the decimal point is located to the right.

Thus:

10000000489 represents +.001 and 10000000538 represents −100

Assuming data is stored in the distributor and upper accumulator, a floating decimal point multiply or divide operation feeds the data in both through the adder a sufficient number of times and in a predetermined manner, and the mantissa remainder or quotient eventually appears in the upper accumulator. After this operation, the respective exponents in the distributor and upper accumulator are added direct or subtracted, as the case may be, and the new exponent appears in the upper accumulator, after which the next operation is performed on the data or it may be transferred from the calculator for storage or the like. During the arithmetic operation, the exponents and mantissas are both delivered to the adder; however, control circuitry is provided to selectively block the merging or addition of one or the other or both under various conditions.

In a floating decimal point add or subtract operation, the first step is to compare the exponents to assure proper alignment of the mantissas. In this case the exponents of the mantissas in the distributor and upper accumulator are compared at the first add upper word time in the adder, and the exponent difference, if any, is directed to an exponent analysis network. From this network, assuming the upper accumulator has the smaller exponent, the complement of the exponent difference is directed through the adder at the next even or lower word time, and the value is inserted in a selected digit position of the lower accumulator.

The appearance of a difference in exponents is operative to right shift the mantissa in the upper accumulator. During each right shift, the data in the mantissa units position of the upper accumulator is placed in the high order position of the lower accumulator. With each right shift, the stored complemented exponent difference in D0L is increased by one, and the right shifting continues until a carry occurs from this select digit storage position. This indicates that the exponents are now equal; therefore, the related mantissas are properly aligned for addition or subtraction, as the case may be.

As the floating decimal point add or subtract operation is performed, the sum or remainder of the mantissas in the upper accumulator and distributor is stored in the upper accumulator. Rounding of the number is accomplished in the next step by adding a 5 in the highest order digit position of the lower accumulator which directs the carry, if any, to the low order mantissa digit position in the upper accumulator.

During the exponent comparison operation, if the exponent of the mantissa stored in the upper accumulator is larger than that in the distributor, an interchange of data is called for; that is, the mantissa in the distributor passes through the adder to the upper accumulator, and the data originally in the upper accumulator is stored in the distributor. After the data interchange, the mantissa in the upper accumulator is right shifted the proper number of places determined by the difference in the exponents. When the proper number of shifts have taken place, the add or subtract operation is initiated at the next odd or upper word time by combining, serial by digit, the contents of the distributor and upper accumulator in the adder. The sum or remainder is stored in the upper accumulator along with the proper exponent. Rounding takes place as described above.

At the end of every floating decimal point add operation, circuitry is provided to check for an overflow from the highest order digit in the mantissa. If an overflow should occur, it will automatically operate an overflow right shift circuit. In other words, if the circuit detects an overflow, the next operation will be an automatic right shift of the mantissa in the upper and lower accumulators. Thus the content of the low order position of the mantissa is inserted in the high order position of the lower accumulator, and a zero is inserted in the high order position of the mantissa. The exponent positions remain unchanged.

After the mantissa has been so right shifted, the data in the upper accumulator again passes through the adder, and a 1 is automatically added to increase the exponent by 1 and to place a 1 in the high order position of the mantissa. This operation increases the exponent to compensate for the right shift and by placing a one in the highest order compensates for the carry which was previously lost from the mantissa. The next operation which is round, again directs the data in the lower and upper accumulators through the adder, and a 5 is inserted at the high order digit position D10L of the lower accumulator to perform the rounding operation. During rounding, a carry from D10L, if any, is automatically directed to the low order digit D3U position of the mantissa in the upper accumulator. At the end of the rounding operation, the overflow right shift circuit is again checked to determine if a rounding carry had occurred from the mantissa. If no such carry, the machine continues to its next operation. However, if a carry occurred due to rounding, a one is added to D10U and a one is also added to D1U. However, no right shift occurs.

Floating decimal point subtraction is performed in a manner similar to addition. However, during a subtract operation, for example, the remainder may have zeros appearing to the left of the most significant digit in the upper accumulator. Should a zero appear ahead of the most significant digit, after the subtract operation, a circuit is completed to automatically left shift the mantissa until a significant digit appears in the highest order digit position. With each left shift, the value of the related exponent is automatically reduced by one.

If a floating decimal point add or subtract operation is called for in which the exponents are equal, a 00 is generated at the output of the adder. This indicates the mantissas are properly aligned for an add or subtract operation. Thus the mantissas are directed through the adder and are added or subtracted as indicated by the signs of the mantissas and by the operation code. During this operation, the exponent in the distributor passes through the adder in proper timed relation and is placed in the exponent position in the upper accumulator. As the add operation takes place, a check for a mantissa overflow is made which operates in the manner previously described.

If the difference in exponents exceeds the fixed number of mantissa digit positions, circuitry is actuated to blank the operand with the smaller exponent and place the mantissa along with the related larger exponent in the upper accumulator. The next operation is in accordance with the next instruction.

In the above whenever an operation is called for, the entire word is delivered to the adder. However, the improved floating decimal control circuitry is effective to block the undesired data for any particular operation. During any floating decimal operation wherein a shift in mantissa is called for, the shifting occurs within the calculator or arithmetic unit and does not require removal therefrom.

Other objects of the invention will be pointed out in the following description and claims and illustrated in the accompanying drawings, which disclose, by way of examples, the principle of the invention and the best mode, which has been contemplated, of applying that principle.

In the drawings:

FIGS. 2a to 2d represent a schematic block wiring diagram of the fixed word length digital computer shown in FIG. 1 but showing in more detail the various circuits required to perform the floating decimal point arithmetic operation.

Figure 1:
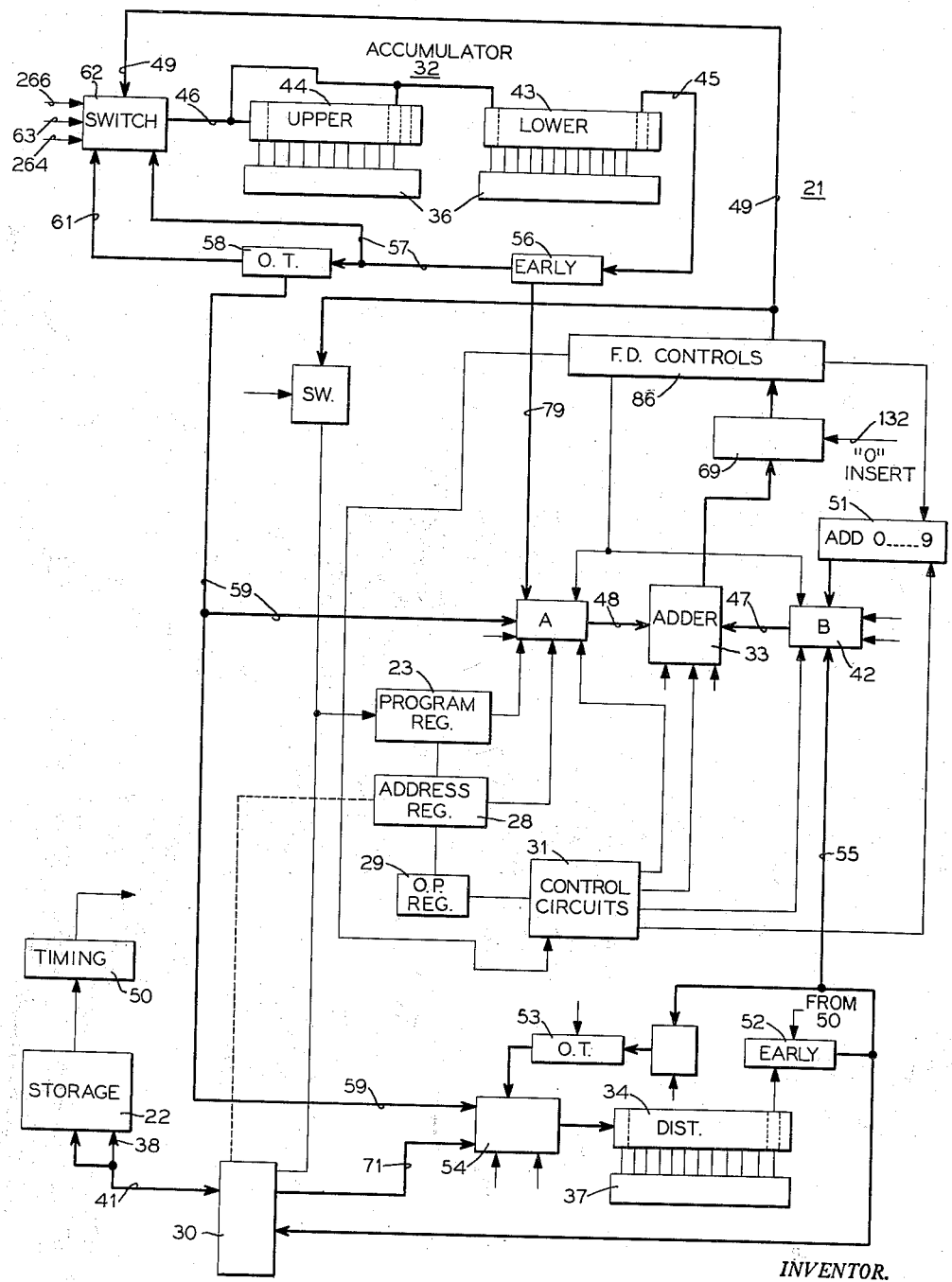
FIG. 1 is a schematic block diagram of a portion of a fixed word length digital computer for performing both fixed and floating decimal point arithmetic operations.

FIGS. 3a to 3k and 3m, inclusive, represent a schematic wiring diagram of the various controls required to perform the floating decimal point arithmetic operation in the computer shown in FIGS. 2a to 2d.

FIGS. 4 and 5 are sheet layouts of FIGS. 2a to 2d and 3a to 3k and 3m, respectively.

FIG. 6 illustrates a data storing drum arranged in sectors, words, digits, and includes the pulse timing.

FIG. 7 is a diagrammatic representation of the layout of the digit positions of the upper and lower accumulator sections or registers.

FIG. 8 is a diagrammatic representation of the layout of the digit positions in the distributor or augend register, and includes the arrangement for general storage and the components of a data word or operand.

FIG. 9 is a diagrammatic representation illustrating a left shift at the accumulator.

FIG. 10 is a similar diagram illustrating a right shift within the accumulator.

FIG. 11 illustrates the layout of the components of a word of program instruction data.

FIGS. 12a and 12b diagrammatically show a logical AND or diode switch arrangement.

FIGS. 13a and 13b diagrammatically show a logical OR or diode mix.

FIGS. 14 to 24, inclusive, are charts of various floating decimal point arithmetic operations and indicate the position of the data in the accumulator and distributor at various stages during certain floating decimal arithmetic operations.

FIG. 25 is a chart indicating how the ten decimal digits are represented in biquinary code.

FIG. 26 is a flow diagram or function chart of the possible steps or operations required under various floating decimal arithmetic add or subtract operations.

FIGS. 27, 28 and 29 are timing charts showing the various pulses and combinations required to maintain proper synchronism of the arithmetic operation.

FIG. 30 is a combined timing and function chart of a left shift operation in the accumulator; and, FIG. 31 is a combined timing and function chart of an interchange accumulator and distributor operation.

TUBES AND CONTROL SWITCHES

In each of the drawings of the various control devices, the individual components or units making up that device are indicated merely as a box or block. The specific circuitry of such blocks will not be generally described as applied to various typical forms of tubes and diode circuits. A detailed description of typical diode coincident switches, diode mixers, inverters, single and double latches, along with necessary cathode followers, inverter followers, and power tubes, where required, and which would be applicable or necessary to apparatus to this type is shown and described in the abovementioned F. E. Hamilton et al. application.

For the purpose of this description, a typical coincident switch 11, FIGS. 12a and 12b, otherwise known as a logical AND circuit or diode switch, comprises germanium crystal diodes or the like 12, each including an individual input terminal 13 normally biased negative so that the common terminal 14 is at a negative potential with respect to ground. If coincident positive pulses are applied to all input terminals 13, the potential of the output terminal 14 is raised from the positive terminal 15. However, if only one of the input terminals is pulsed positively, the potential of the common output terminal 14 is not raised appreciably. Any suitable voltage responsive device may be controlled by the potential of the output terminal 14 to furnish a usable output voltage level whenever a coincidence of positive input pulses is detected. In the drawing a diode switch is indicated as shown in FIG. 12b.

A typical mix, FIGS. 13a and 13b, otherwise known as a logical OR circuit or diode mix 16 comprises a pair of germanium crystal diodes or the like 17. The diodes 17, employed in the mixers, are shaded and the direction reversed in the present drawings to distinguish them from the diodes 12, which are employed in the switches 11. As shown in FIG. 13b, an arc of a circle represents the diode mix 16 and is employed throughout in the drawings. Any suitable voltage responsive device is controlled by the potential of a common output terminal 18 of the diode mix, which terminal is connected by a suitable resistor 19 to a negative voltage source, not shown, to maintain a negative bias on any line extending from the output terminal 18. Each diode 17 is connected to an individual input terminal 20, which in turn is connected in the electrical circuit. If either one or all of the diode input terminals 20 are pulsed positively the potential of the output terminal 18 is raised, which permits the tube associated therewith to conduct or operate in a predetermined manner.

Referring to FIGS. 2a to 2d and 3a to 3k and 3m, inclusive, which represent diagrams of the various floating decimal control circuits, each of the component blocks or units comprising a particular circuit is labeled with a letter or combination of letters. The respective general or objective circuitry of most of the component blocks may be determined by identifying the letter-number block designation. Each particular letter combination in the component block, in addition to acting as a reference designation, also denotes the function of the component. Thus, for example, a typical power unit or inverter is labeled with the prefix letter I; a double inverter is labeled with the prefix letters IN; a cathode follower is labeled with the prefix letters CF; an inverter follower is labeled with the prefix letters IF; and the various combinations of inverters, double inverters and cathode followers which are connected in a particular manner are labeled latches. These latches may be of the single or double type and are fully described in the above F. E. Hamilton et al. Patent 2,959,351.

Hereinafter in the specification wherein a conductor or circuit terminal or the like is referred to as being positive or negative in potential, this does not necessarily mean that the point in question is positive or negative in an absolute sense but more positive or more negative relative to its previous state. This principle also applies to any description wherein positive or negative pulses are mentioned or referred to as up or down, or raised or lowered.

Generally, an inverter or amplifier unit I comprises a triode having its cathode connected to ground. An inverter, as its name implies, is adapted to invert a signal. Thus as its grid terminal shifts positive, the triode conducts more heavily, and the associated plate output terminal shifts negative. Similarly, if the grid terminal shifts negative, the output terminal shifts positive. A double inverter comprises a pair of triodes connected in a similar manner; however, if the first grid terminal shifts positive, the triode conducts more heavily, and the associated plate output of the second triode shifts in the same direction as the first grid terminal.

The cathode followers CF have a relatively low cathode resistor, and as a result, the cathode output terminal serves as a low impedance signal source and may be loaded appreciably without substantially affecting the magnitude of the signals supplied therefrom. This is the main purpose of the cathode follower unit. Also the cathode follower rapidly follows the voltage shift of the input terminal to the grid so that the resultant shift in potential of the output does not appreciably lag the voltage.

While no specific cathode follower is shown, it is to be understood that various types may be utilized in different locations, and the circuits may involve various resistance values and capacity couplings to produce the desired outputs. Since the particular cathode followers and inverter followers used are not part of the invention, a detailed description of each possible type is not deemed necessary. Likewise, in the drawings the major portion of the cathode followers, double inverters and the like which would normally be required to maintain the proper signal level have for the purpose of simplicity, been eliminated. The type and number and particular location would depend upon the results desired. Also voltage levels and the like can be varied from case to case to meet various operating conditions for different equipment.

For the sake of simplicity, details of the necessary driving rings, single and double latches have been eliminated. Generally, a single latch comprises a double inverter and cathode follower which responds to an input signal to raise the output of the cathode follower. The cathode follower output in turn supplies the desired signal and has a feedback leading to the input to maintain the cathode follower conducting. The latch is turned Off by interrupting the latch-back signal. A double latch is similar to a single latch with the exception that a single inverter and cathode follower section provide a negative output in response to a positive input. The negative output of this section is applied to the second latch section to maintain the latter output positive. The latch is maintained by directing the positive output from the second section to the first section. A positive pulse directed to the second section drops or returns the first section to its original condition. One of the sides having the normally conducting inverter is considered the off side. A more detailed explanation is provided in the above Hamilton et al. application, and latch apparatus of the above type is shown and claimed in E. S. Hughes, Jr., Patent 2,628,309, issued February 10, 1953.

In FIGS. 1 and 2a to 2d, a series of single connecting lines are shown leading to and from the various blocks. It is to be understood that the major portion of these single lines actually embodies a plurality of lines and that single lines are shown as a means for simplifying the drawings. The heavy shaded lines represent the data transmission lines between the blocks, while the lighter shaded lines are primarily control lines for selectively directing the data from one location to another. In addition, where a single switch is shown in these lines, an array of switches would be utilized for selectively gating the data.

It is to be understood that various timing pulses, most of which are not shown, and additional switching and the like, not shown, would be required to transfer the data to and from the various components making up the calculator. However, these additional elements, if shown, would merely complicate both the description and drawings without aiding in the understanding of the invention. Therefore, for the sake of simplification, all elements not bearing directly to the improved floating decimal arithmetic system have been eliminated.

TIMING PULSES AND GATES

Information is recorded in buffer storages and general storage by switching information gates with timing pulses to produce a specifically timed information pulse for energizing read/write heads. Information is read from magnetic storage by switching a shaped, read head signal with a timing pulse to produce a specifically timed information pulse which can be used in turn on a suitable latch whose output will be an information gate similar in duration and timing to the one originally used in recording the spot.

Timing pulses determine the position of a spot when it is placed on the drum and also insure that information read from the drum is available in the form of a properly timed information gate. In a similar way, other necessary drum timing divisions are established by timing pulses such that the exact position of the drum is known by the computing and control circuits at all times.

FIG. 6 shows the principal drum timing divisions. All drum times are with relation to a "home" position 39 which, in this instance, is the beginning of sector zero. Other drum divisions are sectors (five per revolution), words (fifty per drum revolution), digits (six hundred per revolution), and A, B, C, and D pulses, one of each for each digit or six hundred of each per revolution.

The basic timing interval is an eight micro-second digit interval of which there are six hundred around the circumference of the drum. Each digit interval is divided into four equal pulse intervals, A, B, C, and D. The beginning of a digit timing interval is marked by the leading edge of an A pulse. The B, C, and D pulses of a digit follow at two micro-second intervals. Twelve digit intervals are included in a word interval. The twelve digits of each word are successively DX, D0, D1, D2, D3, D4, D5, D6, D7, D8, D9, and D10. Digit DX is used as a switching interval between successive words. Digit D0 is the sign storage time and digits D1-D10 represent the serial time space intervals of the storage of the first through tenth position digits of a ten-digit number. Ten word intervals are included in each sector, and five sectors make up the entire cycle of drum timing.

Just as the beginning of a digit interval is marked by its A pulse, pulses must be available to mark the beginning of each word, sector, and home interval. These basic timing pulses are obtained by reading permanently recorded spots on the drum's timing tracks.

The six basic timing tracks are: (1) home pulse, (2) sector pulses, (3) word pulses, (4) B pulses, (5) D pulses, and (6) read sample pulses.

The other necessary timing pulses and gates may be obtained from single shot multivibrator or latch circuits, not shown, actuated by these basic pulses and/or other manufactured pulses.

The following partial list defines terms used to describe timing pulses and gates and generally describes the pulses and gates used:

Bit—smallest unit of information. A bit usually represents any one element of the seven-element biquinary code or of a five-element general storage code, not needed in this description.

Digit (D)—elements of a biquinary or five-element code representing one decimal number. One of twelve intervals of a word. Bits representing a digit are present simultaneously parallel bit by bit within a time interval of eight microseconds. A valid digit code designation contains only two positively identified bit elements per digit.

Home (H)—a recorded spot on the drum which is a reference point for all timing signals.

Microsecond—one millionth of a second.

Sector (S)—a designated area representing one-fifth the circumference of the drum. A sector contains ten words per band and represents the time interval of .96 millisecond.

Word (W)—a combination of twelve digit intervals representing the smallest addressable storage unit of information. A word contains ten digits (D1–D10) representing numerical information plus one digit (D0) indicating sign, plus one digit (DX) allowed for switching interval between words.

Pulse (P)—basic timing signal usually about two microseconds duration. Most pulses are obtained from permanently recorded signals on the drum which are amplified and shaped. Some pulses are generated from other pulses.

Gate—any signal not labeled pulse is assumed to be a gate and has no basic duration. Any created timing signal usually over two microseconds in duration which represents an exact timing signal between two pulses is defined as a gate. Gates are usually created by switching certain timing signals or by timed control of latch circuitry.

"A" pulse (AP)—a positive pulse, two microseconds duration, occurring during the first quarter of a digit interval. A pulses may be produced from a one shot multivibrator which is controlled by the leading edge of a delay early A pulse and the leading edge of a negative B pulse.

"B" pulse (BP)—a positive pulse, two microseconds duration, occurring during the second quarter of a digit interval. B pulses are obtained from permanently recorded signals on the magnetic drum.

"C" pulse (CP)—a positive pulse, two microseconds duration, occurring during the third quarter of a digit interval. C pulses are produced from a single-shot multivibrator controlled by the trailing edge of a negative B pulse and the leading edge of a negative D pulse.

"D" pulse (DP)—a positive pulse two microseconds duration, occurring the fourth quarter of a digit interval. D pulses are obtained from permanently recorded signals on the magnetic drum.

Pulses that occur just prior (less than two microseconds) to a designated pulse time are defined with a prefix E meaning early. Early pulses are often used to compensate for time lost between states of electronic circuitry which requires an output at a certain designated pulse time.

Early A pulse (EAP)—a positive pulse, two microseconds duration, designed to occur approximately one-half half microsecond prior to an A pulse. Early A pulses are obtained by delaying B pulses. Six hundred per drum revolution, eight microseconds apart.

Early word pulse (EWP)—a positive pulse, two microseconds duration, which occurs at early A pulse time every twelfth digit. Early word pulses are obtained from permanently recorded signals on the magnetic drum and are associated with DX, the first digit time of every word.

Early home pulse (EHP)—a two-microsecond positive pulse which occurs at early A pulse time once every drum revolution.

Word pulse (WP)—these pulses, two microseconds in duration, are obtained by delaying their respective early pulse approximately one-half microsecond so that these pulses occur at A pulse time.

Word pulse (even word) (WPL)—a positive two-microsecond pulse which occurs for only every even or lower word, 192 microseconds apart. Words 0, 2, 4, 6, and 8 are considered even words and are associated with lower accumulator readout time.

Word pulse (odd word) (WPU)—a positive two-microsecond pulse which occurs for only every odd or upper word 192 microseconds part. Words 1, 3, 5, 7 and 9 are considered odd words and are associated with upper accumulator readout time.

Negative timing pulses are signified with a prefix "N." Negative pulses are obtained by inverting normal pulses. A negative pulse therefore has a positive voltage level except during the designated pulse time.

NAP—negative A pulse
NBP—negative B pulse
NCP—negative C pulse
NDP—negative D pulse
NEAP—negative early A pulse
NHP—negative home pulse
NEWP—negative early word pulse
NWP—negative word pulse
NWPL—a negative word pulse occurring only for every even word associated with the lower accumulator.
NWPU—a negative word pulse occurring only for every odd word. Associated with the upper accumulator.

Negative Latch Reset Pulse (NLRP)—a negative pulse approximately one microsecond duration which occurs at the beginning of A time. This pulse is obtained from a one-shot multivibrator triggered by an A pulse. This pulse is used to control the reset of some of the latches.

Digit gates are initiated at A time but are considered on only from the time of the designated digits to A time of the following digit.

DX—switching digit gate
D0—sign digit gate
Digits 1 through D10—digits designated for numerical information. Digit 1 represents units position, digit 10, high order position.
D1, D2—a gate providing digit gate 1 and 2 only.
D3–D10—a gate providing digit gates 3 through 10 only.
D1–DX—a gate providing all digit gates except D0 and DX.
EDXL—switching digit gate occurring only for every even word. (Lower accumulator readout time.)
EDXU— switching digit gate occurring only for every odd word. (Upper accumulator readout time.)

GENERAL DESCRIPTION

Referring now to FIG. 1, there is disclosed a data processing machine or calculator 21, which is provided with a magnetic drum or the like 22 for storing a large quantity of data as magnetized spots on the surface. A program storage device or register 23 is provided for storing a single program step or word 24, FIG. 11.

The program or instruction word 24 is divided into three portions: a four-digit data address portion 25, D8–D5, for instructing the machine where data to be processed is located in the storage 22; a two-digit operation portion 26, D10–D9, called an OP code, for instructing the machine as to what operation or process the machine is to perform with the data found in the address portion 25; and a four-digit instruction address portion 27, D4–D1, for instructing the machine where the next program step is located in the storage.

An address register 28, FIGS. 1 and 2c, and an operation register 29 are provided for receiving the data address portion 25 and the operation portion 26, respectively, from the program register 23. Switching circuitry 30 is provided under the control of the address register 28 for selecting any storage position on the drum 22 or any other storage device on the machine, in accordance with the value stored in the address register. Switching circuitry 31 is also provided under control of the operation register for determining the operation the machine is to perform on the data found at a selected address position.

After a data address is selected and the data found at that address is operated upon by the machine, the instruction address portion 27 of the program word 24 is entered into the address register 28 from the program register 23 to replace the value previously in the address register 28. A new program word located at the address in storage corresponding to the instruction address portion 27 of the program step now in the address register 28 is selected and transferred into the program register 23 to replace the word previously stored therein. Thus large numbers of program words and large amounts of data may be stored on the magnetic drum 22, and the sequence of the above-outlined procedure may automatically continue for a large number of program steps. A stored sequence of such instruction words forms a program routine.

An accumulator 32, a one-digit matrix adder 33, and a distributor 34 are also provided in the machine as well as circuitry for introducing machine developed values to be added. With respect to the above elements, one form they may assume is completely shown and described in the above-mentioned Hamilton et al. Patent 2,959,351. The machine is provided to handle a plurality of digits D grouped to define a word of data. As shown in FIGS. 6 and 8, a word (W) of data or operand 35 consists of ten data digits and an algebraic sign. The words are stored serially on the drum 22, and as shown, the digits of a word are stored serially within each word interval. Numeric data are represented by parallel combinations of magnetically stored bits, one form of which in biquinary code is shown in FIG. 25. This view shows how, in a biquinary system, there are combined different binary 1 indications from two out of seven parallel devices to represent each of the ten decimal digits. Information is thus said to be stored in the machine parallel by bit, serial by digit and word. While various coding systems may be devised, in this particular embodiment the arithmetic units use the disclosed biquinary systems, where the presence of two out of seven possible parallel stored or appearing bits determine the digit's decimal value.

Calculations are performed by electronic means. The calculator can add, subtract, multiply or divide and make logical tests such as to plus, minus and zero accumulator balance. All of these arithmetical and logical operations are built into the machine. They are activated by the operation code portion of the instruction word. The calculator will accumulate ten digit words, and the sign control on all operations is automatic.

The arithmetic units of the machine are designed to handle numbers in a serial fashion. Thus during calculations, the ten digit words are processed by the arithmetic units on a digit by digit basis with machine time progressions from the units digit through the highest digit in the word. The basic cyclical timings of the machine are therefore related to digit position rather than digit value. In the arithmetic portion of the machine, the value of a digit is determined by simultaneous combinations of bit pulses on two out of the seven parallel information lines. Successive indications of the various combinations of two out of the seven tracks during successive digit time intervals will indicate serially the decimal values of the digits of a word.

In the case of the arithmetic units 32 and 34, FIG. 1, the parallel binary devices may be binary capacitor storage units or the like, not specifically shown. In this manner, seven parallel capacitors, arranged in a row, are utilized to represent each digit position of a word. Each row of seven is tested at its digit time by pulses from related drum driven timing rings 36 or 37, respectively. Binary 1 indications from any particular two out of the seven capacitors will indicate the particular decimal value of that particular digit position, as indicated in FIG. 25.

The biquinary system requires that there be a 1 indication by one and only one of the binary indicating devices in each of the two levels. The binary level indication determines whether the quinary level indication is to be read as it is or have 5 added to determine the decimal value. This above or below five characteristic of the system makes it essentially adaptable to calculating circuitry. Further, the calculator is designed to receive the values parallel by bit and serial by digit. Thus during operating conditions at each digit time, two out of the seven data lines conduct bits rise in potential while the other five lines remain down.

At the time of readout, each digit position of the major functional units provides a definite value to the readout circuitry for each stored bit position. However, after readout, when the capacitor storage unit is required to retain its information for several word intervals, each cell must be regenerated once each word. This is accomplished by causing the output pulse obtained when a one is read out and which is available several microseconds before readin time to actuate readin control circuits so that a pedestal pulse is obtained simultaneously with the readin gate. When regenerating, any time a one is read out, a pedestal is thus obtained, and a one is read back into the same bit storing capacitor. If a zero is read out, no output pulse is available to actuate the readin control circuits, no pedestal is obtained and a zero is thus read back in.

When it is desired to read a new word into a capacitor storage unit, the path between the output pulse and the readin control circuits is blocked, and consequently the pedestal cathode followers are actuated by information pulses from the readin source, instead of by the output pulses.

The principles of this capacitor storage are described more fully and claimed in the copending application of Lloyd L. Haug and Charles W. Allen, Serial No. 445,221, filed July 24, 1954, now Patent Number 2,823,369, issued February 11, 1958, and assigned to the present assignee. However, it is to be understood the storage means described is only given by way of example. Any storage means capable of delivering and receiving the data parallel by bit, serial by digit in the desired sequence would, with relatively minor modifications, be applicable.

The storage drum 22 is provided with bands of data and includes the magnetic pickup devices 38 which are selectively operated to read and write information. The words of data may be arranged on the drum in addressable storage locations, as shown in FIG. 6 and previously described. In each case, at the time of readout, each word delivers the data parallel by bit, serial by digit, and the readings are accomplished serial by word. While both the program register and distributor 23 and 34, respectively, FIG. 1, are capable of receiving information from a common storage exit channel 41, the switching 30 leading to the program register 23 is only open on an I half cycle, while that part of switch 30 controlling entry into the distributor 34 is only open on a D half cycle.

The distributor 34 acts as a buffer between the accumulating components 32 and addressable locations of storage 22. Its main functions are to receive a word of data from a selected data address and make this word available to the accumulating circuits as required by the operation or to receive the word of data from the accumulating circuits or console switches, not shown, and make this word available for entry into a selected storage location. The distributor is also addressable and can be used as a source of information through selected storage switching.

The capacitor storage units read their stored information out continuously during each drum word interval. This is done by driving the digit positions of the units with drum timed digit pulses from the drum driven digit ring 37. Each capacitor storage unit has a one-digit early output and an on-time output. This is accomplished by driving each digit position of the unit with a drum timed digit pulse, one digit time in advance of the digit position of the storage unit. Thus the digit 1 position D1 of the accumulator unit 32 is read out at digit 0 drum time, digit 2 of the unit is driven at digit 1 drum time, etc. Each early output is then delayed for one digit interval to provide an additional on-time output. Either output may be used, depending upon the desired operation.

Since capacitor storage units are a nonsustaining type of storage; that is, each position requires periodic regeneration of its stored information, regeneration is accomplished within the unit by providing a data flow path between the outputs of the unit and its input circuits. Thus information which is available from digit position D1 at digit D0 drum time is read back into the digit D1 position at digit D1 drum time, etc., as long as the regeneration path is closed. Reading new information into a unit merely requires that the regeneration path be opened and that on-time output signals from the desired source be substituted at the storage unit input circuits in place of the unit's on-time output signals. This is done whenever the input switching to the capacitor storage unit is activated.

FIGS. 1 and 2a to 2d show data flow paths from the outputs of the capacitor storage units. The information contained in the capacitor storage units is continuously presented serially digit by digit on these flow paths. The data flow path from each of the units connects to the input switching circuitry of various other machine units; that is, the distributor output connects to the adder B entry switching 42, and the general storage (Drum) entry switching 39 to mention but two. Reading information out of a capacitor storage unit merely requires that the entry switching for the desired receiving unit be opened for just the word time necessary to gate through the succession of output digit pulses representing the stored word.

The accumulator 32 is a capacity storage unit similar to the program register and the distributor 23 and 34, respectively, except that it has a two-word capacity. The serial-digit signals of each word are available at their early and on-time drum digit times, once every alternate word interval. The accumulator 32 is divided into lower and upper halves 43 and 44, respectively, for programming and calculating purposes, the low order ten digits form the lower accumulator section 43 and the high order ten digits form the upper accumulator section 44. Hereinafter when the lower or upper accumulator is referred to in connection with digit positions therein, the digit will carry the suffix L or U, indicating lower or upper accumulators.

Information in the lower accumulator 43 is continuously available during each even numbered drum word interval, while the upper accumulator 44 is continuously available during each odd numbered drum word interval.

In the figures the data flow paths are shown from the accumulator output 45 to its own input 46, to the A entry of the adder 33, and to the distributor 34. Transfer of information from either half of the accumulator to one of these destinations is accomplished by controlling the readin switching of the receiving unit to be opened for the proper even or odd word time, during which time the output of the desired half of the accumulator is gated through to the receiving unit.

The main function of the accumulator 32 is to work with the adder 33 in accumulating sums, products and quotients and performing shift operations. It also can function as an addressable source of information to supply an instruction word or a data word for programming purposes.

The single digit matrix adder 33 is a diode and tube matrix capable of receiving two input digit values, analyzing them, and then producing a digit output signal equal in value to the sum or difference of the two input values. Digits from both the distributor 34 and the accumulator 32 can enter the adder 33, the distributor digits on input lines 47 from the B entry and the accumulator digits on the other lines 48 from the A entry. The output from the matrix adder is delivered over the output data lines 49 and is stored back into the accumulator. A delay of one digit time is incurred between the input and output from the adder. An output will be available from the matrix adder only as a result of the entry of two input digits, one on each of the data input lines 47 and 48, respectively.

Provision is also made in certain operations for blanking the distributor or accumulator digit values and substituting zeros or constants for entry into the matrix adder by means of special digit entry switching 51. Most calculator operations are performed by merging distributor and accumulator digit values or their substitutes in the matrix adder and storing the result back in the accumulator. In most arithmetical operations the distributor and accumulator early output is used to produce an on-time adder output for the accumulator to store. In other operations, such as shifting, the on-time output may be used. By various combinations of operation codes, the data to be processed is manipulated as instructed to obtain the desired results.

Associated with the output side of the distributor 34 are early latches 52 which are operative in timed relation with timing pulses sent from timing means 50 to direct the data read out of the distributor, parallel by bit and serial by digit, to the adder 33 at the B entry, the storage inputs 30 and to on-time latches 53 for re-entry into the distributor through switching 54 on a regeneration cycle. The direction the operand or data word takes is dependent upon the operation desired. For example, if the operand or any portion thereof is to enter the adder 33, the switching 42 is actuated to permit the data delivered over the line 55 to enter the adder at the appropriate timed interval. Should it be desired to place the operand in storage 22, the output from the early latches 52 is directed through the switching 30, and the operand is placed in storage at the location specified by the address register 28. During the arithmetic operation, the value in the upper accumulator 44 is destroyed or blanked in order to receive the output from the adder.

As more clearly shown in FIG. 7, the upper accumulator 44 comprises ten digit storing positions, indicated from left to right as D10U to D1U. The lower accumulator 43 comprises twelve digit positions indicated in the same direction as D10L to DXL. The distributor 34, FIG. 8, like the lower accumulator, includes twelve digit positions D10 to DX.

While the data stored in the distributor 34 is fixed with respect to shifting within the register, it is possible to shift the data in the accumulators 43 and 44 either right or left, as desired or required.

During fixed decimal point operation, the upper and lower accumulators 44 and 43, respectively, FIGS. 1 and 2a, are so arranged that a left shift instruction results in a serial read out of the accumulators starting at DX time in the lower accumulator. This serial readout passes through the accumulator early latches 56 over data lines 57 to the accumulator on-time latches 58, extends over lines 59 and enters the adder 33 at entry A. This data leaving the adder is returned to the accumulator one digit late. Thus the biquinary value originally stored in D1U, for example, is placed in D2U. Normal regeneration operates in the same manner, except that the output of the on-time latches 58 is directed to a diode switch array 62 conditioned by a regeneration control line 63.

As mentioned previously, a floating decimal data word or operand occupies positions as shown in FIG. 8. A floating decimal point number or data word in normal form appearing in the data registers and the like will be as follows:

$$D_{10}\ D_9\ D_8\ D_7\ D_6\ D_5\ D_4\ D_3\ D_2\ D_1\ D_0$$
$$6\quad 5\quad 8\quad 9\quad 3\quad 2\quad 4\quad 1\quad 6\quad 3\quad 8$$

The mantissa has a maximum of eight digits located from digit positions D10 to D3. The first or most significant figure is located at D10. The decimal point is assumed to be located before D10.

The characteristic is a two-digit exponent, which is modulo 50, located at digit positions D2 and D1.

The value at D0 will give the sign of the mantissa following the code:

Numeric: Biquinary
    8 = B5 Q3 = Negative = —
    9 = B5 Q4 = Positive = +

In accordance with this, the above ten-digit data word or operand appearing in any position and as an answer directed to the output will be interpreted by the operator as: $-.65893241 \times 10^{+13}$ or $-6,589,324,100,000$.

Of course, these numeric values appear as coded biquinary bit values and are so transmitted through the system.

As mentioned previously, data can only be shifted in the accumulators. However, a floating decimal left shift operation (FDLS) is slightly different from a normal left shift. The left shifting of the data during a floating decimal left shift is shown in FIG. 9, wherein the arrows extending from each digit position in the accumulator show the direction and location of a digit of data after the left shift. It is noted that during such a left shift, any data in the digit positions D2U–D1U and D2L–D0L are not shifted during the left shift operation. Under these conditions, the data at digit D10L is transferred and inserted or read into D3U. The value at DXL is dropped, and a zero is inserted at D3L. In this manner, the mantissa may be shifted left under certain conditions of operation, while the location of the exponent, D2U–D1U, of the mantissa remains fixed. This left shifting of the mantissa is utilized during a normalization operation, to be hereinafter explained, to place the most significant digit in the high order position D10U. Also the left shift is utilized during a multiply and divide operation wherein the value at digit D10 is placed in the DXL position to count the multiplier movement.

If the above number is placed in the upper accumulator, in order to left shift during floating point, the accumulators, starting with lower 43, FIG. 2a, are read out one digit time early. The readout data passes through the early latches 56, on-time latches 58 and over the data lines 59 to a left shift switch array 64, FIG. 2d, which is conditioned by a left shift gate 65 to direct the data to the adder 33. A one-digit delay is provided in the adder, and the data is directed over the data lines 49, FIGS. 2b and 2a, back to the left side of the upper accumulator through accumulator readin switching 66, FIG. 2a, one digit position delayed or one digit position to the left. With the circuitry modified to only shift the mantissa, the above data word would appear in the upper and lower accumulators 44 and 43 as:

6589324163    000000000000 before shifting and as:

5893241063    000000000016 after the left shift. That is, the number "0" at D10L is shifted to D3U instead of D1U, FIG. 9, as in a normal left shift. The exponent numbers at D2U and D1U are not shifted, they are blocked from going to the adder and instead they are regenerated in the accumulator over the lines 61 extending to the regeneration switch array 62, FIG. 2a. The circuit to perform this regeneration and to shift D10L to D3U is to be hereafter described.

The value 6 in D10U is ring shifted and stored in DXL. The DXL and D0L values are not shifted however a shift count is inserted at D0L. Because the other numbers perform a normal left shift operation, the circuitry is very similar to that used in the above-mentioned Hamilton et al. Patent 2,959,351 and is not shown. It is to be noted the sign at D0 does not appear in the accumulator. The sign value is separated and handled in sign analysis circuitry 60, FIG. 2c. Since this circuitry, while important, does not aid in the understanding of the invention, further description will not be given.

A diagrammatic representation of the shifting of data to the various digit positions during a floating decimal right shift is shown in FIG. 10. During a right shift, the data at D10U is placed in D9U, and a zero is inserted in D10U. Also the data at digit D3U is stored in D10L, while any data stored in D3L is dropped. As in the left shift operation, the data in digit position D2U–D1U and D2L–D0L, along with DXL, are not disturbed in this operation. Any data stored therein is placed back in the same original digit positions.

A right shift operation is provided during add and subtract operations in order to align the mantissas properly for addition or subtraction. The number of right shifts required is determined by the differences in the exponents of the two mantissas.

As shown in FIG. 10, a floating decimal right shift operation is somewhat similar to a floating decimal left shift operation; that is, during the right shift, the numbers or values at D2U–D1U remain in their previous positions. Thus after the right shift operation, the above data word appears in the accumulators as follows:

0658932463    100000000090

The value 1 at D3U is shifted to D10L, and the values at D2U and D1U remain in their previous positions. This is accomplished by a change in readout, RO, and readin, RI, times in the accumulator. During a right shift, the output from the early latches 56, FIG. 2a, feed over the lines 57 to supply the data to a right shift switching array 67 under control of right shift controls 68 to provide readin one digit early. Unlike the floating decimal left shift, the two values at D2U and D1U cannot be regenerated. If the right shift is performed in response to an overflow, when the shift is completed, the exponent is increased by one, and one is inserted at D10U instead of a zero. These operations will be hereinafter explained in detail.

The other values in the remaining digit positions in the accumulator are shifted as usual, and the circuitry is very similar to that used for a normal right shift.

To satisfy the validity check circuits, not shown, during a floating decimal right shift operation at D1U and D2U times, two bits must be present in the accumulator on-time latches 58, FIG. 2a. Since D1U–D2U are not read out, information must be forced into the accumulator on-time latches during these two time intervals. This is accomplished by raising the B0 and Q0 on-time latches 58 during D1U and D2U times.

Referring to FIGS. 2a to 2d for a brief description of the normal calculator operation, an operand at a particular address in the storage device 22, FIG. 2c, is directed, under control of an operating code, in the operation register 29 to place the word of data in the upper accumulator 44, FIG. 2a. While there are many possible operation instructions, it will be assumed for the purposes of this description that a reset load upper operation instruction is initiated. Under these conditions, the data at the selected address is read by the appropriate read/write heads or transducers 38, FIG. 2c, passes through the selected switching 30 over data lines 71 to a store in distributor switch array 72, FIG. 2d, which has been conditioned by a readin distributor line 73. The data is read into the distributor 34. At the next upper word time, the data is delivered from the distributor one digit early, serial by digit, to the early latches 52. The early latch outputs direct the data over the output lines 55 through a true add diode switch array 74 which has been conditioned by the output from the on side of a true add latch 75. From this switch the data is delivered to the entry B of the single digit adder 33. A one-digit delay occurs in the adder and the output therefrom extends over the data lines 49 and is stored in the upper accumulator 44, FIG. 2a, serial by digit in the same order.

During this time, any data in the lower and upper accumulator is destroyed or blocked at the A side of the adder by an add zero diode switch array 76, FIG. 2d, which is under control of the operation register 29, FIG. 2c. At the same time regeneration of the previous data in the accumulator is blocked at the regeneration switch array 62, FIG. 2a, by dropping the regeneration line 63. Thus any previously stored data is destroyed, and the data at the specified address is placed in the upper accumulator 44 as directed.

The next instruction may be an add upper operation; that is, the data at a specified address is to be added to the data in the upper accumulator 44. At the proper time, the desired data is delivered to the distributor 34, FIG. 2d, through the readin switching 72. The previous data in the distributor is destroyed at the distributor block regeneration switching 77 which is under the control of a regeneration control line 78.

At the next lower word time, the data from the lower accumulator is fed through the early latches 56, FIG. 2a, over early output data lines 79 to a true add switch array 81, FIG. 2b, at the A side of the adder and over the data line 48. The switch array 81 is conditioned by the true add latch 82 being On. While the distributor output is delivered in synchronism by means of its driving ring 37, FIG. 2d, the distributor switches 42 are down and delivery to the adder is blocked. However, zeros are entered for each digit position of the B entry under an add zero cycle from the special digit add switching 51, FIG. 2b. This provides a validity check arrangement and adds zero values to permit proper adder operation. In this manner the data in the lower accumulator is returned unchanged to the same digit positions.

During the following upper word time, the driving ring 36, FIG. 2a, now delivers the data in the upper accumulator 44 one digit early, serial by digit, and the distributor ring 37, FIG. 2d, delivers the data therein in the same manner. Under these conditions, the distributor true add switching 74 is conditioned, as well as the true add switching 81, FIG. 2b, and the data is added digit by digit with the data in the upper accumulator delivered to the true add switching 81 over the data line 79, FIG. 2b. After a digit delay, the sum is stored in the upper accumulator 44, FIG. 2a. Of course, the original data in the upper accumulator is blanked at this time by dropping the regeneration switch array 62. However, the data in the distributor is regenerated by passing from the early latches 52, FIG. 2d, to the on-time latches 53 serial by digit which in turn delivers on time the previously delivered data back for storage in the same digit positions. Thus the data in both the accumulators and distributor is retained therein until modified by the next instruction. Regeneration of the data is accomplished by continuously driving the distributor and the accumulator rings 37 and 36, respectively. Each word time the data in the distributor 34, FIG. 2d, is read out and regenerated as described above and more specifically set forth in the above-mentioned Hamilton et al. Patent 2,959,351. The accumulator 32, FIG. 2a, is regenerated each two word times by driving the ring 36 in consecutive order from lower to upper accumulator, as previously explained. Thus once for each two words, the data in either the lower or upper accumulator is available for processing.

In order to transfer data from the upper accumulator 44 to the distributor 34, FIG. 2d, a readin distributor from accumulator diode switch array 83 is conditioned at the proper time by a readin distributor from accumulator control line 84. The data leaving the accumulator 44, FIG. 2a, passes through the early and on-time latches 56 and 58, respectively, and is directed over the data lines 59 to the readin distributor from accumulator diode switch array 83, FIG. 2d. The output from this switch array directs the data serial by digit for storage in the distributor 34. During this interval, regeneration switching 85 is controlled to prevent the regeneration of the data appearing on the early latches 52 associated with the distributor.

As diagrammatically shown, there is provided a plurality of switches, mixes, latches and gates associated with the adder, accumulator and distributor and other mechanisms or components which are utilized to conduct data to and from and within the calculator. The particular use of the various elements will be hereinafter more fully described when referring to the detailed circuitry for performing the floating decimal arithmetic operation. It is to be understood that the calculator comprises many other components, not shown. Also that, for example, where a single latch, gate or the like is shown in a data line, there would actually be seven such latches, gates or the like, one for each bit position or line. However, some latches, for example, carry and no-carry latches are single latches. The actual number of latches required for each location, along with the number of diodes in each switch, are shown in the Hamilton et al. application.

Generally, a latch is up for one or more word times, while a gate is up for some predetermined time and usually lasts for two or more pulses or bits but for the most part is active for less than one complete word time.

In order to perform a floating decimal arithmetic operation, it is required that digit D2U and D1U in the upper accumulator 44, FIG. 2a, and digits D2 and D1 in the distributor 34, FIG. 2d, be capable of isolation under various conditions when operating upon the mantissas and that the mantissas be isolated from the exponent positions when dealing with the exponents. Thus the adder entries must be provided with gates which operate within specified digit times to provide the means for isolation.

In performing floating decimal arithmetic operations in a calculator of the above type, certain control circuitry is required as indicated by the block 86 in FIG. 2c. The floating decimal controls encompassed by this block have been shown diagrammatically in FIGS. 3a to 3k and 3m. In the latter figures a plurality of terminals have been provided. All of the terminals to the left of a related component or element and having inwardly directed arrows indicate that the control pulse or value delivered thereover is being received from the calculator proper at the appropriate timed interval. All of the terminals disposed to the right of a related component or element with an outwardly directed arrow indicate that the output from such terminal, when required, is directed to some portion of the calculator to control the same during certain phases of the operation. The various input and output lines will be hereinafter enumerated and located on the drawings of the above-mentioned Hamilton et al. Patent 2,959,351. For the purposes of simplicity, the following circuit description is being generally confined to floating decimal addition and subtraction. However, a system of this type would be applicable to multiply and divide operations also.

Further, the detailed circuitry associated with the sign analysis and the like has also been eliminated. This has been done to avoid overcomplication and because the sign analysis is carried out by a separate portion of the calculator and is not utilized in the distributor or accumulator proper. This circuitry merely operates to determine whether the true or complement latches or gates leading to the adder are to be operated and to provide a means for complementing the distributor exponent during a compare exponent operation.

CIRCUIT DESCRIPTION

Floating Decimal Add or Subtract and Compare Exponents Operation

Referring again to FIGS. 2a to 2d, it is assumed an operand has been placed in the upper accumulator 44, FIG. 2a, and the operation register 29, FIG. 2c, has received a floating decimal add operation code 32, including a data address which calls for the data at the specified address in storage 22 to be added to that in the upper accumulator 44. As the data at the specified address is selected and directed over the data line 71 to the distributor 34, FIG. 2d, the previously stored data in the distributor is blanked at the distributor block regeneration switching 77. Thus both operands are now in the position to perform the floating decimal add operation.

At the same time, the operation register and the D control 87, FIG. 2c, each provides an output over their respective lines. The D control line 88 conditions a B0T and Q3T tens switch 89, FIG. 3f, whose output is connected to one terminal each of a floating decimal add, floating decimal subtract, floating decimal add absolute and floating decimal subtract absolute diode switches 91, 92, 93, and 94, respectively. Since the B0U and Q2U lines are up along with the B0T and Q3T, code 32, an output is provided from the floating decimal add switch 91 which extends over a line 95 to turn On a floating decimal normalization latch 96. Simultaneously with this, an output extends through a diode mix 97 to raise an all floating decimal codes line 98 whose output extends to the calculator and to a diode switch 99 providing the input to a floating decimal enable arimethic code latch 101. At digit 9 time with the readin distributor line 73 up, the floating decimal enable arithmetic codes latch 101 is turned On to condition a diode switch 102 during DXL and D0L time of the next word time. This latter diode switch provides an output over a line leading to a diode switch 103, which is already conditioned by the floating decimal add line 95 conducting through a diode mix 104. Conduction from the switch 103 over its output line 103a extends through a diode mix 105 and over a conductor 106 to turn On the floating decimal add and subtract latch 107, FIG. 3b.

The floating decimal add and subtract latch 107 remains On for the entire add or subtract operation. This latch provides an output over its On line 108, which extends over lines 109, 110 and 111, FIG. 3f, to respectively turn Off the accumulator regeneration latch 112, FIG. 2a, turn On the arithmetic operation latch 113, FIG. 2c, and turn On the accumulator readin gate 114, FIG. 2a, except when restricted. Also as this floating decimal add and subtract latch 107, FIG. 3b, goes On, a capacitor coupled shot extends via a condenser and a cathode follower 115 over a line 116 and a diode mix to turn On a match exponents latch 117.

The same positive value on the line 103a which turned the add and subtract latch On is applied to a diode switch 118, FIG. 3f, which was previously conditioned by the distributor plus line 119, assumed to be up, and a floating decimal no absolute line 121, which is fed over the line 95 through a related diode mix. The output from the switch 113 is directed to a second diode switch 122 conditioned by the accumulator plus line 123, assumed to be up. Responding to the latter switch 122 is a conductor 124 leading to a switch 125, FIG. 3g, associated with a floating decimal accumulator true add latch 126. The switch 125 is blocked, at DXL time, but conducts at D0 time upon the application of a pulse over the D0 line to turn On the floating decimal accumulator true add latch 126. This latch remains On until the end of the rounding operation to be explained later.

An output line 127 from the match exponents latch 117, FIG. 3b, conditions related diode switches in timed sequence to provide output control values to the calculator. As the match exponents line 127 raises, it conducts through a diode mix 128 and a conductor 129 to turn On the accumulator true add latch 82, FIG. 2b. At DXL, a diode switch 131, FIG. 3b, provides a positive value over a zero insert line 132 leading to zero insert switching 69, FIG. 2b, located at the output side of the adder 33. When operated, this switching provides a zero at the output of the adder, regardless of the value supplied to the inputs. Thus a zero value is directed to the DXL position in the lower accumulator 43, FIG. 2a. A diode switch 133, FIG. 3b, conducts from D0L to DXU to raise an add zero line 134. When this line is up, the switching 51, FIG. 2b, is operated to supply zeros at the adder entry B, FIG. 2d, in timed relation to the values in the like digit positions in the accumulator. Also under these conditions, the add zero or any special digit takes precedence over the data supplied from the distributor.

The match exponents line 127, FIGS. 3b, 3f, 3j and 3k, switches with upper word line 148 and DX pulse at a diode switch 135, FIG. 3k, to provide an output over a conductor 136 leading to a diode mix 137 whose output in turn extends over a line 138 to a related diode mix 139, FIG. 3m. The positive output from this mix operates through an inverter 141 to turn Off an adder reset control latch 142, which had been set or turned On by conduction from a diode switch 143 at D10, DP and lower word line 144. This provides a negative value over the related latch line 140, which extends through a related diode mix 150 to an adder reset line 145 NAP adder reset (see also FIGS. 2c and 2d). The adder 33, FIG. 2d, in this instance, is reset by a negative pulse. Reset of the adder occurs by a negative word pulse, NAP, supplied at each digit time, unless restricted by a positive output delivered by the adder reset latch 142 to diode mix 150. Whenever the adder is not reset, that value remains until a later reset pulse is delivered. This adder reset control latch 142 will be described later.

During the next digit interval, at D0 time, a positive value is directed over the D0 line to diode switches 146 and 147, FIG. 3b. These switches are in turn connected to the upper word and the match exponents lines 148 and 127, respectively, to provide an output pulse from the switch 146 over a carry insert line 149 leading to a carry insert latch 151, FIG. 2b. The output from this latch operates a carry latch 152 to generate a fictitious carry over a line 153 leading to the adder 33, FIG. 2d. At the same time the diode switch 147, FIG. 3b, raises a distributor complement add line 154 to provide a positive value to a distributor complement add gate 155, FIG. 2d, whose output extends over a conductor 156 to condition one side of a distributor complement add switching array 157. Means for complementing the data is generally indicated at 158. While the carry insert line 149 only remains up during D0U, the distributor complement add gate 155 is maintained through D1U. This permits the gating of the early read out of the D1 and D2 positions of the distributor 34.

The true add of the D1U and D2U positions of the accumulator 44, FIG. 2a, with the complement add of D1–D2 in the distributor 34 provides a readout which is sampled at the adder output over biquinary lines leading to exponent analysis switching 159, FIGS. 2b, 3a, 3e, and 3i. Referring first to FIG. 3e, there is shown a pair of diode switches 161 which have been conditioned by the D1, match exponent line On, and upper word lines D1, 127 and 148, respectively. The upper switch 161 is connected to the B5 line, while the lower switch is associated with the B0 line, both of which extend from the adder output. At D1U time, one of the switches conducts to direct a positive value over one of the lines 162 or 163. Each of these lines is selectively connected in parallel with an independent group of diode switches 164, FIGS. 3e and 3i. The switches in each group are selectively connected to the Q0 through Q4 quinary lines extending from the output of the adder. Thus whichever quinary line is up switches with the raised binary line to provide a positive value to a related inverter 165.

Extending from the output of each inverter 165 is a conductor leading to a condenser 166. The opposite side of each condenser 166 connects through a conductor 167 to a pair of parallel connected diode switches 168 and 169 and controls one terminal of each. One terminal each of the switches 168 are parallel connected to a conductor 171 which extends from the output side of a switch 172, FIG. 3a, whose input includes a conductor 173 extending from an adder output carry test latch 174, FIG. 2b. One terminal each of the other switches 169, FIGS. 3e and 3i, is parallel connected to a conductor 175 which extends from a diode switch 176, FIG. 3a, whose input includes a conductor 177 extending from the adder output no carry test latch 178, FIG. 2b.

As shown in FIGS. 3e and 3i, the terminal side of the diode switches 168 and 169 connected to the condensers 166 is biased negative. Thus with all of the diode switches 164 down, the positive output from the related inverters 165 is blocked at the condensers 166 and cannot affect the related pairs of diode switches 168 and 169.

The exponent analysis is made during D1U–D2U and the number of shifts required, if any, is determined. The results of this analysis sets into motion circuitry controlling the direction the data must follow to perform the appropriate floating decimal arithmetic operation for the values to be operated upon. This exponent analysis will be described later.

From D2U to DXL, the output from the distributor 34, FIG. 2d, is blocked at the adder 33 by dropping the distributor complement add gate 155. This is accomplished by opening the switch 147, FIG. 3b, after D1U to reduce the potential on line 154. Further, the carry, if any, from D2U is blanked by generating an output from diode switches 181 and 182, FIG. 3m, which is directed over no carry insert and carry blank lines 183 and 184, respectively, to the no carry insert and carry blank latches 185 and 186, respectively, FIG. 2b. These latches are operative to actuate a no carry test latch 120 to provide an output over a no carry line 130, leading to the adder. During D2U to DXL, FIG. 3, switch 187 conducts to add zero over the line 134 which provides zeros to the adder entry B to compensate for the blocked distributor output.

During D1U–D2U of the above-mentioned match exponents operation, there are five possible conditions which may develop. Each will be described at this point and referred to later in the specification only in a general way.

As mentioned, during the match exponents operation, the accumulator true add latch 82, FIG. 2b, is raised and during D1U–D2U, the distributor complement add gate 155, FIG. 2d, is raised to complement any value in D1–D2 of the distributor. The digit positions are delivered to the adder one digit early in true and complement form respectively, and are added serial by digit and delivered over the output line 49 on time one digit time later for storage in D1U–D2U of the upper accumulator 44, FIG. 2a. Since the addition is true and complement, the result represents the difference between the exponents and not the specific values.

*Compare Exponents Operation*
(ACCUMULATOR MUCH LARGER THAN DISTRIBUTOR)

If, for example, the exponent in the accumulator at D2U–D1U is 75 and that in the distributor, D2–D1, is 62, a subtract upper operation provides 75 plus 38 (tens complement of 62)=113. The carry from the tens position is canceled. Thus the difference in exponents is 13, which is stored at D2U–D1U. A difference of this magnitude is beyond the normal eight digit mantissa storing capacity of the accumulator or machine. Therefore, the value in the distributor 34 can, during this particular operation, be considered zero for all practical purposes and is so handled.

During the subtract upper operation, the 3 appearing in D1U raises the B0—Q3 diode switch 164, FIG. 3i, to cause its related inverter 165 to conduct at D1. The B0—Q1 lines, FIG. 3a, are raised at D2U. This provides coincidence at a diode switch 189, which is now conditioned by the output from a switch 188, and provides an output over a line to a diode mix 191 whose output in turn feeds over a conductor 192 associated with one terminal of a diode switch 193. The other terminal of this switch is connected to the adder output carry test latch line 173 which is up at D2U time because of the carry from the tens position when adding the 75 plus 38=113. Conduction from the switch 193 over a line 194 operates an accumulator much larger than distributor latch 195 to turn the same On and raises its on line 196 for purposes to be hereinafter explained.

The conducting B0—Q3 diode switch 164, FIG. 3i, is dropped at the end of D1 to provide a positive capacitor coupled shot from the condenser 166 to the related diode switches 168 and 169. However, these switches are prevented from conducting because both of the connected lines 171 and 175 are held down by their respective controlling diode switches 172 and 176, FIG. 3a. Even though under these conditions, the adder output carry test latch line 173 is up leading to the diode switch 172, the other terminal of the switch is down because of the absence of a B0 leading to an associated diode switch 197. Thus the D1U, B0—Q3, value does not get through the switches 168 and 169, FIG. 3i, whose outputs lead to a selected one of a group of shift latches 198.

Any difference in exponents with a 1X, 2X, 3X, 4X, 5X, 6X, 7X, 8X, or 9X in the D2U position (tens position) and which includes a carry therefrom is selectively operative through one of the diode switches 189, 199 or 201, FIG. 3a, to turn On the accumulator much larger than distributor latch 195. Each of these conditions indicates that the number of shifts required for the data in the distributor 34 to align the mantissas exceeds the mantissa capacity of the accumulator. Therefore, the data in the distributor 34 is to be considered as zero for the add or substract operations which follow. Also under these conditions, the diode switches 168 and 169, FIGS. 3e and 3i, are held nonconducting, and any value at the D1U sampling switches 164 cannot operate its related mantissa shift latch 198.

If the difference in exponents is 09 and includes a carry from the tens position, the B5—Q4 diode switch 164, FIG. 3e, is operative to apply a pulse over the conductor 167 at the time the line 171 raises due to the B0—Q0 arriving at D2U time at the switch 197, FIG. 3a, along with a carry at the connecting switch 172. The corresponding output from the switch 168, FIG. 3e, conducts over a line 202 and turns On the accumulator much larger than distributor latch 195, FIG. 3a, but is not connected to any shift latch 198.

It will be noted that under the above conditions the carry line 171 also turns On an accumulator larger than distributor latch 203. However, the accumulator much larger than distributor on line 196 includes a branch connection directed to a diode switch 204 associated with the on side of the accumulator larger than distributor latch 203. As the D10U line raises, it provides a positive output from the switch 204 to turn Off the accumulator larger than distributor latch 203 prior to the next operation. This provides a positive means to assure that one and only one of the exponent analysis latches 195 or 203 is turned On.

*Compare Exponents Operation*
(ACCUMULATOR LARGER THAN DISTRIBUTOR)

During the compare exponents operation, if the result is 01, 02, 03, 04, 05, 06, 07, or 08 and a carry is included from the D2U or tens position, in every case the diode switch 172, FIG. 3a, provides an output over the line 171 to turn On the accumulator larger than distributor latch 203, and at the same time, one of the parallel connected diode switches 168 associated with the units position, FIGS. 3i and 3e, is operative to turn On a related shift latch 198. For example, if the units position carries a 3, B0—Q3, with a carry, an output from the associated diode switch 168, FIG. 3i, conducts over a line 205 and turns On the related shift three places latch 198, which is operative to provide an output from a related switch 206 over the add 6 line at the next DXL time. This 6 is the nines complement of the required shift. Each units value, 1 through 8, is operative in the same manner in which the required shift is automatically generated and inserted in D0L at the adder entry B during the next word time, as will be hereinafter explained. It is to be noted that an exponent difference of 8 will shift the entire mantissa from the upper accumulator. However, the eight shift still leaves the high order digit in position to effect the rounding operation to be explained later.

*Compare Exponents Operation*
(ACCUMULATOR EXPONENT=DISTRIBUTOR EXPONENT)

If the accumulator exponent equals the distributor exponent, the result stored in D2U–D1U is 00 and includes a carry from the tens position. With the disclosed circuit, the accumulator larger than distributor latch 203, FIG. 3a, is turned On at D2U by conduction of the line 171 as previously described. However, the B0—Q0 units switch 164, FIG. 3i, conducts whose inverter 165 drives its related switch 168 at the end of D1U to provide an output over a conductor 207 leading to an accumulator exponent equals distributor exponent latch 208, FIG. 3e, and turns the same On. The on side or output line 209 includes a branch conductor leading to a diode switch 211, FIG. 3a, which conducts at D10U over a line to turn the accumulator larger than distributor latch 203 Off in the same manner as described when a 09 exponent difference was sensed and the accumulator much larger than distributor latch 195 was On.

*Compare Exponents Operation*
(ACCUMULATOR SMALLER THAN DISTRIBUTOR)

Turning now to conditions where the result of the subtract operation stores an exponent difference which appears as a 99, 98, 97, 96, 95, 94, 93, or 92 at D2U–D1U and no carry occurs from the D2U tens position. The B5—Q4 tens diode switch 201, FIG. 3a, conducts at D2U, with the aid of switch 188, to raise a terminal of the diode switch 176 which is associated with the now raised adder output no carry test line 177. Coincidence at this switch 176 is operative to raise the output line 175 leading to an accumulator smaller than distributor latch 212, FIG. 3e, to turn the same On and at the same time raise one terminal each of the parallel connected diode switches 169, FIG. 3e and FIG. 3i. This permits the switch to conduct which is conditioned by the capacitor coupled shot coming from the related diode switch 164 associated with the raised units position at the end of D1U. For example, if the B5—Q1 diode switch 164, FIG. 3i, is conditioned, indicating a six in the units position, the related diode switch 169 provides an output over a conductor 213 to turn On the shift four places latch 193. This latch is operative through its related switch 206 to then raise the add five line at the next DXL time which provides the nines complement of the required shift.

Compare Exponents Operation
(ACCUMULATOR MUCH SMALLER THAN DISTRIBUTOR)

Should the complement difference in exponents be 91 or 90 with no carry from D2U, series connected switches 201 and 176, FIG. 3a, conduct over the line 175, and the output from the B0—Q0 or B0—Q1 diode switches 164, FIG. 3i, provide coincidence at one of the no carry switches 169 to direct an output over a line 210 leading to an accumulator much smaller than distributor latch 214, FIG. 3a, to turn the same On. At the same time, the conducting line 175 turns On, the accumulator smaller than distributor latch 212, FIG. 3e. However, the accumulator much smaller than distributor output on line 220 includes a branch conduit leading to the accumulator smaller than distributor latch 212, FIG. 3e, through a diode switch 214 to turn the accumulator smaller than distributor latch 212 Off at D10U.

If the values in the adder output are 8X, 7X, 6X, 5X, 4X, 3X, 2X, 1X or 0X at D2U and no carry has occurred, related diode switches 189, 197 or 199, FIG. 3a, are operative to provide coincidence at one of the switches 215 or 216 whose outputs extend over conductors to turn On the accumulator much smaller than distributor latch 214.

From the foregoing it can be seen that with any combination of exponents, one of five possible conditions will be determined. These are: (1) accumulator exponent is much larger than distributor exponent; (2) accumulator exponent is larger than distributor exponent; (3) accumulator exponent is much smaller than distributor exponent; (4) accumulator exponent is smaller than distributor exponent; and (5) accumulator exponent equals distributor exponent.

Also under conditions 2 and 4, the number of shifts required for one of the mantissas is determined. This required shift must take place before the add or subtract operation is permitted. The respective outputs from each of the above latches are associated with various operations which will be hereinafter described.

Restore Exponents Operation

Two word times after the beginning of the match exponents operation, a negative word pulse lower, NWPL, applied to a related switch turns Off the match exponents latch 117, FIG. 3b. Turning Off the match exponents latch drives a capacitor coupled shot over a conductor 217 to turn On a restore exponents latch 218 which raises its related line 219. This line provides an output through the diode mix 128 to raise the line 129 which turns On the accumulator true add latch 82, FIG. 2b. The restore exponents latch 218, FIG. 3b, will remain On for two word times and will be turned Off with a negative word pulse lower, NWPL.

The restore exponents latch 218 provides outputs under one of five possible conditions, these are: (1) accumulator much smaller than distributor; (2) accumulator smaller than distributor; (3) accumulator exponent equal to distributor exponent; (4) accumulator greater than distributor; and (5) accumulator much greater than distributor.

Assuming various differences in the exponents, the operation under each of these conditions will be set forth.

Restore Exponents
(ACCUMULATOR MUCH SMALLER THAN DISTRIBUTOR)

If the accumulator much smaller than distributor latch 214, FIG. 3a, is On during a restore exponents operation, a positive value on the related on line 220 passes through a diode mix, FIG. 3b, having a conductor leading to a diode switch 222. This switch includes terminals connected to the restore exponents line 219 and DXL to deliver a positive pulse to the add zero line 134 at DX lower time. Also at the same time, a switch 223 provides an output through a mix 224 connected to the zero inert line 132 to insert a zero at the output of the adder. From D0 through D10 lower, a diode switch 225 provides an output to a second diode switch 226 to add zero at the adder entry B. During this interval the distributor 34 is blocked at the B entry by holding the related switches down. At upper word time, a diode switch 227 connected to the accumulator much smaller than distributor on line 220, to restore exponents line 219 and to upper word line 148 provides an output over a conductor, through the diode mix 224 to raise the zero insert line 132. This zero insert continues for the entire upper word and resets the upper accumulator to zero. Thus the data originally in the accumulator and having the much smaller exponent is disregarded for all subsequent operations.

Under the above conditions, as the restore exponents latch 218, FIG. 3b, turns Off at the next NWPL, a capacitor coupled shot is directed over a line 228, FIGS. 3b, 3c and 3k, which combines at a diode switch 229, FIG. 3k, to provide an output if the floating decimal accumulator complement latch 295 on line 230 is up, over a conductor, which operates one of the diode switches 160 to provide an output over a related conductor 190 to reverse the condition of the accumulator sign latches 170, FIG. 2c.

Restore Exponents
(ACCUMULATOR SMALLER THAN DISTRIBUTOR)

If the exponent analysis indicates the accumulator is smaller than the distributor, during the restore exponents operation, the accumulator true add latch 82, FIG. 2b, is turned On from the line 129, FIG. 3b, and a diode switch 231 is conditioned at DXL and also by the restore exponents line 219 and the accumulator much smaller than distributor off line 232 to add zero at DXL along with a zero insert via the switch 223. The complement of the shift count, FIGS. 3e and 3i, is added at DXL to the adder entry B by raising the related switch 206 of the on shift latch 198, and this value is placed in D0L. Zeros are also added from D0L–D10L by raising the lower line 200 at switch 225, FIG. 3b, which conditions the switch 226 to raise the add zero line 134.

During D1–D2 and upper word time the respective lines are raised which lead to a diode switch 233 which is also conditioned by the now up restore exponents line 219 and the accumulator smaller than distributor on line 234. The output from the switch 233 extends through the mix 224 and zeros are inserted at the D1U and D2U positions. Since the result exponent will be the same as the exponent of the larger number, the exponent in the accumulator is insignificant and does not need to be restored. The output from similar positions D1–D2 in the distributor 34 are blocked at this time.

From D2U to DXL, D2 through D10 pulses switch with the upper word line 148 at a diode switch 235 which leads to the now conditioned diode switch 231 and causes the add zero line 134 to raise. As in the condition when the accumulator is much smaller than distributor and the floating decimal accumulator complement line 230 is up, the sign is changed by the switches 236 and 160, FIG. 3k, at D10U time.

Restore Exponents
(ACCUMULATOR EXPONENT=DISTRIBUTOR EXPONENT)

Should the exponent analysis indicate the accumulator exponent equals the distributor exponent, the related line 209, FIG. 3e, raises and the following steps take place. The accumulator true add latch 82, FIG. 2b, is turned On over the line 129, FIG. 3b, in the same manner as described, and zeros are added by switches 222 and 231, FIG. 2b, from DXL through DXU. At D1U and D2U, zero insert takes place from the diode switch 233, and zeros are added from D2U through DXL by conditioning of the series arranged switches 235 and 231. Thus the exponent positions D2U–D1U contain zeros and the accumulator mantissa remains unchanged.

*Restore Exponents*

(ACCUMULATOR LARGER THAN DISTRIBUTOR)

If the accumulator larger than distributor latch 203, FIG. 3a, is turned On during the exponent analysis, its related On line 237 is raised and acts as described presently. The accumulator true add latch 82, FIG. 2b, is set in the usual manner by conduction over the line 129, FIG. 3b, and add zero takes place at DXL from the diode switch 231. The complement of the difference in exponents is inserted at DXL from one of the add lines, FIGS. 3e or 3i, to provide the shift count. From D0L–D10L the add zero line 134 is up because of coincidence at the series connected switches 225 and 226, FIG. 3b.

During D0–D1 upper, a diode switch 238 conditioned by the on line 237 via mix 244 and by line 219, conducts to raise a distributor true add gate line 239 to operate the distributor true add gate latch 241, FIG. 2d. This permits the addition of the exponent in the D2–D1 in the distributor 34 to the difference in exponents which is now in D2U–D1U of the upper accumulator 44. The sum of the above restores the original exponent in D2U–D1U. From D2U to D10U add zero takes place from the series diode switches 235 and 231, FIG. 3b. Whenever add special digit or zero occurs at the adder entry B, suitable means, as for example, a distributor zero control line 242, FIG. 2d, is dropped to prevent the distributor data from passing to the B entry at the switching 42.

*Restore Exponents*

(ACCUMULATOR MUCH LARGER THAN DISTRIBUTOR)

If the accumulator much larger than distributor latch 195, FIG. 3a, has been turned On, the related on line 196 raises and the off line 243 drops. The set accumulator true add latch line 129, FIG. 3b, is raised in the usual manner, and the add zero and zero insert lines are raised for DXL to DXU by means of the series switches 225 and 226. During upper word time, the accumulator much greater than distributor on line 196 conducts through a diode mix 244 and conductor to the diode switch 238. This switch is also conditioned by the restore exponents line 219, upper word, and the D0 and D1 lines to raise the distributor true add gate line 239. Operation of the distributor true add gate permits the exponent values at D1–D2 in the distributor 34 to be directed to the adder in synchronism with the exponent difference in D1U–D2U in the upper accumulator. Thus the original exponent is restored to the upper accumulator D2U–D1U. At the end of D2U, the distributor true add gate line 239 is dropped. From D2U to D10U, the diode switches 225 and 231, FIG. 3b, operate to raise the add zero line 134 and zeros are provided at the B entry of the adder to replace the normal mantissa from the distributor. During all of the restore operations, the switches 181 and 182, FIG. 3m, are operated to prevent a carry from D2U to D3U.

At D10U in any of the above-described cases, the restore exponents operation is completed, and as can be seen, this operation provides several possible values at the D1U–D2U positions in the upper accumulator 44. Briefly, they are as follows: when the accumulator is either larger or much larger than the distributor, the exponent is returned to its original value. If the accumulator exponent is equal or less than the distributor, the exponent positions D2U–D1U in the accumulator are reset to zero. If the accumulator exponent is much smaller than the distributor exponent, the exponent positions D2U–D1U in the accumulator are reset to zero and the mantissa D3U through D10U is also reset to zero. Under the two latter conditions, the exponent value stored in the distributor 34 is placed in the accumulator at a later time.

*Interchange Accumulator and Distributor*

An interchange of accumulator and distributor value is only required when the accumulator is either larger or much larger than distributor. Under all other conditions, this operation is bypassed. When the restore exponents operation is completed under any of the above conditions, a NWPL turns Off the restore exponents latch 218, FIG. 3b. This action directs a capacitor coupled shot over the related conductor 228 to diode switches 245 and 246, FIG. 3c, associated with an interchange accumulator and distributor latch 247. If the accumulator larger than distributor on line 237 is up, the diode switch 245 provides an output to turn On the interchange accumulator and distributor latch 247, and if the accumulator much larger than distributor on line 196 is up, the other switch 246 operates to do the same thing. Turning On the latch 247 brings up related interchange line 248. This provides coincidence with lower word line 200 at a switch 249, FIG. 3g, to raise the lines 134 and 251 to operate an accumulator true add gate 252, FIG. 2b, and add zero for the entire lower word. A diode switch 253, FIG. 3c, is operated from the interchange line 248 and DXL which provides an output over a conductor and diode mix 254 to the zero insert line 132.

At upper word time, the upper word line provides coincidence at a diode switch 255 to raise the readin distributor from accumulator line 84 and supplies an output from a power tube 240 to a conductor 250 leading to the block distributor regeneration switch 85, FIG. 2d. This permits an output from the early latches 52, which feed to the adder 33 at this time. The adder entry A zero control line 256, FIGS. 3c, 2c and 2d, is raised to operate through the switch array 76 to add zeros at the A side of the adder during the entire upper word time. During D1U–D2U, a diode switch 257, FIG. 3g, provides an output over a conductor to the diode mix 254, FIG. 3c, leading to the zero insert line 132, and zeros are inserted into D1U–D2U.

From D2U–DXL a diode switch 258, FIG. 3g, is conditioned by the accumulator larger than distributor and interchange lines 237 and 248, respectively, to raise the distributor true add gate line 239, which in turn permits conditioning of the switches 74, FIG. 2d, to permit the passage of the values in D3–D10 in the distributor to the B entry of the adder. At this point, the A entry is provided with zeros from the adder entry A zero control switch array 76, and the output from the adder 33 is directed over the data lines 49 on time for storage in the upper accumulator 44, FIG. 2a, in like positions. During this interval, the readout from the accumulator 44 extends through the early and on time latches 56 and 58, respectively, over the data lines 59 to the readin distributor from accumulator switch array 83, FIG. 2d.

At the end of this operation, the upper accumulator 44 now carries the mantissa formerly located in the distributor 34, with the exception of the exponent which has been blanked. The distributor 34 now contains the entire word formerly in the accumulator 44, including its exponent. The interchange of mantissas has been completed and a right shift of the mantissa in the upper accumulator is now in order, in accordance with the required shift.

When the accumulator is much larger than distributor, the same operation occurs as above described for the accumulator is larger than distributor, except that from D1U to D10U, a diode switch 259, FIG. 3c, associated with the accumulator much larger than distributor on line 196 provides a zero insert for the entire upper word. Thus the distributor 34 will contain the values originally in the upper accumulator 44, while the original distributor values are blanked, and the entire upper accumulator is reset to zero. After a transfer of this type, the right shift operation is not required and a start floating decimal add or subtract operation starts immediately. A flow diagram of an interchange accumulator and distributor is shown in FIG. 31.

*Floating Decimal Right Shift*

There are three conditions when a right shift of the mantissa must take place. One—when the accumulator is smaller than distributor. Two—when the distributor is smaller than the accumulator, but only after the interchange accumulator and distributor operation, which places the smaller mantissa in the upper accumulator. Three—when a mantissa overflow occurs during an add or multiply operation.

At the end of the above-mentioned mantissa interchange operation, a negative word pulse lower NWPL turs Off the interchange accumulator and distributor latch 247, FIG. 3c, and a capacitor coupled shot extending over a related conductor 261 combines with the accumulator much larger than distributor off line 243 at a diode switch to turn On a floating decimal right shift latch 262.

If the accumulator smaller than distributor latch 212, FIG. 3a, were On, the floating decimal right shift latch 262, FIG. 3c, would have been turned On at the end of the restore exponents operation when the shot extending over the line 228 provides coincidence with the accumulator smaller than distributor on line 234 at a switch 263. Under these conditions, the above-described automatic interchange accumulator and distributor operation is bypassed.

A floating decimal right shift operation is identical with a normal right shift, as described in the mentioned Hamilton et al. Patent 2,959,351, except that the readin and readout switches of the accumulator 44, FIG. 2a, are altered at D10L through D2U. With the floating decimal right shift latch 262 On, FIG. 3c, the right shift on line 264 provides a positive value to turn On the calculator any right shift latch 68, FIG. 2a, and prevents further arithmetic operations until the proper number of right shifts have been completed. At the same time the line 264 provides coincidence with DXL and D0L at a diode switch 265, FIG. 3c, to raise the line 266 and turn On the accumulator readin gate 114, FIG. 2a.

A right shift is not provided at DXL–D0L. The shift count always remains at D0L. On a mantissa right shift, a one is supplied to the B entry of the adder for addition to the shift count entering at entry A under control of the accumulator true add gate 252, FIG. 2b. During the remainder of the two word times, the adder is not utilized for the right shift operation. The on side or line 264 of the floating decimal right shift latch is also connected to a diode switch 267, FIGS. 2a and 3c, which receives an output from related diode switch at D10, lower word, D1 and upper word, to provide an output over a line 268 leading to an accumulator pedestal error checking circuit 269 to compensate for the digit values dropped from D1U–D2U.

A right shift, beginning at D3L time reads out the data stored at D4L into the accumulator early latches 56, FIG. 2a, this data is then directed over the data lines 57 to the diode switch array 67, which is conditioned by the latch or the like 68 held up for any right shift. Thus the stored data at D4L is read in to D3L, as shown in FIG. 10. The data at D3L is dropped and zeroes are provided at D1L–D2L. At D9L time, D10L is read out and stored in D9L. At D10L time, diode switch 267, FIG. 3c, which is connected to the lower word line and D10 conducts via diode mix network over line 268 to the accumulator pedestal error checking circuit 269, FIG. 2a, to satisfy the validity check.

With the floating decimal right shift latch 262 On, FIG. 3c, the floating decimal right shift off line 271 is down. Thus a RO–D1U switch 272 is held down at D10L to block the read out of D1U which is normally read in to D10L. RO–D2U and RI–D1U is also blocked at a switch 273 by the down off line 271. DXU–D0U conduct through a mix 260 to the B0–Q0 lines which operate the on time latches 58, FIG. 2a, to automatically provide an output to the error checking circuit 269. Likewise, the D1U and D2U lines connect to a diode switch 270, FIG. 3c, conditioned by the floating decimal right shift on line 264 to maintain the same latches On. Thus the readout at D10L, D0U and D1U time is blocked at the switches 272 and 273 and no shifting can occur.

At D2, upper word, and negative A pulse, NAP, the respective lines provide coincidence at a switch 274 to conduct over the readout RO–D3U line to permit readout of the data at D3U. Under these conditions, a diode switch 275 conditioned by the D2 and one line 264 provides an output over the readin D10L line to read in the data from D3U into D10L, as shown in FIG. 10. This readin from D3U to D10L may be under the control of a suitable switch array 280, FIG. 2a. From this point on, each digit of data is shifted right one digit position in the normal manner. A zero is inserted from the adder in D10U.

For each complete right shift, FIG. 10, after the initial entry of one, one is added to the D0L position (not shown) to raise the shift count. When a carry occurs at D0L, this indicates that the floating mantissas are properly aligned and the floating decimal right shifting of the mantissa is now completed. Accordingly, a diode switch 276, FIG. 3b, has coincidence provided by the floating decimal add and subtract latch On line 108, carry line 173 and D0L. This provides an output over a conductor 277 leading to the floating decimal right shift latch 262, FIG. 3c, to turn the same Off. This is the end of the right shift operation and indicates that the accumulator mantissa is now in proper alignment with the distributor mantissa for the add or subtract operation which is to follow.

*Start Floating Decimal Add or Subtract Operation*

The start floating decimal add or subtract operation may be initiated under four different conditions:

(1) When the accumulator much larger than distributor latch 195, FIG. 3a, is On, the start floating decimal add or subtract operation begins at the end of the interchange accumulator and distributor operation by the capacitor coupled shot produced by interchange accumulator and distributor latch 247 over the line 261 which switches with the on line 196, FIG. 3g, to turn On a start floating decimal add or subtract latch 278.

(2) When the accumulator much smaller than distributor latch 214, FIG. 3a, is On, the operation is initiated when the restore exponents latch 218, FIG. 3b, is turned Off, and the capacitor coupled shot extending therefrom over the line 228, FIGS. 3b, 3c and 3g, switches with the accumulator much smaller than distributor on line 220, FIG. 3g.

(3) When the accumulator exponent equals distributor exponent latch 208, FIG. 3e, is On, the start add or subtract operation is initiated when the restore exponents latch 218, FIG. 3b, is turned Off which directs the capacitor coupled shot on the related line 228 to switch with the equals on line 209, FIG. 3g.

(4) At the completion of the floating decimal right shift operation, the carry at D0L raises the switch 276, FIG. 3b, and related line 277 which directly turns On the start floating decimal add and subtract latch 278, FIG. 3g.

Operation of the start floating decimal add or subtract latch 278 brings up its related output line 279 which is up for two word times and may direct the data through the calculator in one of two possible paths. This involves accumulator true and accumulator complement add operations.

True Add

If the floating decimal accumulator true add latch 126 is On, the accumulator and distributor values will enter the adder 33 serial by digit in true form. That is, the true add latches for both are energized. The exponent analysis is of no significance during this operation.

As the start floating decimal add or subtract latch 278 goes On, its related line 279 raises and when the next BP—CP digit pulses are applied to a diode switch 281, which is also conditioned by the floating decimal accumulator true add on line 282, a positive pulse is directed over a conductor 283 which is connected to the set accumulator true add latch line 129 to turn On the accumulator true add latch 82, FIG. 2b. At DXL–D0L, the now conditioned diode switch 284, FIG. 3g, provides an output to raise the set distributor true add lach line 285 to turn On the distributor true add latch 75, FIG. 2d. Also the start floating decimal add or subtract line 279 connects at a diode switch 286, FIG. 3g, with DXL to cause conduction over the zero insert line 132 to zero insert at the adder. At D0L, a no carry insert is provided over the line 183 to the adder no carry latch 120, FIG. 2b. While the distributor true add latch 75, FIG. 2d, is up, the distributor zero control line 242 is down to prevent passage through the adder 33. In this manner, zeros are added DXL–D10L.

The D0–D1 lines switch with the upper line 148 to provide a positive value over a line leading to a switch 287, FIG. 3g, having one terminal connected with the start floating decimal add or subtract line 279. Thus at ED0 and ED1 time, during the B and C pulse intervals, an output from the switch 287 operates the related lines to turn On the B0 and Q0 early latches 56, FIG. 2a. This early latch operation takes the place of the charges in the accumulator storage capacitors which may or may not have been lost during the floating decimal right shift. During this interval, since D1U and D2U always contain zero, B0—Q0, on an add operation of this type, this signal will not cause malfunction if no right shifts were performed.

From D1U through D10U, the data at D1–D10 in the distributor 34 is added to the similar digit positions simultaneously entering the A entry of the adder from the accumulator. Thus the mantissa in the distributor is true added to that in the accumulator, and the sum is placed in the upper accumulator 44 along with the exponent which was in the distributor.

If no carry occurs at D10U, when true adding the mantissas, this is the end of the true add operation and coincidence occurs at a diode switch 288, FIG. 3d. This switch conducts at D10U when the no carry test latch, floating decimal accumulator true add and start floating decimal add or subtract lines D10U, 177, 282 and 279, respectively, are up. Conduction of this switch turns On a floating decimal rounding latch 289, whose operation will be hereinafter explained.

However, if a carry had occurred at D10U, under the same true add operation, the switch 288 remains down, and the floating decimal rounding latch remains Off. Under these conditions, a switch 291, FIG. 3g, connected to the carry test latch line 173, D10U and line 283 provide a positive value over a conductor 292 which leads to and turns On a check overflow right shift latch 346, FIG. 3m. The operation of this latch will be explained later. At the next NWPL, the start floating decimal add or subtract latch 278, FIG. 3g, is turned Off, and a capacitor coupled shot is directed therefrom over a conductor 294 to turn Off the accumulator much larger or much smaller latches 195 or 214, respectively, FIG. 3a, if On.

Complement Add

Should the OP code applied to the switches 91 through 94, FIG. 3f, and signs of the data be such to provide an output from switching 250, the floating decimal accumulator complement latch 295, FIG. 3k, is turned On rather than the floating decimal accumulator true add latch 126, FIG. 3g. Under these conditions, the accumulator data is switched to enter the adder entry A in complement form, while the distributor data enters the B entry in true form. Since un-normalized numbers may be used, the exponent analysis network will not necessarily indicate whether the accumulator is smaller or larger than the distributor. This determination must wait until D10U and analyze the carry or no carry condition to determine if the previous exponent analysis was correct. A carry from D10U indicates that the accumulator is smaller than distributor, and a no carry indicates that the accumulator is greater than distributor. All floating decimal complement add operations are followed by a true or complement adjust.

The floating decimal accumulator complement add operation is initiated by raising the start floating decimal add or subtract line 279, FIG. 3g, and a zero insert occurs at DXL from the switch 286. At the same time, a diode switch 296 provides an output by coincidence values supplied over the floating decimal complement accumulator and start floating decimal add or subtract lines 230 and 279, respectively. The output from this switch 296 is directed over a conductor 297 through a mix 298 and a conductor 299 leading to a switch 300 which provides an output over the line 301, when D0L raises, to set an accumulator complement add latch 302, FIG. 2d; at the same time, the zero insert line is raised for a zero insert.

The line 297, FIG. 3g, extending from the switch 296, remains up and conditions one side of a switch 303, FIG. 3k, likewise conditioned by the lower word line to drive through a diode mix and raise the add zero line 134. This adds zero at the B entry of the adder 33 for the entire lower word and prevents the entry of the data from the distributor 34, FIG. 2d. If a carry occurs from D10L, assuming a complement add with all zeros in the lower accumulator, a diode switch 304, FIG. 3m, conducts to turn On a floating decimal carry shift latch 305. This is provided by coincidence positive values at D10, lower word, BP and CP, along with the up adder output carry test line 173 and the raised line 299. As this latch turns On, a related floating decimal carry shift latch line 306 raises to condition terminals of certain associated diode switches 307 and 308. This carry shift latch is always operated when a carry occurs at D10L.

Since the line 299 remains up, a connected inverter follower 310 holds the switches 307 down. Thus at D10, lower word time, the output from an inverter follower 309 provides coincidence at the switch 143, whose output is operative to set the adder reset control latch 142. The adder is reset at DXU by coincidence of DX and upper at a switch 311, FIG. 3k, with the line 297. This provides a pulse through the mix 137, line 138, mix 139, FIG. 3m, to the inverter 141 to turn Off the adder reset latch 142 to insert the carry at D0U. At D0U and D1U positive values provide coincidence with line 297 at a switch 312, FIG. 3k, to add zero to the adder entry B. Also a switch 322, FIG. 3g, provides an output at D0U to provide a carry insert to the adder over the related line 149. The arrival of D2 and upper word positive values at a switch 313, FIG. 3k, provides an output on the line 285 to set the distributor true add latch 75, FIG. 2d. Also at D2 and upper the switches 308, FIG. 3m, conduct over their respective lines 149 and 314 and provide a carry insert and no carry blank to the adder by operating their associated latches 151 and 315, FIG. 2b. With this operation, the zero data in the exponent positions D2U–D1U is returned to zero.

As the D3 line raises, it switches with the upper line at a switch 316, FIG. 3m, to provide a positive pulse to the floating decimal carry shift latch 305 to turn the same Off.

If no carry had occurred at D10L, the floating decimal carry shift latch 305 remains Off, and thus its line 306 remains down. The adder reset control latch 142 is turned On from the switch 143 and is turned Off from switch 311, FIG. 3k, at DXU. A carry insert is provided from a switch 322, FIG. 3g, to generate the elusive one to return the exponent positions to zero. However, under these conditions, the line 306 leads to an inverter follower 317 which provides a positive output over a connector leading to the pair of diode switches 181 and 182. These switches are both rendered conductive by coincidence of the D2 and upper lines, the floating decimal carry shift latch 305 Off and the floating decimal arithmetic operation on line 98 to provide outputs over the no carry insert and carry blank lines 183 and 184, respectively. In this manner the carry from D2U is blanked and cannot change the mantissa values.

During D0–D1 upper, BP and CP times, an output is provided from the switch 287, FIG. 3g, to again set the B0 and Q0 early latches 56, FIG. 2a, and add zero takes place from the switch 312, FIG. 3k. At the next digit time, the D2 and upper lines provide coincidence at the switch 313 to raise the line 285 and set the distributor true add latch 75, FIG. 2d. From this point on, the data from D3U–D10U positions is complemented and directed to the adder at the A entry, while the similar positions D3–D10 in the distributor are delivered in true form at the B entry of the adder. Addition takes place in the adder, and the result is stored back in the upper accumulator D3U–D10U.

In both of the above-described complement add conditions with a carry or no carry from D10L, at the end of two word times, the distributor 34 has been added to the mantissa in the upper accumulator. However, the exponent of the data is still in the distributor and will be transferred to D2U–D1U during one of the next two operations to follow.

When floating decimal accumulator complement addition is taking place, the output on line 297, FIG. 3g, associated with the switch 296 is directed to two switches 323 and 324, FIG. 3h. These switches are also commoned with the D10U line; however, switch 323 is connected to the no carry line 177, while the switch 324 connects with the carry line 173. These switch operations will be explained later.

The first negative word pulse lower following addition of the mantissas turns Off the start floating decimal add and subtract latch 278, FIG. 3g. As this latch turns Off, a capacitor coupled shot extends over the related conductor 294 to turn Off the accumulator much greater than distributor or the accumulator smaller than distributor latches 195 and 214, respectively, FIG. 3a, if either are in their On condition.

*Floating Decimal Accumulator True Adjust*

Under floating decimal add or subtract conditions, when the accumulator complement is required, a test must be made to determine whether the data returned to the accumulator from the adder is in true or complement form. Thus with a complement add from the accumulator and a carry at D10U, coincidence occurs at the switch 324, which cooperates with an inverter 325 to drop its output line. At the end of D10U, the switch 324 drops, and as the related inverter 325 returns to cut-off, a capacitor coupled shot from the connected condenser 326 turns On a floating decimal accumulator true adjust latch 329 to bring up its related line 331.

The carry from D10U indicates that the result mantissa is in true form and that the next operation is to be a true add operation. The floating decimal accumulator true adjust line 331 raises the line 129 to turn On the accumulator true add latch 82, FIG. 2c. The true adjust line 331 also feeds through a diode mix 332, FIG. 3h, to a conductor 333 which is parallel connected to a group of switches 334, 335 and 336. These switches provide a plurality of timed outputs. The switch 334 raises at DXL time to provide a zero insert. From DXL through D10L the output from an inverter follower 337, whose input is connected to the D0U–D1U lines, provides a positive value at the switch 336 to add zero at the B entry of the adder via line 134, FIG. 2b.

At D0U–D1U their respective lines are up. This operates through the inverter 337, FIG. 3h, to drop the switch 336 leading to the add zero line 134 and coincidence at the switch 335 associated with D0U–D1U raises the line 239 to operate the distributor true add gate 241, FIG. 2d, for two digit times. In this manner the exponent at D1–D2 in the distributor 34 passes through the adder 33 for storage at D1U–D2U in the upper accumulator 44, FIG. 2a. For the remainder of the word, D3U to D10U, the add zero line 134 is again raised at the switch 336, FIG. 3h, to block the distributor mantissa, and zeros are substituted at the adder entry B.

If the exponent analysis indicated that the accumulator exponent equaled the distributor exponent and the true adjust latch 329 was operated with a carry at D10U, this indicates that the true value is in the accumulator. However, the accumulator sign latches 170, FIG. 2c, must be reversed because the distributor mantissa was actually larger than the accumulator mantissa. Under these conditions, an output occurs at a switch 338, FIG. 3g, upon coincidence with the accumulator equals and the true adjust lines 209 and 331, respectively. This provides an output over conductors 339 and 341 leading to the switches 160, FIG. 3k, which switch with D9, upper word and C–A gate to change the sign of the accumulator sign latches 170, FIG. 2c.

As the floating decimal accumulator true adjust latch 329, FIG. 3h, goes Off at the next NWPL, a capacitor coupled shot is directed over a related conductor 342, diode mix 343, and a conductor 344 to turn On the rounding latch 289, FIG. 3d. This is the end of the floating decimal true adjust operation. The result mantissa and related exponent are now properly inserted or aligned in the upper accumulator.

*Floating Decimal Accumulator Complement Adjust*

Should no carry occur at D10U, during the complement add operation, this indicates the result mantissa is in complement form and must be recomplemented. Thus switch 323, FIG. 3h, conducts at D10U and no carry, at the end of D10U, a capacitor coupled shot is provided from the related condenser 326 to turn On a floating decimal accumulator complement adjust latch 327 which raises its related line 328. As this line raises, it conducts through mix 332 and over line 333 and conditions the diode switch 334, to provide a zero insert in DXL.

As mentioned above for complement accumulator addition, the line 299, FIG. 3g, conditions the diode switch 300, which provides an output at D0L. This raises the line 301 to set the accumulator complement latch 302, FIG. 2d, and provide a zero insert at D0L. From this point on, the floating decimal accumulator complement adjust operation is identical to the floating decimal accumulator true adjust operation, except that the accumulator values are complemented. This adds zero at the switch 336, FIG. 3h, and raises the distributor true add gate from the switch 335 at D0U–D1U to permit the exponent values in D1–D2 to pass through the adder for insertion in D1U–D2U. If a carry occurs at D10L, the floating decimal carry shift latch 305, FIG. 3m, is turned On, as previously described to provide a carry insert and no carry blank to the adder at D2U. The floating decimal carry shift latch 305 is turned Off at D3U by the switch 316 in the usual manner.

During the complement adjust operation, the complement adjust line 328 conditions a pair of switches 345, FIG. 3g, which selectively switch with the accumulator smaller and accumulator larger lines 234 and 237, respectively, to provide an output over the line 341 and change the sign of the accumulator latches 170, FIG. 2c, from the switching 160, FIG. 3k. Turning Off of the latch 327, FIG. 3h, provides a capacitor coupled shot over a related conductor 330, through the mix 343 and conductor 344 to turn On the floating decimal rounding latch 289, FIG. 3d. The result mantissa is now in true form, and the related exponent is stored in the upper accumulator.

From the above it can be seen the data may be delivered from the accumulator in either true or complement form. This is determined by the sign analysis which is operative to turn On either the floating decimal accumulator true add latch 126, FIG. 3g, or the floating decimal accumulator complement latch 295, FIG. 3k.

*Check Overflow Right Shift*

If a mantissa overflow should occur during a floating decimal true add operation, the carry line 173, D10U and the up line 283 provide coincidence at the switch 291, FIG. 3g, to develop an output over the conductor 292 which extends to the input of the check overflow right shift latch 346, FIG. 3m, to turn the same On. This latch is held by a B pulse switched with D10 upper which is applied to an inverter follower 347 whose output is connected to a related latch back switch. The output from the latch 346 raises its associated line 347 to provide coincidence at a switch 348 during DXL–D0L which raises the line 266 to turn On the accumulator readin gate 114, FIG. 2a, and zero insert at this time. At D0L a second switch 349 directs an output over a conductor 351 to turn On the floating decimal right shift latch 262, FIG. 3c.

Turning On the right shift latch starts a right shift operation to shift the mantissa one digit position to the right with the data at digit D3U being placed in D10L, as previously described under a normal right shift operation. As mentioned, at the end of the right shift, a zero is stored in D10U. The next D10U and BP drops the positive output from the inverter follower 347, FIG. 3m, to turn Off the check overflow right shift latch 346. Turning Off of this latch provides a capacitor coupled shot over a related conductor 352 to turn On a check overflow exponent latch 353.

*Check Overflow Exponent Operation*

There are two conditions which turn On the check overflow exponent latch 353. These are: (1) the turning Off of the check overflow right shift latch 346 and (2) if a carry occurs at D10U during a rounding operation.

In the first case the capacitor coupled shot extending over the conductor 342 turns On the check overflow exponent latch 353 and raises its related output line 354. This line feeds back to hold the latch On in cooperation with the positive output of the inverter follower 347. The check overflow exponent latch line 354 also provides a positive output to a diode switch 355 which is conditioned by the positive output of an inverter follower 356. This inverter follower is associated with a switch 357 which is conditioned to conduct during upper word time at D0, D9 and D10. Thus with the exception of D0U, D9U and D10U, the add zero line 134 is raised at the adder entry B. At DXL time the check overflow exponent line 354 provides a positive value to diode switches 358, 359, and 361, FIG. 3h, to respectively provide a zero insert, raise the line 129 to turn On the accumulator true add latch 82, FIG. 2b, and transmit a positive value over a conductor 362 to turn Off the floating decimal right shift latch 262, FIG. 3c.

The arrival of D0 and upper word at the switch 357, FIG. 3m, acts on the inverter follower 356 to drop the add zero line 134, but this same condition provides coincidence at a switch 363, FIG. 3h, whose output extends through a mix to an add 1 line 364 associated with the special digit add switching 159, FIG. 2b, at the adder entry B. Thus a 1 is added to the value delivered from D1U. This increases the exponent by 1 and compensates for the previous right shift caused by the overflow of the mantissa from D10U during true accumulator add operation.

At D2, upper, BP and CP time the adder output carry test line 173 is sampled at a switch 365, FIG. 3m. If a carry occurs at D2U, this switch conducts and sends a pulse over a floating decimal exponent overflow line 366 which is directed to suitable indicating or switch means 367, FIG. 2b, at the console to indicate the exponent overflow condition and stop the calculator if such an operation is required or desired.

Assuming no overflow at D2U, add zero again occurs at the switch 355, FIG. 3m, until D9U. At this point switch 355 drops and a switch 368, FIG. 3h, is conditioned by upper word, D9, and the check overflow exponent line 354 to raise the add 1 line 364 and add 1 to the adder entry B. This supplies the 1 which was previously lost when the mantissa overflow occurred, during the true add operation.

In the above manner the mantissa is automatically corrected to receive the overflow value back in the high order digit position, and the exponent is automatically adjusted to keep track of the decimal point. At D10U and BP the inverter follower 347, FIG. 3m, output drops to turn Off the check overflow exponent latch 353. Turning Off of this latch produces a capacitor coupled shot over a related conductor 369, leading to a switch 370, FIG. 3d, conditioned by the floating decimal accumulator true add on line 282 to initiate the rounding operation.

The second condition for operating the check overflow exponent latch 353, FIG. 3h, is when an overflow from D10U occurs during a rounding operation. This overflow when rounding can only occur when the mantissa, D3U–D10U, contains nines throughout and D10L contains a value of five or more. If this happens, at the completion of the rounding operation, a capacitor coupled shot extends over a conductor 371 and provides coincidence at a switch 372 with D10U and carry line, FIG. 3m, to turn On the check overflow exponent latch 353.

With an overflow during rounding, the entire lower and upper accumulators, except D1U–D2U, contain zeros, therefore, a right shift is not necessary. Under this condition, the check overflow exponent operation is started immediately, without a previous right shift, by providing the zero insert and add zero in the above-described manner. The switch 365, FIG. 3m, checks for a carry at D2U to detect an exponent overflow, and a 1 is added at D0 upper and D9 upper through the switches 363 and 368, FIG. 3h, to correct the exponent value, and the overflow value is placed at D10U.

Conduction of the inverter follower 347, FIG. 3m, marks the end of the check overflow exponent operation. A capacitor coupled shot extends from the cathode follower associated with the conductor 369 to again turn On the floating decimal rounding latch 289, FIG. 3d, for a second rounding operation. This is the end of the check overflow exponent operation.

*Floating Decimal Rounding Operation*

In the foregoing, some of the possible operations or paths have been described that values may take during a floating decimal add or subtract operation. When a floating decimal arithmetic operation is initiated, regardless of the paths or operations performed upon the data, one of the final steps is to round the data in the accumulator to provide a more nearly accurate result mantissa or number. For this reason, the rounding latch 289, FIG. 3d, is provided. However, it is operated or turned On only after certain conditions have been met. One of these is that no carry must have occurred at D10U during the previous word time. Further, one of the following conditions must have transpired before rounding can occur:

(1) The floating decimal accumulator true add and start floating decimal add or subtract latches 126 and 278, respectively, FIG. 3g, must be On, along with the up no carry line 177 and D10U at the switch 288, FIG. 3d.

(2) The accumulator true add latch 126, FIG. 3g, must be On, and the check overflow exponent latch 353, FIG. 3m, has just turned Off. This indicates the automatic right shift due to a mantissa overflow has been completed and the proper corrections have been made at the exponent and mantissa positions D0U and D10U, respectively.

(3) The floating decimal accumulator complement adjust operation has been completed by turning Off the latch 327, FIG. 3h.

(4) The floating decimal accumulator true adjust operation is completed by turning Off the latch 329.

When any of the above conditions occur, the result mantissa, D10U–D3U, is in condition for rounding.

Rounding always takes place at D10L, and the carry, if any, is to D3U. As the floating decimal rounding latch 289, FIG. 3d, is turned On, it is maintained On by the latch back and the output from an inverter follower 373. This latch stays On for two word times and is turned Off by a negative pulse supplied at D10U by conduction of the related inverter follower 373.

As the floating decimal rounding latch line 374 raises, the line 129 also raises to turn On the accumulator true add latch 82, FIG. 2b. Positive values on the lower word and rounding latch lines 200 and 374, respectively, develop coincidence at a switch 375, FIG. 3d, to provide a zero insert for the entire lower word. This operation resets the lower accumulator to zero, digit by digit.

The no carry insert line 183 is raised by a switch 378 to prevent any possible carry from taking place from D9L. While the lower accumulator is being reset to zero by the zero insert circuit, the D9 line raises and along with lower word and the up rounding line 374 provide coincidence at a switch 376 to direct an output on an add 5 line 377. This delivers a 5, B5, Q0, from the special digit add switching to the adder entry B which is added to the D10L value delivered from the accumulator at the adder entry A. The addition of these two digits provides a result. However, at this time the only thing of interest is whether a carry occurred at D10L. The sum of this addition normally placed in D10L is replaced by a zero insert developed by the switch 375.

As the D10 line raises, it provides coincidence with lower word and the rounding line 374 at a switch 379 to turn On a check for zero mantissa result latch 381. This raises the zero mantissa result latch on line 382 and drops the off line 383.

There are several possible operations which may take place from this point on. First, assuming no carry occurred from D10L, an add zero operation occurs from a switch 384 which is conditioned by the rounding line 374, upper word, and the output from the inverter follower 385 connected to D10. In this manner, zeros are added at adder entry B from D0U through D9U.

During this interval, the result mantissa is checked for a significant value at a switch 386. As shown, if a significant digit B5, Q4, Q3, Q2 or Q1 is sensed for any digit position D3U–D10U, the switch 386 conducts and turns Off the check for zero mantissa result latch 381 and raises the off line 383. This indicates the mantissa has a significant value at some digit position therein.

Raising the D10U line drops the inverter follower 373 to turn Off the rounding latch 289. At the same time the inverter follower 385 drops the add zero switch 384 to avoid a generated zero sense at this time. As the rounding latch turns Off, a capacitor coupled shot is directed over the related 371 to a switch 387 which is conditioned by the zero mantissa off line 383. An output from this switch 387 is directed over a conductor 388 to a switch 389 which is conditioned by three possible inputs. These are the B5, Q4, Q3, Q2, or Q1 lines, the adder output no carry test line 177 and D10U. Thus if a B5, Q4, Q3, Q2, or Q1 appears at the output of the adder at D10U and no carry is involved, it indicates that a significant digit is in D10U, the highest order position, and that further operations on the data are to be terminated.

Under the above conditions, a pulse from the switch 389 is directed over a line 392 leading to a mix 393 and over a conductor 394 to turn Off the floating decimal normalization latch 96, FIG. 3f, whose operation will be hereinafter described. The data in the upper accumulator 44, FIG. 2a, is now in proper position and is ready for manipulation in accordance with the next instruction set up in the program register 23, FIG. 2c.

During the same interval, the capacitor coupled shot extending over the conductor 371, FIG. 3d, turns Off the accumulator greater than distributor, accumulator smaller than distributor or the accumulator exponent equals the distributor exponent latches 203, FIG. 3a, 212 or 208, FIG. 3e, respectively, if they happen to be On. Also the positive shot extends over the line 388, FIG. 3a, to turn Off the floating decimal accumulator complement latch 295, FIG. 3k, if On, or extends through a switch 395, FIG. 3f, and a related conductor 396 to turn Off the floating decimal accumulator true add latch 126, FIG. 3g, if On.

If the result mantissa is zero and no carry occurs at D10U, a slightly different operation takes place. In this instance, the rounding latch 289, FIG. 3d, turns Off and resets the appropriate analysis latches, FIGS. 3a and 3e. However, switch 287, FIG. 3d, is down, so that the generated shot cannot get over the lines 388, 392 and 394 to the normalization latch 96, FIG. 3f, nor can it turn Off via lines 396 and 388, respectively, the accumulator true and accumulator complement add latches 126, FIG. 3g, or 295, FIG. 3k, respectively. Therefore, these latches remain On. As the check for zero mantissa latch 381, FIG. 3d, turns On at D10L, it drops its off line 383 and raises the on line 382. While significant digits are in the exponent positions, the switch 386 is held down at D1U–D2U by an ND1U and ND2U.

Since no significant value appears at the switch 386 from D3U–D10U to turn Off the check zero mantissa latch 381, the mantissa is zero, therefore, the line 382 stays up. At D10U, D pulse time and the no carry latch line 177 up, coincidence is provided at a switch 397, FIG. 3h, whose output turns On a result exponent zero reset latch 398. Turning On of this latch raises its output line 399 which is held by a switch rendered positive by the latch back and the output from an inverter follower 401 whose input is under control of D10U and BP. The line 399 extends to the diode mix 393, FIG. 3d, to provide an output over the conductor 394 to turn Off the normalization latch 96, FIG. 3f. At the same time the positive condition extends over the line 129, FIG. 3d, to turn On the accumulator true add latch 82, FIG. 2b.

At DXL, a switch 402, FIG. 3d, provides a zero insert through a mix 403 and an inverter follower 404 raises a switch 405, conditioned by the result exponent reset latch line 399 to add zero for the entire lower word. Coincidence of D10, lower word, and the exponent reset line 399 at a switch 406 turns Off the check for zero mantissa result latch 381 and drops its related line 382. At D0–D1 and upper an associated switch conducts to the inverter follower 404 to drop the switch 405 and interrupt the add zero line. At this time, the coincidence at a switch 407 with D1–D2, upper word, and the line 399 provide a zero insert through the mix 403 for these two positions. This action resets the exponent to zero. From D2U to D10U, the switch 405 associated with the inverter follower 404 is up so that a positive value is applied to the related add zero line 134. At D10U, PB the result exponent reset latch 398, FIG. 3h, is turned Off by a negative pulse coming from the inverter follower 401. In this manner the exponent positions D1U–

D2U are reset to zero to agree with the zero mantissa, and the next operation follows in accordance with the next instruction. The result exponent reset latch 398, FIG. 3h, is only operative when the mantissa result is zero. At all other times, this latch is not operated. With a zero mantissa, the accumulator sign latches are reset to plus.

During rounding, if a carry occurs at D10L, the carry shift latch 305, FIG. 3m, is operated from a switch 403 connected to the rounding line 374. The adder is reset at DXU by turning Off the adder reset control latch 142, FIG. 3n, from the switch 311, FIG. 3k. Since the line 299, FIG. 3m, is down, the output from the inverter follower 310 conditions the switches 307 along with switches 308 which are conditioned by the carry shift line 306. In this manner, a carry blank and a no carry insert occurs at D0U from the switch 307, and a no carry blank and a carry insert is generated at D2U for adding the carry from D10L to the D3U position of the mantissa. The carry shift latch 305 is turned Off by the switch 316 at D3U.

If a mantissa overflow occurs during rounding, the data in the mantissa is zero, D3U through D10U, at which time a switch 409, FIG. 3d, conducts at D10U and acts with the carry test line to turn Off the check for zero mantissa result latch 381. Under these conditions, turning Off of the rounding latch 289 operates over the line 371 and switch 372, FIG. 3m, to turn On the check overflow exponent latch 353, as previously described. This operation adds 1 to the exponent and to D10U to adjust for the mantissa overflow.

*Floating Decimal Normalization Operation*

At the end of every floating decimal rounding operation, except a suppress normalization code 02, D10U is sampled for a significant digit. If a significant digit appears at D10U, in effect, is the end of the arithmetic operation. Assuming no carry from D10U, if this posion contains a zero, a normalization cycle automatically takes place. Normalization consists of a mantissa left shift followed by an exponent reduction cycle. This cyclic operation continues until a significant digit is detected in D10U.

Assuming now that a significant digit was detected in the mantissa, the check for zero mantissa result latch 381, FIG. 3d, is turned Off by raising the switch 386. This raises the off line 383 and conditions the switch 387, which directs the capacitor coupled shot from the conductor 371 over the conductor 388 to the switch 389 to test for a significant digit at D10U. The various operations caused by the shot on the line 371 have been previously described. Since no carry occurred at D10U, the check overflow exponent latch 353, FIG. 3m, remains Off. The conductor 388 also turns Off the floating decimal accumulator latch 295, FIG. 3k, and the floating decimal true add accumulator latch 126, FIG. 3g, by means of the switch 395, FIG. 3f, and line 396, FIGS. 3f and 3g.

Since a zero is assumed to be stored at D10U, with no carry, the switch 389, FIG. 3d, remains down. Thus the lines 392 and 394 do not conduct, and the normalization latch 96, FIG. 3f, remains On. As mentioned previously, a positive value appears on the conductor 396 from the switch 395 at D10U. This output is directed to a switch 411, FIG. 3j. This switch also includes an input terminal connection tied to the floating decimal normalization latch on line 412 and connections to the B0 and Q0 lines extending from the adder. With the appearance of a zero at D10U time, a positive value appears on line 396 and the switch 411 conducts over a line 412 through a mix 413 to the grid of an inverter 414 to drive the plate or output line down. As the D10U line drops, a capacitor coupled shot is provided by a condenser 415 at the output of the inverter 414 which extends through a cathode follower and over a conductor 416 to turn On a floating decimal left shift latch 417. The turning On of this latch raises its related line 418 which sets into operation an automatic left shift of the mantissa.

As shown, at DXL, a switch 419, FIG. 3j, also connected to the floating decimal normalization and floating decimal left shift on lines 412 and 418, respectively, conducts to provide a positive value to the add zero and zero insert lines. The left shift on line 418 is parallel connected to a plurality of diode switches, FIG. 3k, which are rendered conducting at predetermined time intervals for accomplishing the left shift. The off line 421 of the floating decimal left shift latch 417 is also connected to a diode switch 422, FIG. 3k, to be hereinafter explained. At DXL–D0L, a mix 423 conducts over a line to provide coincidence at a switch 424 to raise the conductor 251 which turns On the accumulator true add gate 252, FIG. 2c.

From DXL–D10L a switch 426, FIG. 3k, conducts to raise a floating decimal left shift line 427 for operating the left shift gate 65, FIG. 2d, and leads to a plurality of diode switches for operating the adder reset control latch 142, FIG. 3m.

The left shift takes place in the normal manner in which negative A pulses drop the adder reset line 145, FIGS. 3m and 2d, at each NAP, unless restricted by the adder reset control latch 142. During this interval, the data enters the adder entry A under control of the left shift gate 65, FIG. 2d, controlling the left shift switch 64 which is connected with the data lines 59 associated with the output of the accumulator from the on time latches 58, FIG. 2a.

A switch 428, FIG. 3k. provides an output, of positive value when the floating decimal right shift latch off and the floating decimal add and subtract latch on lines 271 and 108, respectively, are up which is applied to one terminal of a diode switch 429. This switch is also connected to the floating decimal left shift on line 418 and to the output of an inverter follower 431 to thus raise the line 266 leading to the accumulator readin gate 114, FIG. 2a, from DXL–D0U and from D3U–D10U. This permits the left shift of the data to take place in the usual manner, except at D1U–D2U, since at D1–D2 and upper, a switch 432, FIG. 3k, acts via an inverter 431 to drop the floating decimal left shift gate line 427 at the switch 426. This action also drops the switch 429 to turn Off the accumulator readin gate 114, FIG. 2a, and via line 433, ahead of the inverter 431, causes a switch 434, FIG. 3k, to operate over the line 78 to raise an accumulator regeneration gate 435, FIG. 2a. This gate acts via switch 62 to direct the D1U–D2U output of the on time latches 58, FIG. 2a, back to the accumulator D1U–D2U positions, regenerated without shift.

From the above when the floating decimal left shift gate line 427, FIGS. 2d and 3k, is up, the left shift takes place as shown in FIG. 9. A switch 436, FIG. 3m, associated with BP and DXU conducts to provide a positive pulse through the mix and related conductor to turn On the adder reset control latch 142. Raising the output line 140 feeds back to hold the latch On and at the same time conducts through the mix to hold the adder reset line 145, FIGS. 3m, 2c and 2d, positive. This prevents resetting of the adder 33, FIG. 2d, and holds the data read out of D10L in the adder.

The floating decimal left shift gate line 427, FIG. 3k, as stated above remains down for D1–D2 upper due to operation of the inverter 431. At D3, upper BP and CP time, coincidence with the floating decimal left shift on line 418 is provided at a switch 437. This directs a pulse through the mix 137, conductor 138 and the mix 139, FIG. 3m, to the inverter 141 to drive its plate down. Dropping of the inverter output cuts off the adder reset control latch 142 to reset the adder. As the accumulator readin gate is raised at the end of D2U, the data stored in the adder, D10L, is inserted at D3U. From this point on, the adder is reset by NAP, and the data from D3U to D9U is shifted one digit position to the left in the usual manner. The exponent values at D1U–D2U are regenerated without shift by operating the switch 434, FIG. 3k.

At the next D10U time, a switch 438, FIG. 3j, conducts to turn Off the floating decimal left shift latch 417. In so doing, a capacitor coupled shot extends from the Off side of the latch through a cathode follower to a switch 439, which is conditioned by the floating decimal normalization on line 412 to direct a pulse over a conductor 441 to turn On a floating decimal exponent adjust latch 442. Turning On this latch raises its related line 443 and is effective to raise the line 129 connected thereto, FIG. 3j, to set the accumulator true add latch 82, FIG. 2b.

The next operation proceeds by providing an output from a switch 440, FIG. 3j, at DXL to zero insert line. Then from D0L through D10L, a switch 444, conditioned by the line 443 and the output from an inverter follower 445 is operated to add zeros at the adder entry B. As D0U rises and drops the output from the inverter follower 445 to open the add zero switch 444, it conditions a switch 446 which raises a line 446 to add 9 at the adder entry B from the special digit switching 51, FIG. 2b. This 9 is added to the D1U value. At D1 upper, the same switch 446 conducts again and adds 9 at the adder. Thus 99 is added to the exponent positions D1U–D2U and the carry therefrom is blanked. This, in effect, provides a subtraction operation and reduces the exponent by 1 to compensate for to the previous left shift of the mantissa.

Any carry from D2U is canceled by operation of the switches 181 and 182, FIG. 3m. As shown, these switches are conditioned by the inverter 317, associated with the off floating decimal carry shift line 306 which when down acts through the inverter to direct a positive value to the conductor parallel connected to the switches, any floating decimal arithmetic operation on line 98 and coincidence at the switch for the D2 and upper lines. This provides an output on the no carry insert and carry blank lines 183 and 184, respectively, to permit operation of the adder and blank the carry from D2U. From D3U–D10U the switch 444, FIG. 3j, is again conditioned and zeros are again added at the adder entry B for the remainder of the word.

Now at D10U the data stored thereat is again checked for zero. This check is initiated by a negative D10U pulse supplied from an inverter follower 447 which turns Off the floating decimal exponents adjust latch 442. In so doing, a capacitor coupled shot is directed over a related line 448 to a switch 449. If a zero, B0 Q0, is detected at D10U, the switch 449 delivers a pulse to the inverter 414. At the end of D10U a capacitor coupled shot extending from the associated condenser 415 is directed over the line 414 to the floating decimal left shift latch 417 to again turn the same On. With this, another complete left shift operation is initiated and thereafter the exponent is reduced by 1 in the identical manner as explained above. Thus at the end of each exponent adjust operation, D10U is tested for zero and a mantissa left shift and exponent reduction are provided for each zero sensed.

Eventually, after a number of mantissa left shifts and exponent adjust operations, a significant digit will appear at D10U. When this happens, a switch 451, FIG. 3j, associated with the line 448, D10U, and the adder B5, Q1, Q2, Q3, and Q4 lines will have coincidence applied thereto, and this switch will raise its output line 452. Raising of this line extends through a mix 453, FIG. 3f, and a conductor 454 to turn Off the floating decimal add and subtract latch 107, FIG. 3b. At the same time the line 452 turns Off the floating point normalization latch 96, FIG. 3f.

Turning Off the above two latches is the end of the floating decimal add or subtract operation. The data in the accumulator has been added or subtracted, as the case may be, and the result is stored in the upper accumulator with a significant digit at the highest order position, D10U, and the exponent of the mantissa has been properly modified to the correct value. The data is now ready for manipulation in accordance with the next instruction.

As mentioned previously, if the mantissa is zero, the exponent values are reset to zero and the normalization latch 96, FIG. 3f, is turned Off at the end of rounding because further operations are not necessary. Under these conditions, at D10U, end of rounding and adder output no carry, the switch 395, FIG. 3f, operates to provide coincidence with the normalization Off line 456 at a switch 455 which in turn conducts through the mix 453 and over the conductor 454 to turn Off the floating decimal add and subtract latch 107, FIG. 3b. Under these conditions, the floating decimal left shift and exponent adjust operations are not necessary.

Another condition when floating decimal left shift and exponent adjust operations are not required is when a significant digit appears at D10U. Under this operation, the output from D10U, adder output no carry switch 395, FIG. 3f, is directed to a switch 457 conditioned by the B5 Q1, Q2, Q3 and Q4 lines and the normalization on line 412 to provide an output therefrom through the mix 453 and conductor 454 to turn Off the floating decimal add and subtract latch 107, FIG. 3b. This latch when turning Off develops a capacitor coupled shot over a related conductor 458 to turn Off the normalization latch 96, FIG. 3f. In all of the above cases when the floating decimal add and subtract latch 107, FIG. 3b, turns Off, this is the end of the floating decimal arithmetic operation.

During each exponent adjust operation, a switch 459, FIG. 3j, is sampled at D2, upper, B pulse and no carry test. This switch provides an output if no carry occurs after 99 has been added to the exponent. If no carry occurs, this indicates the exponent is less than 00 and beyond the capacity of the calculator. This output of switch 459 is directed over a conductor 460 to the floating decimal exponent over flow sense switching 367, FIG. 2d, at the console to indicate an error or stop the machine, if desired.

If it is desired to suppress normalization, a 02 code is directed to a diode switch 461, FIG. 3f, which directs an output over a line 462 leading to the mix 97 and also through the mix 104 to the switch 103 and also via diode mix over the no absolute line 121. Under these conditions, an add operation is initiated, and the result mantissa appearing in the upper accumulator is not normalized. The reason for this is that the normalization latch 96, FIG. 3f, is not turned On. Therefore, the arithmetic operation terminates at the end of rounding, even though a zero appears at D10U.

It can be seen that many possible paths or steps may be automatically taken in performing a floating decimal add or subtract operation. The number of paths or steps will depend upon the various values in the distributor and accumulator along with their signs. The steps will, to a large degree, depend upon the outcome or determination found in the exponent analysis latches, after the restore exponents operation has been completed. However, each possible step that follows is automatic and requires no further instruction from the programmer.

The inputs to the circuit shown in FIGS. 3a to 3k and 3m are intended to be supplied from the above-mentioned Hamilton et al. Patent 2,959,351. The major portion of these inputs are pulses which are primarily developed from the timing track on the drum 22 and the output from the single digit adder 33 which is sampled at various times during the manipulation of the word of data. Also the outputs from this circuit are intended to be delivered to the calculator in timed relation as set up by the various switches and latches. In order to tie the floating decimal controls with the Hamilton calculator application as a more detailed embodiment, the various input and output lines in the circuit are enumerated along with the figure number of the Hamilton et al. application from or to which that line is connected at an appropriate terminal. The connections may be readily located by referring to the figure number associated with the symbols or notations.

*Inputs From Calculator*

| | Figure number of Hamilton et. al. Patent 2,959,351 |
|---|---|
| D control | 81d |
| B0T | 69b |
| 23T | 69c |
| B0U | 69b |
| B5U | 69b |
| Q2U | 69b |
| Q3U | 69d |
| B0 | 68c |
| B5 | 68c |
| Q0 | 68c |
| Q1 | 68c |
| Q2 | 68c |
| Q3 | 68c |
| Q4 | 68c |
| DX | 68a |
| D0 | 58b |
| D1 | 58b |
| D2 | 58c |
| D3 | 58c |
| D4 | 58a |
| D5 | 58a |
| D6 | 58b |
| D7 | 58b |
| D8 | 58b |
| D9 | 58c |
| D10 | 58c |
| DXL | 55d |
| D0L | 55f |
| D1L | 55e |
| DXU | 55d |
| D0U | 55f |
| D1U | 55f |
| D10U | 55f |
| EDXL | 55d |
| ED1L | 55e |
| Lower word | 54e |
| Upper word | 54e |
| Adder output carry test latch | 68e |
| Adder output no carry test latch | 68e |
| BP | 53f |
| CP | 54d |
| DP | 53d |
| NAP | 54d |
| NWPL | 54f |
| Readin distributor | 61d |
| Distributor plus | 85r |
| Distributor minus | 85r |
| Accumulator plus | 85d |
| Accumulator minus | 85t |
| Accumulator nonzero | 83a |
| Accumulator zero | 83a |
| C–A gate | 55b |
| A–C gate | 55b |
| Remainder minus latch On | 85t |
| Remainder plus latch On | 85t |

Any combination of D1–D10, lower or upper, may be provided by switching the particular digits with the upper or lower word lines. For simplicity, this switching has not been shown in all cases. However, it is believed the switching is shown in enough instances to clearly illustrate the arrangement. Likewise, a negative D1, for example, may be provided by taking the output from an inverter which is connected to the D1 line.

The outputs from the floating decimal control circuit shown in FIGS. 3a to 3k and 3m may be connected to appropriate terminals located on the listed figure numbers:

| | Figure number of Hamilton et. al. Patent 2,959,351 |
|---|---|
| Add 0 | 67g |
| Add 1 | 67g |
| Add 2 | 67g |
| Add 3 | 67g |
| Add 4 | 67g |
| Add 5 | 67g |
| Add 6 | 67g |
| Add 7 | 67g |
| Add 8 | 67g |
| Add 9 | 67g |
| No carry blank | 85e |
| Carry blank | 85e |
| Zero insert | 68c |
| Carry insert | 85d |
| Distributor true add gate | 85r |
| Distributor complement add gate | 85r |
| Turn On upper latch | 86a |
| Turn Off accumulator regeneration | 85c |
| To accumulator regeneration gate | 85c |
| Turn On accumulator true add latch | 85r |
| Turn On accumulator true add gate | 85a |
| Floating decimal exponent overflow | 68a |
| Add AP and adder reset | 68a |
| Turn On accumulator readin gate | 85h |
| RI D2U | 64g |
| RO D3U | 64g |
| RO D2U | 64g |
| RI D1U | 64h |
| RO D1U | 64h |
| RI D10L | 64h |
| B0 Q0 accumulator on time latches | 64c |
| To any right shift On | 85a |
| Accumulator pedestal error checking circuit | 83a |
| Readin distributor from accumulator | 61d |
| To block distributor regeneration | 61d |
| Adder entry A B0 Q0 | 68j |
| Set distributor true add latch | 85r |
| Accumulator B0 early latch | 64c |
| Accumulator Q0 early latch | 64c |
| Set accumulator complement latch | 85m |
| No carry insert | 85e |
| Turn On arithmetic operation latch | 85d |

FIGS. 27, 28 and 29 show timing charts of various control pulses applied to the circuitry for performing a floating decimal right shift, interchange accumulator and distributor and a left shift.

FIGS. 30 and 31 indicate a combined flow and timing diagram for a left shift and interchange accumulator and distributor, respectively.

FIG. 26 indicates the flow paths for the mantissa during a floating decimal add or subtract operation in response to five possible conditions as determined by the exponent analysis switching.

FUNCTIONAL OPERATION OF FLOATING DECIMAL POINT ARITHMETIC

A brief description of the various floating decimal point arithmetic operations follows:

*Operation Code 39—Floating Multiply*

Specification: The floating decimal number in the upper accumulator 44 is multiplied by the floating decimal number specified by the data address and located in the distributor 34. The rounded product is retained in the upper accumulator. The lower accumulator 43 is ignored for this operation.

A floating decimal multiply operation consists of three suboperations: (1) mantissas multiply; (2) add 49 or 50 to exponent; and (3) addition of the exponents.

These three entirely different operations will only be described briefly.

The mantissas multiply operation is similar to a normal multiply operation as described in the Hamilton et al. application and will be performed the same way, that is, by successive addition of the distributor to the lower accumulator 43 and left shifts. However, during this process, the exponents D2U–D1U must remain unchanged. The exponent D2–D1 of the number in the distributor 34 is blocked from going to the accumulator during an add upper operation by adding special digit add zero at D1U–D2U. The exponent of the number in the upper accumulator remains unchanged during an add lower operation by canceling the carry from D10L, when there is one, and inserting this carry at D3U. During a floating decimal left shift operation the number at D10L is shifted to D3U, and the numbers at D1U and D2U (the exponent) are regenerated, as previously described, and shown in FIG. 9.

When DXL becomes zero after the eighth shift (the mantissa consists of eight digits and one shift is needed for every one of them), the mantissas have been multiplied. When D10U is zero, an extra or ninth digit shift is required. The decimal point is shifted to the right merely by subtracting 1 from the exponent.

When the result is in normal form, a non-zero condition is detected at D10U during the eighth shift, and when DXL becomes zero, the mantissas multiply operation is stopped, and the circuits are set to add 49 or 50 to the exponents.

During the multiply operation, the exponent of the multiplier in the accumulator 44 remained at D1U and D2U throughout, and the exponent of the multiplicand in the distributor 34 is still at D1 and D2. An add upper operation is initiated. However, the distributor is blocked from D3 to D10 to avoid alternation of the product of the mantissas in the upper accumulator from D10U–D3U. During this interval, the values at D2–D1 in the distributor are added to those at D2U–D1U in the upper accumulator 44.

*Rounding Operation*

This operation is automatic and common to all the floating decimal point arithmetic operations. When the exponents have been added, a rounding operation is provided which consists in adding 5, B5 Q0, to D10L, take the carry, B0 Q1, from D10L, if any, add the same at D3U, and reset the lower accumulator 43 digit positions to zero. An example of rounding is as follows:

The value in the accumulators before rounding 7450513658    723000000000
    +5

After rounding the value is 7450513758    000000000000
                       carry from D10L to D3U Thus the value at D3U is increased by 1, and the lower accumulator has been reset to zero. An overflow may occur when rounding, e.g.:

An accumulator value before rounding 9999999946    630000000000
    +5

Provides a value, after rounding, as follows 0000000046    000000000000
    overflow carry   carry D10L to D3U
    from D10U In this case, an overflow circuit 353, FIG. 3m, is actuated to provide an automatic floating decimal check overflow exponent operation which will add 1 to the exponent position D1U and 1 to D10U. Thus the above value in the accumulator appears as:

1000000047    000000000000 after the check overflow exponent operation.

After the rounding operation and the check overflow, the whole floating decimal point arithmetic operation is completed and an end of operation signal is delivered to the program control. The calculator is now ready to perform the next operation appearing in the operation register 29.

*Operation Code 34—Floating Divide*

Specification: The floating decimal mantissa in the upper accumulator 44 is divided by the floating decimal mantissa in the distributor 34. The rounded quotient will be retained in the upper accumulator. The lower accumulator 43 will be ignored, and it will contain zeros after this operation.

A floating decimal divide operation also consists of three suboperations: (1) mantissa divide; (2) add 50 or 51 to exponent; and (3) subtract the exponents. As in floating decimal multiply, these three operations will be described only briefly.

Mantissas divide operation is similar to a normal fixed point arithmetic divide operation and is performed by subtracting the number in the distributor 34 from the number in the upper accumulator 44 by correction cycles when the remainder becomes negative and by floating decimal left shifts. The exponent of the number in the accumulator D2U–D1U remains unchanged by adding special digit add zero at D1U–D2U during subtract and correction operations. When the add cycle comes to correct the remainder at the end of the ninth shift, zeros are inserted from D3U to D10U to reset the remainder.

To obtain the nine digits of the mantissa, only eight shifts are necessary. This condition is detected by the fact that during the eight shift, the number in D10L is other than zero. Then during the correction cycle of the eighth shift, zeros are inserted from D3U to D10U to reset the remainder, 5 is added to D2U to have the result exponent in modulo 50 and D1U must be increased by 1 to shift the decimal one place to the left to obtain the result in normal form.

The exponent of the dividend in the accumulator 44 remains at D1U–D2U throughout the dividing operation, and the exponent of the divisor in the distributor 34 is still at D1–D2. After division, a subtract upper operation is initiated, but the distributor is blocked from D3 to D10 by special digit add zero and by canceling the carry from D2U to D3U. In this manner we only subtract the exponents and the rest of the upper accumulator remains with zeros.

After the exponents have been subtracted, the mantissa of the quotient is in the lower accumulator 43 and the exponent at D1U and D2U, from here floating decimal left shifts occur with count until a carry occurs from D0L. When this carry is detected, eight digits of the mantissa and the exponent are in the upper accumulator, and one digit of the mantissa is in D10L for rounding purposes. The rounding operation which follows next is exactly the same as previously explained.

ADD AND SUBTRACT OPERATIONS

*Operation Code 02—Floating Add, Suppress Normalization*

Specification: The floating decimal value in the distributor 34 is added to the floating decimal value in the upper accumulator 44, but the normalization of the sum is suppressed. By this means an arbitrary exponent can be attached to a floating decimal mantissa.

Operation Code 32—Floating Add

Specification: The floating decimal mantissa already in the upper accumulator 44 is added to the floating decimal mantissa in the distributor 34. The rounded sum is stored in the upper accumulator 44 in normal form. Normal form means that the high order position contains a significant digit, unless the sum is zero.

Operation Code 33—Floating Subtract

Specification: The floating decimal mantissa in the distributor 34 is subtracted from the floating decimal mantissa in the upper accumulator 44. The rounded difference is stored in the upper accumulator in normal form.

Operation Code 37—Floating Add Absolute

Specification: The floating decimal mantissa already in the upper accumulator 44 is added to the absolute value of the floating decimal number in the distributor 34. The rounded sum is stored in the upper accumulator in normal form.

Operation Code 38—Floating Subtract Absolute

Specification: The absolute value of the floating decimal mantissa in the distributor 34 is subtracted from the floating decimal number in the upper accumulator 44. The rounded difference is stored in the upper accumulator in normal form.

To better understand the mechanism of floating decimal point arithmetic add and subtract operations, the following two examples should be considered:

(a) Accumulator Exponent Smaller than Distributor Exponent

Accumulator: $.52348632 \times 10^7 = 5234863.2$
Distributor: $.42634281 \times 10^{10} = 4263428100.0$ These two numbers may be added thus:

Accumulator: 0005234863.2
Distributor: 4263428100.0
                 ───────────
             4268662963.2 $= .42686629632 \times 10^{10}$ In this case the numbers in the accumulator 44 are shifted to the right the number of places given by the difference between the exponents. The exponent of the sum is equal to the exponent of the distributor 34.

(b) Accumulator Exponent Larger than Distributor Exponent

Accumulator: $.52348632 \times 10^{10} = 5234863200.0$
Distributor: $.42634281 \times 10^7 = 4263428.1$ These two numbers may be added thus:

Accumulator: 5234863200.0
Distributor: 0004263428.1
             ───────────
             5239126628.1 $= .52391266281 \times 10^{10}$ In this case the number in the distributor 34 must be shifted to the right the number of places given by the difference between the exponents. The exponent of the sum is equal to the exponent of the accumulator.

Thus in a floating decimal add or subtract operation, the exponents in the accumulator 44 and distributor 34 must be matched before adding or subtracting. To do this, the first operation is a subtract the upper accumulator exponent to determine which exponent is larger and to determine the number of places to shift. Zeros will be added from D3U to D10U, and the carry from D2U, if any, is canceled to leave the mantissa unaltered.

Listed below are a set of examples where the exponent of the number in the distributor remains a fixed value, and the exponent of the number in the accumulator 44 ranges from much larger to much smaller than the distributor 34. Subtraction of the exponents is accomplished by adding the complement of the distributor exponent to the true value of the accumulator exponent. These may be analyzed as follows:

| Accumulator Exponent Modulo 50 | | Distributor Exponent Modulo 50 | | Subtract upper | | | Analysis of the result |
|---|---|---|---|---|---|---|---|
| D2U | D1U | D2 | D1 | Op | Exponent Difference D2U | D1U | |
| 7 | 5 | 6 | 2 | 1*<br>75<br>+37**<br>───<br>113 | 1 | 3 | D2U=1 Acc.≫Dist.<br>D1U=3<br>Dist.=0 for add and subtract purposes |

*Elusive 1.
**37 is nines complement of 62 in all examples.
Drop carry 1.

| | | | | | | | |
|---|---|---|---|---|---|---|---|
| 6 | 9 | 6 | 2 | 1<br>69<br>+37<br>───<br>107 | 0 | 7 | D2U=0 The dist. must be shifted to the right<br>D1U=7 Shift seven places Acc.>Dist. |
| 6 | 5 | 6 | 2 | 1<br>65<br>+37<br>───<br>103 | 0 | 3 | Acc.>Dist.<br>D2U=0 The dist. must be shifted to the right<br>D1U=3 Shift three places |
| 6 | 2 | 6 | 2 | 1<br>62<br>+37<br>───<br>100 | 0 | 0 | Acc. Exp.=<br>Dist. Exp.<br>D2U=0 No shifts—<br>proceed to<br>D1U=0 add or subtract the mantissas |
| 5 | 9 | 6 | 2 | 59<br>+37<br>───<br>97 | 9 | 7 | Acc.<Dist.<br>D2U=9 The acc. must be shifted to the right<br>D1U=7 Shift three places |
| 5 | 5 | 6 | 2 | 1<br>55<br>+37<br>───<br>93 | 9 | 3 | D2U=9 The acc. must be shifted to the right<br>D1U=3 Shift seven places<br>Acc.<Dist. |
| 4 | 9 | 6 | 2 | 1<br>49<br>+37<br>───<br>87 | 8 | 7 | D2U=8 Acc.≪Dist.<br>D1U=7 Acc.=0 for add and substract purposes |

These conclusions are general because they are derived from the difference between the exponents, not from the specific values of the exponents. To cover the complete range of possible exponents, the conclusions are:

(1) When there is a carry from D2U:
  (a) If the difference between the exponents is 01, 02, 03, 04, 05, 06, 07, or 08, the accumulator larger than distributor latch 203, FIG. 3a, is turned On.
  (b) If the difference between the exponents is 09, or if D2U is equal to 1, 2, 3, 4, 5, 6, 7, 8, or 9, the accumulator much larger than distributor latch 195, FIG. 3a, is turned On.
  (c) If the difference between the exponents is 00, then the accumulator exponent=distributor exponent latch 208, FIG. 3e, is turned On.
(2) When there is no carry from D2U:
  (a) If the difference between the exponents is 99, 98, 97, 96, 95, 94, 93, or 92, the accumulator is smaller than distributor latch 212, FIG. 3e, is turned On.
  (b) If the difference between the exponents is 91, 90 or if D2U is equal to 8, 7, 6, 5, 4, 3, 2, 1, or 0, the accumulator is much smaller than distributor latch 214, FIG. 3a, as is turned On.

When the accumulator is larger than distributor, the mantissa in the distributor 34 must be shifted to the right the number of places equal to the difference between the exponents. However, to avoid shifting this mantissa in the distributor 34, the values in the accumulator 44 and distributor 34 are interchanged to have the smaller mantissa always in the accumulator in order to perform the right shift.

All the possible combinations of signs in the accumulator and distributor regarding the operations to be performed are analyzed as follows:

| Operation | Acc. sign | Dist. sign | Result Sign | | Adder Control | |
|---|---|---|---|---|---|---|
| | | | Acc.> dist. | Acc.< dist. | Acc. in. | Dist. in. |
| Add | + | + | + | + | True | True |
| Add | + | − | + | − | Compl | True |
| Add | − | − | − | − | True | True |
| Add | − | + | − | + | Compl | True |
| Subt | + | + | + | + | True | True |
| Subt | + | − | + | + | Compl | True |
| Subt | − | − | − | + | True | True |
| Subt | − | + | − | − | True | True |
| Abs. add | + | ± | + | + | True | True |
| Abs. add | − | ± | − | + | Compl | True |
| Abs. subt | − | ± | + | − | True | True |
| Abs. subt | + | ± | + | − | Compl | True |

On absolute operations the distributor sign is ignored.

In the last two columns it is assumed that any data transfer has been done and that the add or subtract operation is ready.

Because the smaller number is placed in the accumulator, the distributor need not be complemented nor is a delay necessary to wait for the carry or no carry condition at D10U to determine which value is larger. This is known when subtracting the exponents. The exception to this is when the exponents are equal, but the accumulator mantissa is larger than the distributor mantissa and when dealing with unnormalized numbers.

When the accumulator is larger than distributor, the sign of the result is the same as the sign of the first number in the accumulator, and in this case the accumulator sign latches remain unchanged.

When the accumulator is smaller than distributor, the sign of the result is the same as the sign of the first number in the accumulator, if the accumulator true input is used. In this case the accumulator sign latches remain unchanged. If the accumulator complement input to the adder is used, the sign of the result is opposite to the sign of the first number in the accumulator, and the accumulator sign latches are reversed.

GENERAL CIRCUIT ACTION

FIGS. 14 to 24, inclusive, are charts showing the position of the data originally located in the accumulators 44 and distributor 34 during various steps in the floating decimal operations. Each step requires two word times, and the number of steps per operation will vary according to the particular operation called for.

Accumulator Is Larger Than Distributor

In FIG. 14 an operation code 32, floating decimal add, calls for a floating decimal add operation.

Acc.: +3458963259    Dist.: +2461784856

*First operation.*—Match exponents, either a floating decimal add or subtract signal turns On the floating decimal add and subtract latch 107, FIG. 2b, and the match exponents latch 117. The latter connects the necessary circuits to give a subtract upper operation and to analyze the values 59 and 56 stored at D1U–D2U of the respective registers.

During upper word time, the entire word in the accumulator along with the complement of the word in the distributor is delivered to the adder. However, only digits D1–D2 are gated through the adder. The remainder of the digits in the distributor are blocked by dropping the gate 155, FIG. 2d, and zeros are added in lieu thereof. This determines whether the accumulator is larger than the distributor or vice versa and by what amount. At the same time the switch-mix circuitry 60, FIG. 2c, to analyze the signs will turn On either the floating decimal accumulator true add latch 126, FIG. 3g, or the floating decimal accumulator complement latch 295, FIG. 3k. In this particular case, the floating decimal accumulator true latch 126, FIG. 3g, is turned On, and the accumulator is larger than distributor latch 203, FIG. 3a, is also turned On. Thus at the end of two word times, the values are as follows:

Acc.: 3458963203    Dist.: 2461784856

As mentioned previously, a 03 indicates the accumulator is larger than the distributor, and a shift of three places is necessary to align the values in the distributor with those of the accumulator 03 operates to condition the add 6 line, FIG. 3i, for the shift count.

*Second operation.*—Restore exponents: At NWPL, negative word pulse lower, the match exponents latch 117, FIG. 2b, turns Off, and a capacitor coupled shot turns On the restore exponents latch 218, which connects the necessary circuitry to give an add upper operation. This adds D2–D1 to D2U–D1U, 56+03; however, the distributor mantissa is blocked. This operation restores the exponent in the accumulator to 59 and inserts the nines complement of the required 3 shift at D0L, FIGS. 2a and 7:

Acc.: 3458963259    000000000060    Dist.: 2461784856

*Third operation.*—Interchange: At the next NWPL the restore exponent latch 218, FIG. 3b, turns Off, and a capacitor coupled shot switches with the accumulator larger than distributor latch line 237, FIG. 3c, to turn On the interchange accumulator and distributor latch 247. This sets the necessary circuits to locate or transfer the entire word of data previously in the accumulator 44 into the distributor 34. However, the accumulator values at D1–D2 are blanked by a zero insert. The interchanged values are now in the following form:

Acc.: 2461784800    000000000060    Dist.: 3458963259

*Fourth operation.*—Right shift: At the next NWPL the interchange accumulator and distributor latch 247, FIG. 3c, turns Off, and a capacitor coupled shot turns On the floating decimal right shift latch 262 which sets the circuits to give the necessary accumulator right shifts to match the exponents. In this example, after three right shifts, six word times, a carry from D0L turns Off the right shift latch. The accumulator now has the mantissa in proper alignment for addition:

Acc.: 0002461700    848000000000    Dist.: 3458963259

During this right shifting, the distributor 34 is blocked at the adder, and add zeros were substituted. It is to be noted the values in the distributor remain unchanged.

*Fifth operation.*—Start add or subtract: When all the right shifts have been performed, the floating decimal right shift latch 262, FIG. 3c, is turned Off by a pulse from the switch 276, FIG. 2b, which also turns On the start floating decimal add or subtract latch 278, FIG. 3. This latch switches with the floating decimal accumulator true add latch 126 and the floating decimal accumulator complement latch 295, FIG. 3k, to give either a true add upper operation or an accumulator complement add upper operation. In this example the floating decimal true accumulator latch 126, FIG. 3g, is turned On during the first operation, so a true add is performed. The value returned to the upper accumulator represents the sum of the two mantissas. During this addition of the mantissas, the exponent 59, D2–D1, is transferred to D2U–D1U at the respective digit times:

Acc.: 3461424959    848000000000

*Sixth operation.*—Rounding: At the next NWPL the start floating decimal add or subtract latch 278, FIG. 3g, is turned Off, and a capacitor coupled shot turns Off the accumulator is much larger or much smaller than distributor latches 195 or 214, FIG. 3a, if either are On. Because there was no carry from D10U during the adding of the mantissas, the floating decimal rounding latch 289, FIG. 3d, is turned On, and this latch sets the circuits to add 5, B5 Q0, at D10L. During this word time, the lower accumulator is reset to zeros by operation of the zero insert circuit. Since there is a carry on round from D10L, this carry is inserted at D3U instead of D1U, as previously explained.

Acc.: 3461425059   000000000000

Due to the fact no carry occurred from D10U during rounding, the check overflow operation remains inactive and because D10U is a significant digit, a normalization operation is not required. Therefore, a capacitor coupled shot is directed from the rounding latch 289, FIG. 3d, to turn Off the normalization latch 96, FIG. 3f, and any of the exponent analysis latches, FIGS. 3a and 3e. The floating decimal add and subtract latch 107, FIG. 3b, which is also turned Off, allows the calculator to proceed with another operation. Since the number is already in normal form, this is the end of the floating decimal add operation. No signal has been developed to change the sign of the accumulator, so the result mantissa has the sign of the first number in the accumulator which was plus, as shown in FIG. 14.

FIG. 15—Accumulator Smaller Than Distributor
(CODE 32—FLOATING DECIMAL ADD)

Acc.: +3458963256   Dist.: −2461734859

*First operation.*—Match exponents: This operation is the same as in the previous case, that is, a subtract upper operation and the analysis of D1U–D2U. In this case the accumulator smaller than distributor latch 212, FIG. 3e, is turned On. The switch mix circuitry 250, FIG. 3f, to analyze the signs will turn On the floating decimal accumulator complement latch 295, FIG. 3k. The addition of the exponents provides a 97, which indicates the accumulator is smaller than the distributor by 03. Therefore, the add 6 line, FIG. 3i, is raised:

Acc.: 3458963297   Dist.: 2461734859

*Second operation.*—Restore exponents: At the next NWPL the match exponents latch 117, FIG. 3b, turns Off, and a capacitor coupled shot turns On the restore exponent latch 218. This latch switches with accumulator smaller than distributor latch line 234 to insert zeros at D1U and D2U. At this time the nines complement of the exponent difference is stored at D0L. End of restore exponents line 228 switches, FIG. 3k, with accumulator is smaller than distributor and floating decimal accumulator complement lines 228 and 230, respectively, to turn Off the accumulator plus latch and to turn On the accumulator minus latch 170, FIG. 2c. This sets the sign of the result to minus. The distributor values remain the same, and the exponent is stored therein:

Acc.: 3458963200   000000000060   Dist.: 2461734859

*Third operation.*—Right shift: At the next NWPL, the restore exponent latch 218, FIG. 2b, turns Off and a capacitor coupled shot switches with accumulator is smaller than distributor latch line 234 to turn On the floating decimal right shift latch 262, FIG. 3c, which sets the circuits to give the necessary accumulator right shifts to match the exponents, as previously described. After three right shifts, a carry from D0L indicates the mantissas are in proper position for addition, and the values appear as follows:

Acc.: 0003458900   632000000000   Dist.: 2461734859

*Fourth operation.*—Start add or subtract: When all the right shifts have been performed, a carry from D0L operates to turn Off the floating decimal right shift latch 262, FIG. 3c, and a capacitor coupled shot turns On the start floating decimal add or subtract latch 278, FIG. 3g. This latch switches with the floating decimal complement accumulator latch 295, FIG. 3k, to give an accumulator complement add upper operation:

Compl. acc.:        9996541099      367999990000
            +              1                   1 Insert carry
Dist.:              2461734800
Accumulator after the operation has been performed:  2458275800      368000000000
                    D10U Cancel carry    D2U Cancel carry A carry from D10U indicates the result is in the true form; therefore, the floating decimal true adjust latch 329, FIG. 3h, is turned On to add the exponent D2–D1 at D2U–D1U:

Acc.: 2458275859   368000000000

*Fifth operation.*—Round: At the next NWPL the start floating decimal add or subtract latch 278, FIG. 3g, is turned Off, and a capacitor coupled shot turns Off certain of the exponent analysis latches. At the completion of the accumulator true adjust, the floating decimal rounding latch 289, FIG. 3d, is turned On to perform the rounding operation to reset the lower accumulator to zero and add 5 to D10L, as previously described:

Acc.: 2458275859   000000000000

Because there is a no carry from D10U after rounding, the check overflow operation is eliminated. Since D10U is a significant digit, a normalization operation is not necessary. This is the end of the operation, and the result is resting in the upper accumulator 44 as shown in FIG. 15. The sign of the result was set to minus during the second operation.

FIG. 16—Overflow When Adding
(CODE 37—FLOATING DECIMAL ADD ABSOLUTE)

Acc.: +9973561458   Dist.: −4281754356

This time the operation is the same as the first case explained, until the fifth operation which is a true add:

Acc.:               0042817500      430000000000
            +
Dist.:              9973561458
Acc. after the operation
has been performed: 0016378958      430000000000
                    D10U carry

*Sixth operation.*—Check overflow right shift: With the next NWPL the start floating decimal add or subtract latch 278, FIG. 38, is turned Off. Because there is a carry from D10U on adding the mantissas, the check overflow right shift latch 346, FIG. 3m, is turned On. This latch sets the necessary circuits to give a floating decimal right shift, after which the check overflow exponent latch 353 is turned On to insert 1 at D10U and to add 1 at D1U:

Acc.: 1001637859   943000000000

*Seventh operation.*—Rounding: When the check overflow exponent latch 353 is turned Off, a capacitor coupled shot turns On the floating decimal rounding latch 289, FIG. 3d, to round the mantissa of the result:

Acc.: 1001637959   000000000000

Due to the fact no carry occurred from D10U on round, a second check overflow operation is not required after this rounding operation. Since D10U is a significant figure, the result is already normalized. No signal has been developed to change the accumulator sign latches so the sign of the result is plus as shown in FIG. 16.

FIG. 17  Overflow When Rounding
(CODE 37—ADD ABSOLUTE)

Acc.: +9999634655   Dist.: +3653673451

In this case the operations are the same as in the first example, until the fifth, which by the sign analysis is a true add upper:

Acc.: 0000365300   673400000000
Dist.: 9999634655
Acc.: 9999999955   673400000000

*Sixth operation.*—Rounding: At NWPL the start floating decimal add or subtract latch 278, FIG. 3g, is turned Off, and since there was no carry from D10U on addition, the floating decimal rounding latch 289, FIG. 3d, is turned On to perform the rounding operation:

Acc.: 0000000055   000000000000
      10U—Carry

*Seventh operation.*—Check overflow exponent: The carry from D10U turns On the check overflow exponent latch 353, FIG. 3m. This latch adds 1 to D10U and adds 1 to D1U to compensate for the overflow. Thus:

Acc.: 1000000056   000000000000

*Eighth operation.*—Rounding: When the check overflow latch 353 turns Off, a capacitor coupled shot again turns On the floating decimal rounding latch 289, FIG. 3d, which in this case leaves the accumulator unchanged. Because D10U is a significant figure, the result is already normalized. No signal has been developed to change the accumulator sign latches, so the sign of the result is plus, as shown in FIG. 17.

FIG. 18—*Normalization After Rounding*

(CODE 38—SUBTRACT ABSOLUTE)

Acc.: +8214782154   Dist.: +1006521457

In this case the same operations occur as in the second example, until the fourth one which is an accumulator complement add upper operation:

```
Compl. acc.:              9991785299        178999999000
         Dist.:      +            1                          1 Carry insert
                          1006521457
Acc. after the operation
has been performed:       0998306657        179000000000
                    D10U Cancel             D2U Cancel carry
                         carry
```

Mantissa is in true form, after which the exponent is added at D2U–D1U.

*Fifth operation.*—Rounding: At the next NWPL the start floating decimal accumulator complement latch 327, FIG. 3h, is turned Off, and at D10U the floating decimal rounding latch 289, FIG. 3d, is turned On to perform the rounding operation:

Acc.: 0998306657   000000000000

*Sixth operation.*—Normalize and exponent adjust: Because there is a no carry from D10U, a check overflow exponent operation is not initiated. If normalization is desired, the floating decimal normalization latch 96, FIG. 3f, is On, and because D10U is zero, a normalization operation is initiated; that is, a floating decimal left shift is provided, and the exponent will be decreased by one for each left shift until a nonzero condition is detected at D10U. Thus:

Acc.: 9983066056   000000000000

Because a nonzero condition has been detected at D10U, at the switch 457, FIG. 3f, this is the end of the operation. The result appears in the accumulator as shown in FIG. 18.

FIG. 19—*Accumulator Is Much Larger Than Distributor*

(CODE 38—FLOATING DECIMAL SUBTRACT ABSOLUTE)

Acc.: +6875392152   Dist.: +9365834643

*First operation.*—Match exponents: Floating decimal add and subtract latch 107, FIG. 3b, is turned On, and so is the match exponents latch 117, which gives a subtract upper operation, but only for D1U and D2U:

Acc.: 6875392109   Dist.: 9365834643

*Second operation.*—Restore exponents: The analysis of D2U turns On the accumulator much larger than distributor latch 195, FIG. 2a. The next NWPL turns Off the match exponents latch 117, FIG. 3b, and a capacitor coupled shot turns On the restore exponents latch 218, which gives an add upper signal but only for D1U and D2U:

Acc.: 6875392152   Dist.: 9365834643

*Third operation.*—Interchange: At the next NWPL the restore exponent latch 218 is turned Off, and when this happens, a capacitor coupled shot switches with the on output of the accumulator is much larger than distributor line 196 to turn On the interchange accumulator and distributor latch 247, FIG. 3c. During this interval, the data in the accumulator is placed in the distributor, and the accumulator is reset to zeros.

*Fourth operation.*—Start add or subtract: The data in the distributor is placed back in the accumulator.

*Fifth operation.*—Rounding: The floating decimal rounding latch 289, FIG. 3d, operates which in this case only resets to zero any number which may have been in the lower accumulator. Thus the same number appears in both the accumulator and distributor.

Acc.: 6875392152   Dist.: 6875392152

When the floating decimal rounding latch is turned Off, a capacitor coupled shot turns Off the floating decimal add and subtract latch 107, FIG. 3b. This is the end of the operation. No signal was developed to change the sign of accumulator. In the above operation due to the fact the accumulator was much greater than the distributor, i.e., more than eight digits, the value in the distributor was disregarded.

FIG. 23—*Accumulator Much Smaller Than Distributor*

(CODE 37—FLOATING DECIMAL ADD ABSOLUTE)

Acc.: +6875392153   Dist.: −9365834562

*First operation.*—The floating decimal add and subtract latch and the match exponents latches 107 and 117, FIG. 3b, are turned On, which gives a subtract upper operation, but only for D1U and D2U.

Acc.: 6875392190   Dist.: 9365834562

*Second operation.*—The analysis of D2U turns On the accumulator is much smaller than distributor latch 214, FIG. 3a. At the next NWPL the match exponents latch 117, FIG. 3b, is turned Off, and a capacitor coupled shot turns On the restore exponent latch 218 which gives an add upper operation, and furthermore, it switches with upper word and accumulator is much smaller than distributor at the switch 227 to insert zeros in all of the upper accumulator 44.

Acc.: 0000000000   Dist.: 9365834562

*Third operation.*—At the next NWPL the restore exponent latch 218 is turned Off. When this happens a capacitor coupled shot switches with the accumulator is much smaller than distributor on line 220 to turn On the start floating decimal add or subtract latch 278, FIG. 3g. This latch switches with the on output of the floating decimal true accumulator latch 126 to give an add upper operation. Thus:

Acc.: 9365834562   Dist.: 9365834562

*Fourth operation.*—At the next NWPL the start floating decimal add or subtract latch 278 is turned Off, and a capacitor coupled shot turns Off the accumulator is much smaller than distributor latch 214, FIG. 3a. Since there is no carry from D10L, the floating decimal rounding latch 289, FIG. 3d, is turned On, and in this case it only resets to zero any number which may have been in the lower accumulator:

Acc.: +9365834562   Dist.: −9365834562

When the floating decimal rounding latch 289 is turned Off, a capacitor coupled cathode follower turns Off the floating decimal normalization and add and subtract latches 96, FIG. 3f, and 107, FIG. 3b. This is the end of the operation. No signal was developed to change the sign of the accumulator.

*Accumulator Exponent=Distributor Exponent*

The following possibilities are present:

- True Add
  1. No overflow.
  2. Overflow.
- Complement add
  - Accumulator mantissa larger than distributor mantissa.
    3. Without normalization.
    4. With normalization.
  - Accumulator mantissa smaller than distributor mantissa.
    5. Without normalization.
    6. With normalization.

Four of these conditions are described below.

*FIG. 20—Accumulator Exponent=Distributor Exponent (No Overflow)*

(CODE 37—FLOATING DECIMAL ADD ABSOLUTE)

Acc.: +3674862548    Dist.: −2301435148

*First operation.*—Match exponent: The floating decimal add and subtract latch 107, FIG. 3b, is turned On along with the match exponent latch 117 which gives a subtract upper operation but only for D1U and D2U.

Acc.: 3674862500    Dist.: 2301435148

The analysis of D1U and D2U turns On the accumulator exponent equals distributor exponent latch 208, FIG. 3e.

*Second operation.*—Restore exponents: At the next NWPL the match exponents latch 117, FIG. 3b, is turned Off, and a capacitor coupled shot turns On the restore exponents latch 218 which gives a zero insert operation for D1U and D2U only.

Acc.: 3674862500    Dist.: 2301435148

*Third operation.*—Start add or subtract: At NWPL the restore exponent latch 218 is turned Off, and a capacitor coupled shot switches with the on line 209 of the accumulator exponent equals distributor exponent latch 208, FIG. 3e, to turn On the start floating decimal add or subtract latch 278, FIG. 3g. This latch switches with the on output of the floating decimal true accumulator latch 126 to give an add upper operation:

Acc.: +5976297648    Dist.: 2301435148

*Fourth operation.*—Rounding: Because no carry occurred from D10L, the floating decimal rounding latch 289, FIG. 3d, is turned On, and in this case, it only resets to zero any number which could have been in the lower accumulator. When the floating decimal rounding latch 289 is turned Off, a capacitor coupled shot turns Off the floating decimal true accumulator latch 126, FIG. 3g, the accumulator exponent equals distributor exponent latch 208, FIG. 3e, and the floating decimal normalization latch 96, FIG. 3f. This is the end of the operation. No signal was developed to change the sign of the accumulator 44.

*FIG. 21.—Accumulator Exponent=Distributor Exponent (Overflow)*

(CODE 33—FLOATING DECIMAL SUBTRACT)

Acc.: +3674862533    Dist.: −8201435133

In this case the same operations occur as in the previous case, until the third one which is an add upper operation:

Acc.: 3674862500
Dist.: 8201435133
Accumulator after the operation has been performed: 1876297633
D10U Carry

*Fourth operation.*—Because there is a carry from D10U, the check overflow right shift latch 346, FIG. 3m, is turned On to right shift the mantissa after which the check overflow exponent latch 353 is turned On to add 1 to the exponent D1U and to the mantissa at D10U:

Acc.: 1187629734    600000000000

*Fifth operation.*—When the check overflow operation is completed, the floating decimal rounding latch 289, FIG. 3d, is turned On, and obtain:

Acc.: +1187629834    000000000000

When the floating decimal rounding latch 289 is turned Off, a capacitor coupled shot turns Off the floating decimal accumulator true latch 126, FIG. 3g, the accumulator exponent equals distributor exponent latch 208, FIG. 3e, and the floating decimal add and subtract latch 107, FIG. 3b. This is the end of the operation. No signal was developed to change the sign of the accumulator.

*FIG. 22.—Accumulator Exponent=Distributor Exponent Accumulator Mantissa is Larger Than Distributor Mantissa*

(CODE 32—FLOATING DECIMAL ADD)

Acc.: +4674862564.    Dist.: −4672151364

*First operation.*—The sign analysis turns On the floating decimal complement accumulator latch 295, FIG. 3k. The floating decimal add and subtract latch 107, FIG. 3b, is turned On along with the match exponents latch 117 to give a subtract upper operation, but only for D1U and D2U:

Acc.: +467482500    Dist.: −4672151364

The analysis of D1U and D2U turns On the accumulator exponent equals distributor exponent latch 208, FIG. 3e.

*Second operation.*—At the next NWPL the match exponents latch 174, FIG. 3b, is turned Off, and a capacitor coupled shot turns On the restore exponent latch 218 which gives an add upper operation but blanking the whole distributor. Thus:

Acc.: 4674862500    Dist.: 4672151364

*Third operation.*—At the next NWPL the restore exponent latch 218 is turned Off, and a capacitor coupled shot switches with the on line 228 of the accumulator exponent equals distributor exponent latch 208 to turn On the start floating decimal add or subtract latch 278, FIG. 3g. This latch switches with the on output of the floating decimal accumulator complement latch 295, FIG. 3k, to give a floating decimal accumulator complement add upper operation:

Compl. acc.: 5325137400    0000000000
Dist.: 4672151364    +1-elusive 1
Accumulator after the operation has been performed:    9997288800    0000000000

No carry from D10 indicates accumulator mantissa is larger than distributor mantissa.

*Fourth operation.*—Floating decimal accumulator complement adjust: The no carry condition from D10U turns On the floating decimal complement adjust latch 327, FIG. 3h, which turns then gives another floating decimal complement accumulator signal but blanking the distributor from D3U to D10U by special digit add zero:

Compl. acc.: 0002711200    9999999999
Dist.: 0000000064    +1-elusive 1
Accumulator after the operation has been performed:    0002711264    0000000000

*Fifth operation.*—At the next NWPL the floating decimal accumulator complement adjust latch 327 is turned Off, and when this happens, a capacitor coupled shot turns On the floating decimal rounding latch 289, FIG. 3d, which in this case only resets to zero any number that may have been in the lower accumulator.

*Sixth operation.*—Normalization left shift: If during programming a suppress normalization signal was received, this is the end of the operation. If a normalization signal is received, the floating decimal normalization latch is On and because D10U is zero, a normalization cycle is started; that is, a floating decimal left shift is provided, and the exponent will be decreased by 1 for each left shift until a nonzero condition is detected at D10U:

Acc.: +2711200061    Dist.: −4672151364

Because a nonzero condition has been detected at

D10U, this is the end of the operation, as shown in FIG. 22. No signal was developed to change the sign of the accumulator.

*FIG. 24.—Accumulator Exponent=Distributor Exponent Accumulator Mantissa Smaller Than Distributor Mantissa*

(CODE 33—FLOATING DECIMAL SUBTRACT)

Acc.: +3674862574    Dist.: +3768352174

*First operation.*—The floating decimal add and subtract latch 107, FIG. 3b, is turned On, and the same thing happens to the match exponents latch 117 which gives a subtract upper operation, but only for D1U and D2U:
Acc.: 3674862500    Dist.: 3678352174

*Second operation.*—The analysis of D1U and D2U turns On the accumulator exponent equals distributor exponent latch 203, FIG. 3e. At the next NWPL, a capacitor coupled shot turns On the restore exponents latch 218, FIG. 3b, which gives an add upper operation but blanking the whole distributor:

Acc.: 3674862500    Dist.: 3678352174

*Third operation.*—At the next NWPL the restore exponent latch 218 is turned Off and provides a capacitor coupled shot which switches with the on line 209 of the accumulator exponent equals distributor exponent latch 203 to turn On the start floating decimal add or subtract latch 278, FIG. 3g. This latch switches with the on output of the floating decimal complement accumulator latch 295, FIG. 3k, to give a floating decimal complement accumulator add upper operation:

```
                        Compl. acc.:    6325137400    9999999999
                              Dist.:    3678352174    +1-elusive 1
Accumulator after the operation has been
  performed:                             0003489600    0000000000
```

D1–D2 blanked by special digit add zero. Carry from D10U means accumulator mantissa is smaller than distributor mantissa.

*Fourth operation.*—The carry condition from D10U turns On the floating decimal accumulator true adjust latch 329, FIG. 3h, which gives a signal to change the sign of the accumulator and an accumulator true add upper signal. However, the distributor is blanked from D3U to D10U by special digit add zero:

```
                              Acc.:    0003489600
                             Dist.:    0000000074
Accumulator after the operation has been
  performed:                            0003489674
```

*Fifth operation.*—At the next NWPL the floating decimal accumulator true adjust latch 329 is turned Off and provides a capacitor coupled pulse to turn On the floating decimal rounding latch 289, FIG. 3d, which in this case only resets to zero any number that may have been in the lower accumulator. When the floating decimal rounding latch 289 is turned Off, a capacitor coupled shot turns Off the floating decimal accumulator complement latch 295, FIG. 3k, the accumulator exponent equals distributor exponent latch 203, FIG. 3e, and the floating decimal add and subtract latch 107, FIG. 3g.

Acc.: −0003489674

If a normalization signal was received, the floating decimal normalization latch 96, FIG. 3f, is On, and because D10U is zero, a normalization cycle is initiated; that is, a floating decimal left shift operation is automatically performed, and the exponent will be decreased by one for each left shift until a nonzero condition is detected at D10U. Thus:

Acc.: −3489600071    Dist.: 3678352174

Because a nonzero condition has been detected at D10U, this is the end of the operation. During the floating decimal accumulator adjust, a signal was developed to change the sign of the accumulator.

CHECK EXPONENT OVERFLOW

When a mantissa overflow occurs, the check overflow operation is performed by giving one floating decimal right shift, after which the exponent is increased by one at D1U. An exponent overflow will occur at D2U from the switch 365, FIG. 3m, if the exponent is 99 during the right shift. In this case the exponent overflow is detected with carry from D2U which may be operative to indicate an overflow light or interrupt calculator operation.

During normalization, an exponent overflow can also occur. This will be better understood by an example. Assuming the floating decimal and subtract operation has been completed, normalization is initiated:

Acc. after rounding:

| | | | |
|---|---|---|---|
| First normalization | F.D.L.S.: | 0000384302 | 0000 |
| | Adj. Exp.: | 0003843002 | 0000 |
| | | +99 | |
| | | 0003843001 | 0000 |

D2U—Carry (canceled)

| | | | |
|---|---|---|---|
| Second normalization | F.D.L.S.: | 0038430001 | 0000 |
| | Adj. Exp.: | +99 | |
| | | 0038430000 | 0000 |

D2U—Carry (canceled]

| | | | |
|---|---|---|---|
| Third normalization | F.D.L.S.: | 0384300000 | 0000 |
| | Adj. Exp.: | +99 | |
| | | 0384300099 | 0000 |

D2U—No carry

Since there is no carry from D2U during the adjust exponent cycle of a floating decimal operation, an exponent overflow is indicated from the switch 459, FIG. 3j. The overflow signal is directed to the calculator to turn On the overflow light. A mantissa overflow is automatically corrected by the check overflow right shift operation. Thus it is understood that when the overflow lighting is turned On, the overflow is an exponent overflow only.

From the foregoing description it can be seen that a control means has been provided for a floating decimal arithmetic operation which requires but a single instruction to the calculator. This single instruction is operative to initiate a series of automatic steps which compare the exponents of two mantissas to determine which of the mantissas is larger, manipulates the mantissas in accordance with the result of the comparison, performs an automatic right shift of one of the mantissas to properly align them for the addition or subtraction operation, if necessary, adds or subtracts the values, checks the result for true or complement values, corrects, if complement, performs an automatic right shift if a mantissa overflow occurs with an automatic increase in the related exponent, checks the result for a zero mantissa, resets the exponent to zero, if a zero mantissa, rounds the mantissa, checks the high order digit for zero, left shifts the mantissa until a significant digit appears in the highest order digit position, corrects the exponent for each left shift, and operates to detect an exponent over or underflow.

It can also be seen that when the result appears in the upper accumulator, additional values may be added to the number without removing from the accumulator. With an arrangement of this type, large numbers of individual instructions required in a normal calculator operation have been eliminated. An arrangement of this type simplifies instructions to the calculator and reduces the possibility of error.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a computer for performing a floating decimal point arithmetic operation with numeric character representations for decimal numbers wherein the numeric manifestations of data is formed in fixed length words having a wide range of values with respect to the decimal point with each word comprising a first group of digits defining a mantissa and a second group of digits defining an exponent for locating the decimal point of the mantissa, the combination of an accumulator having first and second sections with a fixed number of digit positions for storing data signals defining a mantissa and related exponent in said first section, means for connecting the low order digit storing position for the mantissa data to a digit receiving position in said second section, means for shifting the mantissa data between said first and second sections to or from the low order mantissa digit position in said first section, a distributor having digit positions for storing a mantissa and related exponent, an adder, means for connecting said first section and distributor to said adder, means for simultaneously delivering manifestations of the data at like digit positions in said accumulator and distributor to said adder serial by digit, means under the control of an operation signal from the computer for initiating a floating decimal arithmetic operation, gating means operative to selectively gate or block the combining of the exponents data signals and to selectively gate or block the combining of the mantissas at said adder in accordance with the operation to be performed and for storing the result mantissa data and related exponent data in said first accumulator section, means for rounding the mantissa data by adding a value to a digit position of said second section, as the data from said sections passes through said adder whereby a carry from said adder, if any, is inserted in the low order digit position of the result mantissa data in said first section, means for checking the high order digit position of the result mantissa data for a significant digit as it passes through said adder, means connected to said accumulator for left shifting the result mantissa data until a significant digit appears in the high order digit storage position for the result mantissa data, and means for modifying the exponent data by an amount equal to the number of required left shifts as said exponent data passes through said adder.

2. In a fixed word length computer system for performing floating decimal point add or subtract operations with numeric character representations defining a group of digits having a wide range of values with respect to the decimal point and wherein a first predetermined portion of the group of numeric character representations define a mantissa and a second portion of the group defines an exponent for locating the decimal point of the mantissa, the combination of an accumulator for storing manifestations of the data defining the mantissa and related exponent of a first word, a distributor for storing the mantissa and related exponent of a second word to be combined with the first word, a single digit adder, means for directing manifestations of the words of data parallel by bit and serial by digit to said adder, means for gating the exponents of the mantissas and blocking the combining of the mantissas at said adder, storage means for manifestations of the numeric difference between the exponents connected to said adder, means connected to said accumulator for consecutively right shifting the accumulator mantissa data a number of digit positions equal to the numeric difference between the exponents, means for performing the desired add or subtract operation of the mantissas in said adder and placing the result mantissa data and exponent data therefor in said accumulator, a result mantissa data overflow detecting device, means for operating said overflow detecting device to produce a signal in the event of a mantissa overflow condition, means responsive to said signal for right shifting the mantissa data one digit position, and means responsive to an indication of the completion of the mantissa right shift for adding a 1 to the low order digit of the exponent data as it passes through said adder and to the highest order digit of the mantissa data as it passes through the adder to maintain the proper location of the decimal point and the true result mantissa data value.

3. In a fixed word length computer system for performing floating decimal point add or subtract operations with numeric character representations of decimal digits defining groups of numbers having a wide range of values with respect to the decimal point and wherein a portion of each group of numbers defines a mantissa and another portion defines an exponent for locating the decimal point of the mantissa, the combination of an accumulator having a fixed number of digit storing positions for data divided to provide a mantissa and an exponent storing section, a distributor having a similar number of digit storing positions for data corresponding to the mantissa and exponent in said accumulator, a single digit adder, means for simultaneously delivering manifestations of the data at like digit positions in said accumulator and said distributor to said adder, gating means for comparing the exponents of the mantissas in said adder to detect a difference in exponents, means for analyzing the difference in exponents, means for shifting the mantissa data stored in said accumulator in accordance with said exponent analyzing means, means responsive to a signal generated when the number of mantissa data shifts in said accumulator equals the difference in exponents for operating said gating means to combine the mantissas in said adder, means for transferring the result mantissa data and exponent data therefor to said accumulator for storage, zero result mantissa detecting means associated with the output of said adder for detecting a zero mantissa, means controlled by said zero result detecting means for producing a zero result data indication, and means controlled by said indication for resetting the related exponent data to zero by providing a zero insert to the exponent digit positions at the output of said adder.

4. In a fixed word length computer for performing floating decimal point add or subtract operations with numeric character representations of decimal digits defining groups of numbers having a wide range of values with respect to the decimal point and wherein a portion of each group of numbers defines a mantissa and another portion defines an exponent for locating the decimal point of the mantissa, the combination of an accumulator having upper and lower sections, said upper section providing mantissa data and exponent data storing portions, means for selectively connecting the low order digit position of the mantissa in said upper section to a selected digit position in said lower section, a distributor having similar mantissa data and exponent data storing positions, a single digit adder, means for delivering the manifestations of the entire group of numbers in said accumulator and said distributor serial by digit to said adder for comparison of the exponents, gating means for blocking the combining of the mantissas in said adder, means for storing the manifestations of the difference in exponents, means for right shifting the mantissa data in said upper section a number of places equal to the difference in the exponents to align the mantissas for addition or subtraction, the data in the low order position of the mantissa data being shifted to the selected digit position in said lower section at each right shift, means for operating said gating means to combine the mantissas in said adder to provide a result mantissa data for storage in said upper section, and means including said adder for adding a rounding value to the data manifestation in said adder from the selected digit position of said lower section to provide a carry from said adder when the stored value from said selected position is above five, said carry, if any, being transferred to the low order digit position in said upper accumulator section to increase the value of the result mantissa data by one decimal digit.

5. In a computer for performing floating decimal point add or subtract operations with manifestations of data defining numeric character representations for numbers wherein the numeric data is formed in groups of fixed length words having a wide range of values with respect to the decimal point, with each word comprising a first group of digits defining a mantissa and a second group of digits defining an exponent for locating the decimal point of the mantissa, the combination of an accumulator having upper and lower sections with a predetermined number of digit positions for storing the mantissa data and related exponent data in said upper section, means for connecting the low order digit position for the mantissa data to a digit receiving position in said lower section, a fixed word length distributor having similar digit positions for storing a mantissa and a related exponent, an adder, means for connecting said upper section and said distributor to said adder, means for simultaneously delivering manifestations of the data stored at similar digit positions in said accumulator and distributor to said adder serial by digit during each word time, means for placing data manifestations to be operated upon in said accumulator and distributor, means under the control of an operation signal from a control section of said computor for initiating an add operation, means for interrogating the data at the exponent positions when delivered to said adder serial by digit, gating means for blocking the merging of the data forming the mantissas at said adder during the exponent interrogation, means for determining the difference between the exponents, means for resetting the exponent digit positions in said accumulator to zero, means including right shifting means dependent upon the exponent difference for right shifting the mantissa data in said accumulator a number of digit positions equal to the difference in exponents, the data values right shifted from the upper section being stored in said lower section, means responsive to an indication of the termination of the right shift to start the desired arithmetic operation on the mantissas at the next word time, the data manifestations in both mantissas being delivered for combining in said adder, means for delivering the combined data for storage in said upper section along with the exponent value in said distributor, and means for rounding the result mantissa data from said upper section by adding a one-half base value in said adder to the shifted mantissa data from the selected digit position in said lower section as it passes through said adder, and means directing a carry, if any, from said adder to the low order digit position of the result mantissa data in said upper section.

6. The combination as claimed in claim 5 including a result mantissa data overflow detecting means, means for checking the high order digit of the result mantissa data for an overflow from said adder at the end of the mantissa data combining operation in said adder, said last means being responsive to operate said result mantissa data overflow detecting means, switch means for operating said right shifting means to produce a right shift of the data in the result mantissa one digit position during the next word time, and means responsive to a signal at the end of the result mantissa data overflow right shift operation to again direct the data through said adder to increase the exponent data as it passes through said adder to compensate for the overflow value shift and return the overflow to the high order digit position of the result mantissa data.

7. In a computer for performing floating decimal point add or subtract operations with numeric character representations for numbers wherein the numeric data is formed in fixed length words having a wide range of values with respect to the decimal point and wherein each word comprises a first group of digits defining a mantissa and a second group of two digits defining the characteristic for locating the decimal point of the mantissa data, the combination of an accumulator having first and second sections with a fixed number of digit positions for storing the mantissa data and related exponent data in said first section, means for connecting the low order digit position of the mantissa group to a digit receiving position in said second section, a distributor having like digit positions for storing mantissa data and related exponent data, an adder, means for connecting said accumulator and distributor to said adder, means for simultaneously delivering manifestations of the data stored at similar digit positions in said accumulator and distributor to said adder serial by digit each word time, means for placing manifestations of data words to be operated upon in said accumulator and in said distributor, means under the control of an operation signal from a control section of said computer for initiating an add operation by delivering both entire words of data to said adder serial by digit, means for gating the exponents through the adder to determine the numeric difference therebetween and for blocking an arithmetic operation on the mantissas in said adder during this word time, means controlled by a signal for producing an automatic interchange of the manifestations of data between said first accumulator section and said distributor, means for analyzing and storing the exponent difference, means responsive to a value of the tens position of the exponent difference to provide a signal to said controlled means for initiating the automatic interchange of the manifestations of data between said first accumulator section and said distributor, means including zero insert means operative during said interchange whereby said first section exponent positions are set to zero, means responsive to an output signal from the exponent analyzing means for causing a right shift of the mantissa data in said first section equal to the exponent difference means, including said adder, producing an indication of the termination of the right shift operation, and means responsive to an indication of the termination of the right shift operation to initiate the mantissa data add operation by simultaneous delivery of the manifestation of data at the digit positions in said first section and distributor through said adder serial by digit, said distributor exponent data and the result mantissa data being stored in said first accumulator section.

8. The combination as claimed in claim 7 including a result mantissa data overflow detecting means operative when the data in the high order mantissa digit position in said first accumulator section passes through the adder to detect a result mantissa data overflow, means responsive to a signal generated by the overflow detection for initiating a right shift of one digit position of the result mantissa data stored in said first accumulator section means operative after the mantissa data right shift to initiate a second delivery of the mantissa and exponent data manifestations from said first section through said adder, and means operative to deliver an exponent manifestation and a ONE manifestation to said adder in timed relation with the passage of said exponent manifestation and the passage of the high order mantissa data digit positions, respectively, to increase the exponent data value to compensate for the overflow result mantissa data shift and to add a one to the high order mantissa data digit position to compensate for the result mantissa data overflow.

9. The combination as claimed in claim 7 including means producing a signal upon completion of said mantissa add operation, rounding means operative upon receipt of said signal to add a rounding value at said adder to the numeric data value in the selected order position of said second section, means for directing a carry, if any, to the low order digit position of the result mantissa data as said data passes through said adder, and means including said adder for resetting said second accumulator section to zero.

10. The combination as claimed in claim 7 including means operative by a zero manifestation in the high order result mantissa digit position of said first accumulator section as it is tested, while passing through said adder, for the presence of a zero data manifestation, means controlled by said operative means for left shifting the result mantissa data by passing the same through said adder for each required shift, and means for decreasing the exponent data by one for each left shift until a significant digit appears in the high order mantissa data digit position passing through said adder.

11. In a computer for performing a floating decimal arithmetic operation with numeric character representations for decimal numbers wherein the numeric data is formed in fixed length words having a wide range of values with respect to the decimal point and wherein each word comprises a first group of digits having manifestations of data defining a mantissa and a second group of digits defining an exponent for locating the decimal point of the mantissa data, the combination of an accumulator having a fixed number of digit storing positions for a mantissa and a related exponent, a fixed word length distributor having similar digit positions for storing a mantissa and a related exponent, an adder, means for connecting said accumulator and said distributor to said adder, means for simultaneously delivering manifestations of the data at like digit positions stored at said accumulator and distributor to the said adder serial by digit, means for selectively blocking and combining the data representing the mantissas and exponents as they pass through said adder, said exponents being blocked to selectively combine the mantissas and said mantissas being blocked to selectively combine said exponents, means responsive to a signal indication from a section of said computer for initiating said floating decimal arithmetic operation, means for checking the result mantissa data manifestations for zero while passing through said adder, means checking for a zero mantissa and producing a signal upon ascertainment of a zero mantissa, and means responsive to said signal for resetting the result exponent data to zero by providing a zero insert to the result exponent digit positions as they pass from said adder.

12. In a computer for performing a floating decimal arithmetic operation with numeric character representations for decimal numbers wherein the numeric data is formed in fixed length words having a wide range of values with respect to the decimal point and wherein each word comprises a first group of digits carrying manifestations of data defining a mantissa and a second group of digits defining an exponent for locating the decimal point of the mantissa, the combination of an accumulator having a fixed number of digit storing positions for a mantissa and a related exponent, a fixed word length distributor having similar digit positions for storing a mantissa and a related exponent, an adder, means for connecting said accumulator and said distributor to said adder, means for simultaneously delivering manifestations of the data at like digit positions stored at said accumulator and distributor to the said adder serial by digit, means for selectively blocking and combining the data manifestations representing the mantissas and exponents as they pass through said adder, said exponents being blocked to selectively combine the mantissas and said mantissas being blocked to selectively combine the exponents, means responsive to a signal indication from a section of said computer for initiating said floating decimal arithmetic operation to combine the mantissas in said adder to provide a result mantissa data and to produce the appropriate exponent data for storage in said data accumulator, means for checking the result mantissa data for an overflow as it passes through said adder, means including said adder for rounding the result mantissa data, means for checking the mantissa data at said adder for a zero result mantissa, and means responsive to a zero result mantissa data signal to reset the related exponent data to zero by providing a zero insert to the exponent digit positions at the output of said adder.

13. In a computer for performing a floating decimal arithmetic operation with numeric character representations for decimal numbers wherein the numeric data is formed in fixed length words having a wide range of values with respect to the decimal point and wherein each word comprises a first group of digits carrying manifestations of data defining a mantissa and a second group of digits defining an exponent for locating the decimal point of the mantissa, the combination of an accumulator having a fixed number of digit storing positions for a mantissa and a related exponent, a fixed word length distributor having similar digit positions for storing a mantissa and a related exponent, an adder, means for connecting said accumulator and said distributor to said adder, means for simultaneously delivering manifestations of the data at like digit positions at said accumulator and distributor to the said adder serial by digit, means for selectively blocking and gating the mantissas and exponents through said adder, said exponents being blocked to selectively combine the mantissas and said mantissas being blocked to selectively combine said exponents, accumulator and distributor sign storing means, means for comparing the exponents in said adder, means for directing the output from said adder to an exponent analyzing means, means responsive to an equals exponent condition for initiating a mantissa data merging operation in said adder and means responsive to a carry occurring at said adder from the mantissa merging operation for changing the sign of the accumulator to the sign of the distributor.

14. In a computer for performing a floating decimal arithmetic operation with numeric character representations for decimal numbers wherein the numeric data is formed in fixed length words having a wide range of values with respect to the decimal point and wherein each word comprises a first group of digits carrying manifestations of data defining a mantissa and a second group of digits defining an exponent for locating the decimal point of the mantissa, the combination of an accumulator having a fixed number of digit storing positions for a mantissa and a related exponent, a fixed word length distributor having similar digit positions for storing a mantissa and a related exponent, an adder, means for connecting said accumulator and said distributor to said adder, means for simultaneously delivering manifestations of the data at like digit positions stored at said accumulator and distributor to the said adder serial by digit, means for selectively blocking and gating the data representing the mantissas and exponents through said adder, said exponents being blocked to selectively combine the mantissas and said mantissas being blocked to selectively combine said exponents, said blocking and gating means being operative to gate the exponents in true and complement form to provide an output indicating the difference in exponents, analyzing means analyzing said exponent difference for determining the extent of the differences in the exponent and producing a signal to indicate which of the mantissas has the smaller exponent, means responsive to a signal from said last-named means for placing the mantissa data having the smaller exponent in said accumulator, means for right shifting the mantissa data in said accumulator a number of positions equal to the difference in exponents, means producing a signal upon completion of said right shift, means responsive to said signal to gate the mantissas to said adder serial by digit for developing result mantissa data for storage in said accumulator, means for checking the result mantissa data for an overflow during passage of said data through said adder, means for rounding the result mantissa data, means for checking the high order result mantissa for zero while passing through said adder, means controlled by said checking means and responsive to a zero indication signal data therefrom for consecutively left shifting said result mantissa data until a significant digit appears in the high order mantissa digit position, and means for reducing the exponent data by one for each left shift of the result mantissa data, as said data passes through said adder.

15. In a computer for performing floating decimal point add or subtract calculations with numeric character representations of decimal digits wherein the numeric data is arranged in words of fixed length and having a wide range of values with respect to the decimal point, each data word comprising a first group of digits carrying manifestations of data defining a mantissa and a second group of digits defining an exponent for locating the decimal point of the mantissa, the combination of an accumulator having a fixed number of digit receiving positions for the mantissa and exponent, a distributor having similar mantissa and exponent storing positions, an adder, means for connecting said accumulator and distributor to said adder, means for placing a data word in said accumulator and a data word in said distributor, means for delivering manifestations of the entire data words from said accumulator and said distributor to said adder serial by digit, means including said adder for merging the exponents of both mantissas and providing an output indicating a numeric difference therebetween, means for blocking delivery of the mantissas to said adder, and means dependent upon an indicated difference in exponents larger than a fixed norm for canceling the entire data word having the smaller exponent data by inserting zeros in place thereof.

16. In a computer for performing floating decimal point add or subtract operations with numeric character representations for decimal numbers wherein the numeric data is arranged in words of fixed length and having a wide range of values with respect to the decimal point, each data word comprising a first group of digits carrying manifestations of data defining a mantissa section and a second group of digits defining an exponent section for locating the decimal point of the mantissa, the combination of an accumulator having a fixed number of digit storing positions for the mantissa and exponent, a distributor having similar mantissa and data storing positions, a single digit adder associated with said accumulator and said distributor, means for placing a word of data in said accumulator and in said distributor, means for delivering manifestations of the data in the mantissas and exponents of both words to said adder for exponent comparison, means for blocking the merging of the mantissas at said adder during the exponent comparison, means including said adder for determining the numeric difference between the exponents, means for storing the difference in exponents in the exponent section of said accumulator, means for initiating an add operation for adding in said adder the exponent data in said distributor to the exponent difference data in said accumulator to restore as it passes through said adder the original exponent data in said accumulator, an exponent analysis section controlled by said difference for ascertaining an exponent data difference, and means responsive to a manifestation of an exponent difference by said exponent data analysis section indicating that the accumulator exponent data exceeds the distributor exponent data by a number greater than the number of mantissa digit storing positions for replacing the data in the distributor with the data in said accumulator.

17. The combination as claimed in claim 16 wherein the exponent data comprises units and tens digit positions, and means dependent upon predetermined data values appearing in the tens position of the exponent difference as ascertained by said exponent analysis section for resetting said distributor to the data word stored in said accumulator.

18. In a computer for performing floating decimal point add or subtract calculations with numeric character representations for decimal numbers wherein the numeric data is arranged in words of data having a wide range of values with respect to the decimal point, each data word comprising a fixed number of digit positions wherein a first group of digits defines a mantissa and a second group of digits defines an exponent for locating the decimal point of the mantissa, the combination of an accumulator having a fixed number of digit positions for the mantissa and exponent, a distributor having similar mantissa and exponent storing positions, an adder associated with said accumulator and said distributor, means for inserting words of data in said accumulator and in said distributor, means for delivering manifestations of the data in the mantissa and the exponent of both words to the adder for comparison, means for blocking the combining of the mantissas in said adder during the exponent comparison operation, means including said adder for determining the numeric difference in the exponent means connecting said adder to said accumulator, means responsive to an indicated exponent data difference greater than the mantissa storing capacity for resetting the accumulator to zero, and means for transferring the mantissa data and exponent data in said distributor to said accumulator.

19. The combination as claimed in claim 18 wherein the exponent data in said accumulator includes two digit positions, and means dependent upon predetermined data values appearing in the tens position of the difference of said exponents to initiate said accumulator reset to zero operation and transfer of the mantissa and exponent data in said distributor through said adder for storage in said accumulator.

20. In a computer for selectively calculating with numeric character representations for decimal digits in both fixed and floating decimal point notation, the combination of an accumulator including upper and lower sections with a fixed number of digit positions for receiving numeric representations in each section, means for shifting manifestations of data between said sections in either direction, an overflow detecting device associated with the high order digit position in said upper section, a distributor for storing a fixed number of digits similar to said upper accumulator section, a single digit adder, means for connecting said upper and lower sections and said distributor to said adder, means for repeatedly delivering manifestations of the contents of said upper section of said accumulator and of said distributor to said adder serial by digit, separate gating means for said accumulator and said distributor to selectively control the passage of stored manifestations of data through said adder, means for selectively delivering words of data for storage in said accumulator and said distributor, means responsive to a fixed decimal point controlling signal from a controlling portion of said computer for combining the data words serial by digit through said adder, means connecting said adder and accumulator for storing the result data in said accumulator, means including said adder responsive to a floating decimal point controlling signal from said controlling portion of said computer for thereafter treating the digit storing positions of said distributor and upper accumulator section as a mantissa and an exponent therefor for indicating the location of the decimal point from the high order position of the related mantissa, gating means responsive to said floating decimal point controlling signal for gating the data manifestations stored at the exponent positions to said adder for comparison therein and producing an exponent difference, means for blocking the combining of the delivered mantissas, means for storing the data difference in exponents, means for restoring the exponent in said upper section by combining the exponent difference with the smaller exponent, means responsive to the stored exponent difference for operating said shifting means to right shift the mantissa in said upper accumulator section a number of digit positions equal to the numeric difference of the exponents, the low order digit of the mantissa data being transferred to a selected digit location in said lower accumulator section, means producing a signal upon termination of said right shift, means responsive to said signal for gating the mantissas through said adder the result mantissa data being stored in the upper accumulator section, means for automatically rounding the mantissa data by adding a data value to said selected digit location of said lower accumulator section in said adder, means for directing a rounding carry from said adder, if any, to the lower order digit position of the result mantissa data in said upper accumulator section, an overflow detecting device controlled by overflow from the high order digit position of the result mantissa data as it passes through said adder, said device detecting a result mantissa data overflow before and during rounding, means responsive to a data overflow detection for right shifting the result mantissa data one digit position, and means for adding one to the exponent data and to the high order digit position of the result mantissa data in said upper accumulator section to return the result mantissa data to its proper value.

21. In a computer for performing floating decimal point add or subtract operations with numeric character representations for decimal numbers wherein the numeric data is formed in words of fixed length having a wide range of values with respect to the decimal point and with each word comprising a first group of digit manifestations defining a mantissa and a second group of digit manifestations defining an exponent for locating the decimal point of the mantissa, the combination of an accumulator having a plurality of digit positions for storing the numeric character manifestations of the mantissa and the exponent therefor, timing means for timing the transfer of the data, means for reading out manifestations of the stored data serial by digit, one digit early with respect to the normal timing, on time latches operative in response to the early read out of data for providing an on time output, an adder, means for connecting said on time latches to said adder, said adder providing a one-digit delay therein, means for connecting the output from said adder to the input side of said accumulator to return the delayed data one digit to the left of their previous positions to provide a left shift in the accumulator, gating means for isolating the exponent data storing positions in said accumulator and blocking the delivery of the exponent on time ouput to the adder, gating means for delivering zeros to both sides of a said adder during the timed interval for the exponent delivery, gating means for blocking the delivery of the zeros from the output of the adder to the exponent storing digit positions in said accumulator, and means for regenerating and retaining the exponent values in their fixed positions during said left shifting of the mantissa by directing the output of said on time latches to the input of said accumulator.

22. In a computer for performing a floating decimal point arithmetic operation with numeric character representations of decimal digits wherein the numeric data is arranged in words of fixed digit length having a wide range of values with respect to the decimal point, each data word comprising a first group of digits defining a mantissa and a second group of digits defining an exponent for locating the decimal point of the mantissa, the combination of an accumulator having a fixed number of data digit storing positions for a mantissa and for the related exponent, a distributor having similar mantissa and exponent storing positions, an adder, means for connecting said accumulator and distributor to said adder, means for loading data words in said accumulator and in said distributor, means responsive to a floating decimal point arithmetic operation signal for initiating a floating decimal arithmetic operation, said responsive means simultaneously delivering manifestations of the data in said accumulator and said distributor at like digit positions to said adder serial by digit during each word time, means for selectively gating and blocking manifestations of data from the mantissa and exponent positions at said adder, said exponents being blocked to selectively combine the mantissas, said mantissas being blocked to selectively combine said exponents so that the mantissas and exponents are combined at different word time intervals, means for transferring the result mantissa and related exponent data signals to said accumulator, means providing additional storage positions, means for transferring a carry out of the highest of said additional positions to the position in said accumulator allocated to the lowest order digit position of the result mantissa, means for rounding the result mantissa by inserting a value into said additional storage positions at its highest order position, said transferring means directing any carry out of said highest of said additional positions to said allocated lowest order digit position, means connected to said accumulator for checking said high order digit position of the result mantissa data at the end of said rounding operation for a mantissa overflow, means connected to said accumulator for right shifting the mantissa data, means controlled by an overflow indication from said checking means for initiating a right shift operation in the event of a mantissa data overflow, and means connected to said accumulator for inserting the overflow value in the high order digit position of the result mantissa data and for increasing the related data exponent to compensate for the overflow right shift of the result mantissa data.

23. In a computer for performing a floating decimal point arithmetic operation with numeric character representations of decimal digits wherein the numeric data is arranged in words of fixed digit length having a wide range of values with respect to the decimal point, each data word comprising a first group of digits defining a mantissa and a second group of digits defining an exponent for locating the decimal point of the mantissa, the combination of an accumulator having a fixed number of data digit storing positions for a mantissa and for the related exponent, a distributor having similar mantissa and exponent storing positions, an adder, means for connecting said accumulator and distributor to said adder, means for loading data words in said accumulator and in said distributor, means responsive to a floating decimal point arithmetic operation signal for initiating a floating decimal arithmetic operation, said responsive means simultaneously delivering manifestations of the data in said accumulator and said distributor at like digit positions to said adder serial by digit during each word time, means for selectively gating and blocking manifestations of data from the mantissa and exponent positions at said adder, said exponents being blocked to selectively combine the mantissas, said mantissas being blocked to selectively combine said exponents so that the mantissas and exponents are combined at different word time intervals, means for transferring the result mantissa and related exponent data signals to said accumulator, means providing additional storage positions, means for transferring a carry out of the highest of said additional positions to the position in said accumulator allocated to the lowest order digit position of the result mantissa, means for rounding the result mantissa by inserting a value into said additional storage positions at its highest order position, said transferring means directing any carry out of said highest of said additional positions to said allocated lowest order digit position, means for checking the high order digit position of the result mantissa data when passing through said adder for a significant digit indication, and means responsive to a signal indicating the appearance of a significant digit indication for terminating said previously initiated floating decimal arithmetic operation.

24. In a computer for performng a floating decimal point arithmetic operation with numeric character representations of decimal digits wherein the numeric data is arranged in words of fixed digit length having a wide range of values with respect to the decimal point, each data word comprising a first group of digits defining a mantissa and a second group of digits defining an exponent for locating the decimal point of the mantissa, the combination of an accumulator having a fixed number of data digit storing positions for a mantissa and for the related exponent, a distributor having similar mantissa and exponent storing positions, an adder, means for connecting said accumulator and distributor to said adder, means for loading data words in said accumulator and in said distributor, means responsive to a floating decimal point arithmetic operation signal for initiating a floating decimal arithmetic operation, said responsive means simultaneously delivering manifestations of the data in said accumulator and said distributor at like digit positions to said adder serial by digit during each word time, means for selectively gating and blocking manifestations of data from the mantissa and exponent positions at said adder, said exponents being blocked to selectively combine the mantissas, said mantissas being blocked to selectively combine said exponents so that the mantissas and exponents are combined at different word time intervals, means for transferring the result mantissa and related exponent data signals to said accumulator, means for detecting a result mantissa data overflow during the last merging operation, means responsive to a signal from said overflow detection means for right shifting the result mantissa data, means effective at the conclusion of the mantissa data right shift to deliver the shifted mantissa data to said adder whereby the overflow value is returned to the result mantissa data, and means connected to said accumulator and controlled by said right shifting means whereby the related exponent data is increased by one to compensate for the mantissa data overflow right shift.

25. In a computer for performing a floating decimal point arithmetic operation with numeric character representations of decimal digits wherein the numeric data is arranged in words of fixed digit length having a wide range of values with respect to the decimal point, each data word comprising a first group of digits defining a mantissa and a second group of digits defining an exponent for locating the decimal point of the mantissa, the combination of an accumulator having a fixed number of data digit storing positions for a mantissa and for the related exponent, a distributor having similar mantissa and exponent storing positions, an adder, means for connecting said accumulator and distributor to said adder, means for loading data words in said accumulator and in said distributor, means responsive to a floating decimal point arithmetic operation signal for initiating a floating decimal arithmetic operation, said responsive means simultaneously delivering manifestations of the data in said accumulator and said distributor at like digit positions to said adder serial by digit during each word time, means for selectively gating and blocking manifestations of data from the mantissa and exponent positions at said adder, said exponents being blocked to selectively combine the mantissas, said mantissas being blocked to selectively combine said exponents so that the mantissas and exponents are combined at different word time intervals, means for transferring the result mantissa and related exponent data signals to said accumulator, means associated with the output of said adder for detecting a zero result mantissa data, and means responsive to a zero mantissa indication for resetting the related exponent data to zero by providing a zero insert for the exponent positions at the output of said adder.

26. In a computer for performing a floating decimal point arithmetic operation with numeric character representations for decimal numbers wherein the numeric data is formed in words of fixed length having a wide range of values with respect to the decimal point and wherein each word comprises a first group of digits defining a mantissa and a second group of digits defining an exponent for locating the decimal point of the mantissa, the combination of an accumulator having first and second sections with a fixed number of digit positions for storing manifestations of data defining a mantissa and related exponent in said first section, means for connecting the low order mantissa digit position to a digit position in said second section, a distributor having a fixed number of digit positions for storing a mantissa and related exponent data manifestations, a single digit adder, means for connecting said accumulator and said distributor to said adder, means for simultaneously delivering manifestations of the data in like digit positions in said accumulator and said distributor to said adder serial by digit, the data signals in said distributor being delivered serial by digit to said adder each word time, and the data signals in said first accumulator section being delivered to said adder during odd word times, means for initiating a floating decimal operation, means connecting said adder and said first section, means for gating the mantissas through said adder in accordance with the desired floating decimal operation to produce a result mantissa, said result mantissa being conducted via said connecting means to said first section for storage in said first section, said gating means blocking the addition of the exponents data during the mantissa operation, means for gating the data signals from the exponent positions through said adder for storage in the first section after the mantissa operation is completed, said last named gating means blocking the addition of the mantissa data during said adder operation, means associated with the output of said adder for checking the result mantissa for zeros, and means responsive to a zero result mantissa indication for resetting the related exponent data to zero by providing a zero insert for the exponent positions at the output of said adder.

References Cited in the file of this patent

UNITED STATES PATENTS

| 2,538,636 | Williams | Jan. 16, 1951 |
| 2,913,176 | Berezin | Nov. 17, 1959 |

FOREIGN PATENTS

| 745,833 | Great Britain | Mar. 7, 1956 |
| 1,119,767 | France | Apr. 9, 1956 |

OTHER REFERENCES

Progress Report No. 2 on the Edvac. Moore School of Electrical Engineering, U. of Pennsylvania, Oct. 7, 1949, pages 1–1–5 to 1–1–7, 1–4–2 to 1–4–6, 1–4–9 to 1–4–14.